US008653191B2

(12) United States Patent
Ansems et al.

(10) Patent No.: US 8,653,191 B2
(45) Date of Patent: *Feb. 18, 2014

(54) POLYOLEFIN COMPOSITIONS AND ARTICLES PREPARED THEREFROM, AND METHODS FOR MAKING THE SAME

(75) Inventors: Patricia Ansems, Lake Jackson, TX (US); Ashish Batra, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 612 days.

This patent is subject to a terminal disclaimer.

(21) Appl. No.: 12/670,751

(22) PCT Filed: Jun. 30, 2008

(86) PCT No.: PCT/US2008/068800
§ 371 (c)(1),
(2), (4) Date: Jan. 26, 2010

(87) PCT Pub. No.: WO2010/008371
PCT Pub. Date: Jan. 21, 2010

(65) Prior Publication Data
US 2010/0292403 A1    Nov. 18, 2010

Related U.S. Application Data

(60) Provisional application No. 60/952,425, filed on Jul. 27, 2007, provisional application No. 60/952,272, filed on Jul. 27, 2007.

(51) Int. Cl.
*C08L 75/00* (2006.01)
*C08L 23/08* (2006.01)

(52) U.S. Cl.
USPC .................................................. 525/125

(58) Field of Classification Search
USPC .................................................. 525/125
See application file for complete search history.

(56) References Cited

U.S. PATENT DOCUMENTS

| | | |
|---|---|---|
| 4,198,327 A | 4/1980 | Matsumoto et al. |
| 4,397,916 A | 8/1983 | Nagano |
| 4,631,329 A | 12/1986 | Gornowicz et al. |
| 4,883,837 A | 11/1989 | Zabrocki |
| 5,272,236 A | 12/1993 | Lai et al. |
| 5,278,272 A | 1/1994 | Lai et al. |
| 5,414,027 A | 5/1995 | DeNicola, Jr. et al. |
| 5,464,907 A | 11/1995 | Jelenic et al. |

(Continued)

FOREIGN PATENT DOCUMENTS

| | | |
|---|---|---|
| EP | 0347794 A1 | 12/1989 |
| EP | 0347794 B1 | 7/1994 |

(Continued)

OTHER PUBLICATIONS

PCT/US08/68800, International Preliminary Report on Patentability.

(Continued)

*Primary Examiner* — Mike M Dollinger

(57) ABSTRACT

The invention provides a composition comprising at least the following: an olefin multi-block interpolymer, a functionalized olefin-based polymer, and a thermoplastic polyurethane. The invention also provides for articles prepared from the inventive compositions and for methods for making the same.

19 Claims, 7 Drawing Sheets

(56) References Cited

U.S. PATENT DOCUMENTS

| | | | |
|---|---|---|---|
| 5,578,680 | A | 11/1996 | Ando et al. |
| 5,623,019 | A | 4/1997 | Wiggins et al. |
| 5,705,565 | A | 1/1998 | Hughes et al. |
| 5,717,039 | A | 2/1998 | Cusumano et al. |
| 5,814,708 | A | 9/1998 | Frechet et al. |
| 5,849,828 | A | 12/1998 | Frechet et al. |
| 5,902,854 | A | 5/1999 | Kelley et al. |
| 5,916,988 | A | 6/1999 | Tsutsui et al. |
| 6,020,437 | A | 2/2000 | Mestanza et al. |
| 6,054,533 | A | 4/2000 | Farkas et al. |
| 6,140,420 | A * | 10/2000 | Sehanobish et al. .......... 525/125 |
| 6,251,982 | B1 | 6/2001 | Masse et al. |
| 6,369,176 | B1 | 4/2002 | Laughner et al. |
| 6,372,847 | B1 | 4/2002 | Wouters |
| 6,414,081 | B1 | 7/2002 | Ouhadi |
| 6,469,099 | B1 | 10/2002 | Farah et al. |
| 6,680,361 | B1 | 1/2004 | Cady et al. |
| 6,919,407 | B2 | 7/2005 | Tau et al. |
| 7,608,668 | B2 * | 10/2009 | Li Pi Shan et al. .......... 525/240 |
| 7,803,728 | B2 | 9/2010 | Poon et al. |
| 7,951,882 | B2 | 5/2011 | Arriola et al. |
| 2004/0106744 | A1 | 6/2004 | Chino et al. |
| 2006/0199914 | A1 | 9/2006 | Harris et al. |
| 2009/0275690 | A1 * | 11/2009 | Weaver et al. ................ 524/507 |
| 2010/0029827 | A1 * | 2/2010 | Ansems et al. ............... 524/451 |
| 2010/0055358 | A1 * | 3/2010 | Weaver et al. ................ 428/17 |
| 2010/0143651 | A1 * | 6/2010 | Silvis et al. ................... 428/141 |

FOREIGN PATENT DOCUMENTS

| | | | |
|---|---|---|---|
| EP | 0657502 | A1 | 6/1995 |
| EP | 0657502 | A1 | 6/1995 |
| EP | 0734419 | A1 | 10/1996 |
| EP | 0734419 | B1 | 10/1996 |
| EP | 0190889 | B2 | 7/2000 |
| EP | 0734419 | B1 | 2/2002 |
| EP | 1672046 | A1 | 6/2006 |
| EP | 1672046 | A1 | 6/2006 |
| WO | 9302113 | | 2/1993 |
| WO | WO-93/02113 | A1 | 2/1993 |
| WO | 9627622 | | 9/1996 |
| WO | WO-96/27622 | A1 | 9/1996 |
| WO | 9902603 | | 1/1999 |
| WO | WO-99/02603 | A1 | 1/1999 |
| WO | 0063293 | | 10/2000 |
| WO | WO-00/63293 | A1 | 10/2000 |
| WO | 0136535 | A1 | 5/2001 |
| WO | 03008680 | A1 | 1/2003 |
| WO | 03008681 | A1 | 1/2003 |
| WO | WO-03/008681 | A1 | 1/2003 |
| WO | WO-2004/106744 | A1 | 12/2004 |
| WO | 2005090425 | A1 | 9/2005 |
| WO | 2005090427 | A2 | 9/2005 |
| WO | WO-2005/090427 | A2 | 9/2005 |
| WO | 2008080111 | A1 | 7/2008 |

OTHER PUBLICATIONS

PCT/US08/68800, Written Opinion of the International Searching Authority.
PCT/US08/68800, Search Report.
PCT/US08/68800, Response to Written Opinion and Demand.

* cited by examiner

POLYOLEFIN COMPOSITIONS AND ARTICLES PREPARED THEREFROM, AND METHODS FOR MAKING THE SAME

CROSS-REFERENCE TO RELATED APPLICATIONS

This application claims priority to, and incorporates by reference in their entirety the contents of, U.S. Provisional Application Nos. 60/952,425 filed on Jul. 27, 2007, and 60/952,272 filed on Jul. 27, 2007.

FIELD OF INVENTION

The invention provides compositions comprising the following: a) at least one olefin multi-block interpolymer; b) at least one functionalized olefin-based polymer; and c) at least one thermoplastic polyurethane.

BACKGROUND OF THE INVENTION

Polyolefins, as a class of materials, have relatively poor adhesion and compatibility with more polar polymeric materials. In most cases, a separate adhesive is required in order to adhere polyolefins to polar substrates like polyesters, polyamides, polyurethanes, and the like. Similarly, a third component compatibilizer typically has to be used to prepare satisfactory melt blends of polyolefins with other more polar thermoplastics. However, significant amounts of compatibilizers are usually required to maintain the intimate blend of the polyolefin and polyurethane.

In North America, approximately 25 million lbs of flexible polyvinyl chloride (f-PVC) goes into thermoformed sheeting for automotive applications, such as instrument and door panels. Such sheeting is grained, and is color matched with other interior components. Sheeting for automotive applications has to meet several end-use requirements. Key end-use requirements include a low gloss value, a high surface scratch/mar resistance, high heat resistance and good cold temperature impact resistance. In addition, the sheeting must have good adhesion to any intermediate polyurethane (PU) foam layer, for example a foam layer used to provide a softening or cushioning effect to an automotive panel.

International Publication No. WO 00/63293 discloses a thermoplastic polyurethane/olefin-graft polymer blend with an optional compatibilizing polymer. The compatibilizing polymer is a modified polyolefin selected from ionomers, or block and graft olefin polymers that have an unsaturated organic compound in the main or side chain.

European Application No. 0347794A1 discloses a thermoplastic compatible blended composition comprising: (A) from 15 to 60 weight percent of a polyolefin, (B) from 30 to 70 weight percent of a thermoplastic polyurethane, and (C) from 10 to 35 weight percent of at least one modified polyolefin defined as a random, block or graft olefin copolymer having in a main or side chain thereof a functional group selected from carboxylic acid, carboxylate ester, carboxylic acid anhydride, carboxylate salts, amide, epoxy, hydroxy, or acyloxy.

U.S. Pat. No. 6,251,982 discloses a compounded rubber composition comprising: (a) a hydrogenated, polydiene diol based polyurethane having a hard segment content of 10% or greater; (b) a non-polar extender oil in an amount from 10 to 400 phr; and/or (c) one or more thermoplastic resin(s) in an amount from 5 to 100 phr.

U.S. Pat. No. 5,578,680 discloses a vibration-absorbing elastomeric composite, which comprises: (A) 10-60% by weight of at least one thermoplastic resin selected from the group consisting of olefinic polymers, ethylene-unsaturated ester copolymers and natural rubber, and (B) 90-40% by weight of a polyurethane resin, prepared by reacting a polyisocyanate with a polyol insitu in melted thermoplastic resin (A). The polyurethane (B) has a nitrogen atom content of at least 3% by weight, and has a solubility parameter which is higher by at least 2.5 than that of said thermoplastic resin and wherein said composite has a Tan δ of at least 1.0 at 20° C.

U.S. Pat. No. 4,883,837 discloses a thermoplastic compatible blended composition comprising from about 15 to about 60 weight percent of a polyolefin, from about 30 to about 70 weight percent of a thermoplastic polyurethane, and from about 10 to about 35 weight percent of at least one modified polyolefin, defined as a random, block or graft olefin copolymer having in a main or side chain thereof a functional group selected from carboxylic acid, carboxylate ester, carboxylic acid anhydride, carboxylate salts, amide, epoxy, hydroxy, and acyloxy.

U.S. Pat. No. 4,198,327 discloses a composition for adhesion to polar materials, and which comprises the following: a) from 99 to 70 parts by weight of a modified crystalline polyolefin having grafted thereto a monomer selected from unsaturated carboxylic acids and their anhydrides, esters, amides imides and metal salts, and where the crystalline polyolefin has a degree of crystallinity, measured by an X-ray analysis, of at least 25 percent, and which contains the grafting monomer in an amount from 0.0001 to 3 percent by weight, based on the total amount of the crystalline polyolefin and the grafting monomer; and b) from 1 to 30 parts by weight of a hydrocarbon elastomer.

U.S. Pat. No. 5,705,565 discloses a thermoplastic polymer blend comprising one or more thermoplastic polymers, and a substantially linear ethylene polymer grafted with at least about 0.01 weight percent of an unsaturated organic compound containing at least one site of ethylenic unsaturation and at least one carbonyl group. The thermoplastic polymer may be selected from polyurethane, polycarbonate, polystyrene, polyester, epoxy, polyamide, a polyolefin containing polar groups, acrylonitrile-butadiene-styrene copolymer, and mixtures thereof.

European Patent Application No. 0657502A1 discloses a thermoplastic composition containing a mixture of (a) a block copolyether ester, a block copolyether amide and/or a polyurethane, (b) a thermoplastic homo-co- or terpolymer that is incompatible with (a), and (c) a compatibilizer. The compatibilizer is chosen according to the nature of component (b). It will have a backbone that is compatible with, and is preferably identical to, component (b) and a reactive group which is compatible or interacts with component (a). The reactive group may be grafted to this backbone using a grafting monomer having at least one alpha- or beta-ethylenically unsaturated carboxylic acids and anhydrides, and derivatives thereof.

U.S. Pat. No. 6,414,081 discloses a compatibilized blend comprising the following: a) a non-polar thermoplastic elastomer comprising a thermoplastic polyolefin homopolymer or copolymer and an olefin rubber which is fully crosslinked or partially crosslinked; and b) a polar thermoplastic polymer selected from thermoplastic polyurethane (TPU), chloro containing polymers, fluoro containing polymers, polyesters, acrylonitrile-butadiene-styrene copolymers, styrene-acrylonitrile copolymers, styrene-maleic anhydride copolymer, polyacetal, polycarbonate, or polyphenylene oxide; and c) a compatibilizer selected from i) a condensation copolymer formed from 10 to 90 weight percent of a functionalized olefin polymer and 90 to 10 weight percent of a polyamide, based on the total weight of functionalized polymer and polyamide, or ii) a blend of a functionalized olefin polymer and a polyamide, or iii) a mixture of (i) and (ii).

U.S. Pat. No. 6,469,099 discloses a blend of a polymeric hydrocarbon and a thermoplastic polyurethane, which is compatibilized with a polymeric hydrocarbon that contains low concentrations of isocyanate reactive group. The compatibilizer can be prepared by reacting a modified polymer having pendant, or incorporated, amine-reactive groups with a hydroxylamine, a diamine, or a polyethermonoamine. The compatibilized blend may further include a non-TPU engineering thermoplastic to form compatible blends of the polymeric hydrocarbon and the non-TPU engineering thermoplastic.

International Publication No. WO 00/63293 discloses a polymer composition comprising a thermoplastic polyurethane, and a first olefin graft polymer, the graft polymer including at least one first graft moiety and at least one second graft moiety, the first graft moiety being a silane moiety that promotes crosslinking of the grafted elastomer in the presence of moisture, the second graft moiety being an unsaturated organic compound, that, prior to grafting, contains at least one ethylenic unsaturation and a polar functionality that promotes compatibilization of the olefin and the thermoplastic urethane.

U.S. Pat. No. 5,902,854 discloses compositions comprising ethylene interpolymers, such as a linear or substantially linear ethylene interpolymer and polydimethylsiloxane. The compositions may further comprise an ethylene homopolymer or interpolymer grafted with maleic anhydride or succinic anhydride groups. The compositions have good abrasion resistance without sacrificing coefficient of friction.

U.S. Pat. No. 4,397,916 discloses a laminated multilayer structure composed of (A) a layer of a graft-modified ethylene resin grafted with an unsaturated carboxylic acid or a functional derivative thereof, and (B) an oxygen- or nitrogen-containing polar resin layer or a metal layer in contact with the layer (A). The layer (A) is characterized, in part, as consisting of (i) 1 to 100% by weight of said graft-modified ethylene resin derived from an ethylene polymer which contains 0 to 15 mole % of at least one alpha-olefin having 3 to 30 carbon atoms as a comonomer and (ii) 99 to 0% by weight of an unmodified ethylene polymer containing 0 to 50 mole % of at least one alpha-olefin having 3 to 30 carbon atoms as a comonomer.

International Publication No. WO 96/27622 discloses a method of producing nucleophilic amine functionalized polyolefins, by reacting a polymer, carrying an electrophilic functional group, with a diamine having amino end-groups, which have different reactivities. The nucleophilic amine functionalized polyolefin has the composition: Polyolefin-X—R1-NHR2, where X is selected from the group of imide, amide, sulphonamide or amine, R1 is a bivalent organic radical, R2 is H or an alkyl group. The nucleophilic amine functionalized polyolefin has use as a compatibilizer, an adhesive, a dyeable material and a dyeable improver.

International Publication No. WO 93/02113 discloses graft polymers containing reactive amine functionality, and which are prepared by: a) providing a thermoplastic polymer containing at least one electrophilic functionality sufficient to react with primary amino groups; and b) melt reacting with a chemical compound comprising a one primary amine and one secondary amine, the secondary amine having reactivity approximately equal to or less than the primary amine. By utilization of the selected diamine containing chemical compounds, crosslink formation is essentially avoided. The use of the graft polymer as modifier and compatibilizer of polymer compositions is described International Publication No. WO 03/008681 discloses fibers having improved resistance to moisture at elevated temperatures, and which comprise at least two elastic polymers, one polymer heat-settable and the other polymer heat-resistant, the heat-resistant polymer comprising at least a portion of the exterior surface of the fiber. The fibers typically have a bicomponent and/or a biconstituent core/sheath morphology. Typically, the core comprises an elastic thermoplastic urethane, and the sheath comprises a homogeneously branched polyolefin, preferably a homogeneously branched substantially linear ethylene polymer. A fiber component may contain a functionalized polyethylene. (See also WO 03/008680).

Examples of other compositions with functional constituent(s) are disclosed in U.S. Pat. No. 5,623,019; U.S. Pat. No. 6,054,533; U.S. Pat. No. 5,578,680; EP1672046; EP0734419B1; EP0657502A1. Additional functionalized polymers and/or compositions are disclosed in International Publication No. WO 99/02603 and U.S. Publication No. 2004/0106744.

There remains a need for low cost polyolefin compositions that can be used to as good adherents to polar substrates, such as substrates formed from polyurethane, polycarbonate and polyamide. There is a further need for such compositions that can be used in over-molding applications, and which provide improved adhesion to polar substrates. Some of these needs and others have been met by the following invention.

There also remains a need for low cost polyolefin compositions that are capable of further comprising polyurethanes and/or comprising low levels, preferably less than 10 weight percent, compatibilizers. It is of further benefit if such compositions can be used as good adherents to polar substrates, such as substrates formed from polyurethane, polycarbonate and polyamide. It is of even further benefit if articles, such as sheets and films, that have high surface energies and good adhesion properties can be made. There is a further need for low cost compatiblized blends that have improved heat aging performance, and are particularly suited for automotive interior applications that experience elevated temperatures (as high as 120° C.). There is a further need for such compositions that can be used in over-molding applications and provide improved adhesion to polar substrates. Other potentially useful applications include automotive interior applications (thermoformed skins), and which provide one or more of the following properties: a luxurious feel, lower gloss, and improved grain replication required for negative pressure thermoforming processes. Some of these needs and others have been met by the following invention.

There is also a need to develop polyolefin compositions containing a polyurethane component, and which require a minimal amount compatibilizer or other type of stabilization agent to maintain the stability of the polymer phases of the composition, and which have high surface energies and good adhesive properties. Some of these needs and others have been met by the following invention.

There remains a need for improved, low cost polyolefin/polyurethane compositions containing low levels, preferably less than 10 weight percent (based on total weight of composition), compatibilizers, and that can be used to for, articles, such as sheets and films, and which have high surface energies, preferably greater than 30 dyne/cm, and good adhesion properties. There is an additional need for low cost compatiblized compositions that have improved heat aging performance, and are particularly suited for automotive interior applications that experience elevated temperatures (as high as 120° C.). There is a further need for such compositions that can be used in automotive interior applications (thermoformed skins), and which provide one or more of the following properties: a luxurious feel, lower gloss, and improved grain replication required for negative pressure thermoforming processes.

There are additional needs for suitable thermoplastic polyolefin compositions, which can be used to form sheets that do not require a polyurethane top-coating for gloss or scratch control, and which have good adhesion to polyurethane foams. There is also a need to develop a wheatherable, low gloss and/or good scratch mar resistance sheet that has good adhesion to PU foams, PU adhesives and coatings. There are additional needs for suitable thermoplastic polyolefin compositions, which can be used to form films and injection molded articles. Some of these needs and others have been met by the following invention.

SUMMARY OF THE INVENTION

The invention provides a composition comprising at least the following:
A) an olefin multi-block interpolymer;
B) a functionalized olefin-based polymer; and
C) a thermoplastic polyurethane.

DETAILED DESCRIPTION OF THE INVENTION

Figure 1:
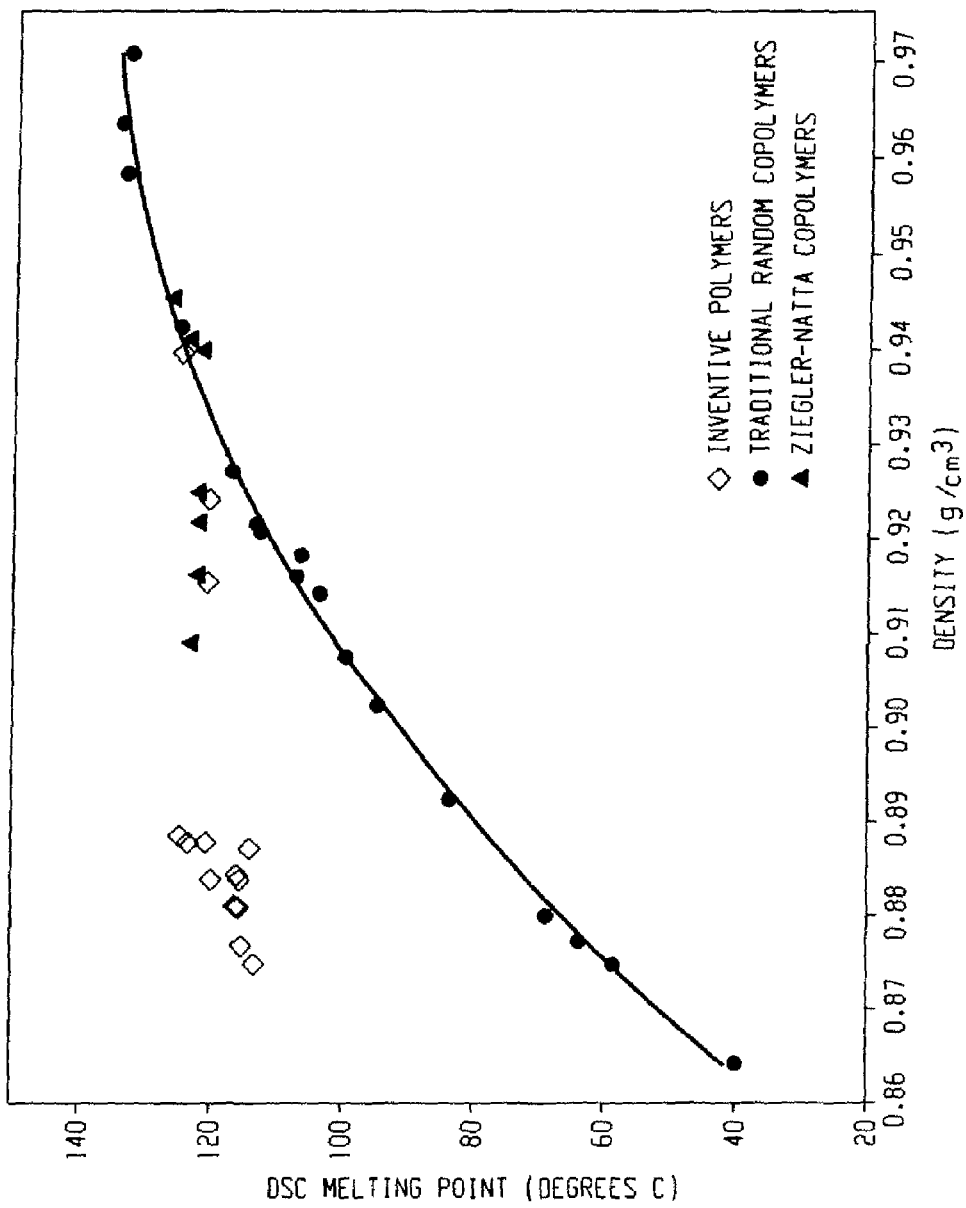
FIG. 1 depicts melting point as a function of density for several ethylene/α-olefin multi-block interpolymers (inventive polymers) and comparative polymers (traditional random and Ziegler-Natta).

As discussed above, the invention provides a composition comprising at least the following:
A) an olefin multi-block interpolymer;
B) a functionalized olefin-based polymer; and optionally
C) a thermoplastic polyurethane.

In another embodiment, the olefin multi-block interpolymer is an ethylene/α-olefin multi-block interpolymer, which has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2;\ or$$

(4) an Mw/Mn from about 1.7 to about 3.5, and is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° C. \text{ for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase: Re>1481-1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

The olefin multi-block interpolymer may have a combination of two or more embodiments as described herein.

In one embodiment, the functionalized olefin-based polymer, also referred to as a polyolefin, is formed from an olefin-based polymer and at least one organic compound selected from an "amine-containing compound," a "hydroxyl-containing compound," an "imide-containing compound", an "anhydride-containing compounds," or a "carboxylic acid-containing" compound.

In another embodiment, the anhydride-containing compound is maleic anhydride.

In another embodiment, the functionalized olefin-based polymer is present in an amount less than, or equal to, 20 weight percent, based on the total weight of the composition. In another embodiment, the functionalized olefin-based polymer is present in an amount less than, or equal to, 10 weight percent, based on the total weight of the composition. In another embodiment, the at least one functionalized polymer is present in an amount less than, or equal to, 5 weight percent, based on the total weight of the composition.

In another embodiment, the functionalized olefin-based polymer is present in an amount greater than, or equal to, 20 weight percent, based on the total weight of the composition. In another embodiment, the at least one functionalized olefin-based polymer is present in an amount greater than, or equal to, 30 weight percent, based on the total weight of the composition. In another embodiment, the at least one functionalized olefin-based polymer is present in an amount greater than, or equal to, 40 weight percent, based on the total weight of the composition.

In another embodiment, the functionalized olefin-based polymer has a density from about 0.85 g/cc to about 0.91 g/cc. In another embodiment, the at least one functionalized olefin-based polymer has a density from about 0.84 g/cc to about 0.93 g/cc. In another embodiment, the at least one functionalized olefin-based polymer has a density from about 0.85 g/cc to about 0.93 g/cc. In another embodiment, the at least one functionalized olefin-based polymer has a density from about 0.84 g/cc to about 0.90 g/cc.

In another embodiment, the functionalized olefin-based polymer has a melt index (I2) from 0.1 g/10 min to 100 g/10 min, preferably from 0.2 to 100 g/10 min. In another embodiment, the functionalized olefin-based polymer has a melt index (I2) from 1 g/10 min to 50 g/10 min. In another embodiment, the at least one functionalized olefin-based polymer has a melt index (I2) from 1 g/10 min to 10 g/10 min. In another embodiment, the at least one functionalized polyolefin has a melt index (I2) from 1 g/10 min to 20 g/10 min.

In another embodiment, the functionalized olefin based polymer is formed from an ethylene-based polymer. In a further embodiment, the ethylene-based polymer is an ethylene/α-olefin interpolymer. In another embodiment, the α-olefin is a C3-C20 α-olefin, and preferably, a C3-C10 α-olefin. In a further embodiment, the α-olefin is selected from the group consisting of 1-propene, 1-butene, 1-hexene, and 1-octene, and preferably 1-butene and 1-octene. In another embodiment, the ethylene/α-olefin interpolymer, used to form the functionalized olefin-based polymer, further comprises a diene. In another embodiment, the ethylene/α-olefin interpolymer has a density from 0.85 g/cc to 0.93 g/cc. In another embodiment, the ethylene/α-olefin interpolymer has a melt index (I2) from 0.01 g/10 min to 1500 g/10 min.

In another embodiment, the ethylene/α-olefin interpolymer, used to form the functionalized olefin-based polymer, is a homogeneously branched linear interpolymer or a homogeneously branched substantially linear interpolymer. In another embodiment, the ethylene/α-olefin interpolymer, used to form the functionalized olefin-based polymer, is a homogeneously branched substantially linear interpolymer.

In another embodiment, the functionalized olefin-based polymer is formed from a propylene-based polymer. In another embodiment, the propylene-base polymer is a propylene/ethylene interpolymer or a propylene/α-olefin interpolymer. In another embodiment, the propylene-base polymer is a propylene/α-olefin interpolymer wherein the α-olefin is a C4-C20 α-olefin, and preferably, a C4-C10 α-olefin. In another embodiment, the α-olefin is selected from the group consisting of 1-butene, 1-hexene, and 1-octene. In another embodiment, the propylene/α-olefin interpolymer has a density from 0.85 g/cc to 0.93 g/cc. In another embodiment, the propylene/α-olefin interpolymer has a melt index (I2) from 0.01 g/10 min to 1500 g/10 min. In another embodiment, the propylene-base polymer is a propylene/ethylene interpolymer. In a further embodiment, the propylene/ethylene interpolymer has a density from 0.85 g/cc to 0.93 g/cc. In another embodiment, the propylene/ethylene interpolymer has a melt index from 0.01 g/10 min to 1500 g/10 min.

In another embodiment, the functionalized olefin-based polymer is formed from an olefin multi-block interpolymer.

In another embodiment, the functionalized olefin-based polymer is formed from a process comprising the following steps:

1) grafting onto the backbone of a olefin-based polymer at least one compound comprising at least one "amine-reactive" group to form a grafted olefin-based polymer;
2) reacting a primary-secondary diamine with the grafted olefin-based polymer; and
   wherein step 2) takes place subsequent to step 1), without the isolation of the grafted olefin-based polymer, and wherein both steps take place in a melt reaction.

In a further embodiment, the primary-secondary diamine is selected from the group consisting N-ethylethylenediamine, N-phenylethylenediamine, N-phenyl-1,2-phenylene-diamine, N-phenyl-1,4-phenylenediamine, and N-(2-hydroxyethyl)-ethylenediamine.

In another embodiment, the functionalized olefin-based polymer comprises the following functional group covalently bonded to the olefin-based polymer backbone:

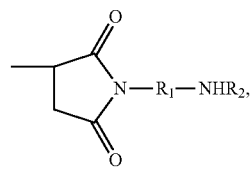

wherein "NR$_1$NHR$_2$" may be derived from a primary-secondary diamine selected from the group of compounds of structure (I) below:

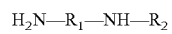  (I), wherein R$_1$ is a divalent hydrocarbon radical preferably selected from the group consisting of alkylene, phenylene and more preferably —CH2CH2-, -para-phenylene-, -ortho-phenylene-, and R$_2$ is a monovalent hydrocarbon radical containing at least 2 carbon atoms, and optionally may be substituted with a heteroatom containing group, preferably an alkyl or aryl group and more preferably an ethyl or a phenyl group.

In a further embodiment, the primary-secondary diamine is selected from the group consisting of N-ethylethylenediamine, N-phenyl-ethylenediamine, N-phenyl-1,2-phenylene-diamine, N-phenyl-1,4-phenylenediamine, and N-(2-hydroxyethyl)-ethylenediamine.

In another embodiment, the functionalized olefin-based polymer is formed from a process comprising the following steps:

1) functionalizing the olefin-based polymer with at least one compound comprising at least one "amine-reactive" group to form a grafted olefin-based polymer;
2) blending the grafted olefin-based polymer, in a solid, non-molten form, with at least one primary-secondary diamine;
3) imbibing the primary-secondary diamine into the grafted olefin-based polymer;
4) reacting the primary-secondary diamine with the grafted olefin-based polymer to form an imide functionalized olefin-based polymer.

In one embodiment, the imbibing step takes place at room temperature. In another embodiment, the blending step takes place at room temperature.

In another embodiment, the at least one functionalized olefin-based polymer is formed from a process comprising the following steps:

1) grafting onto the backbone of a olefin-based polymer at least one compound comprising at least one "amine-reactive" group to form a grafted olefin-based polymer;

2) reacting a alkanolamine with the grafted olefin-based polymer; and wherein step 2) takes place subsequent to step 1), without the isolation of the grafted olefin-based polymer, and wherein both steps 1) and 2) take place in a melt reaction.

In a further embodiment, the alkanolamine is selected from the group consisting of 2-aminoethanol, 2-amino-1-propanol, 3-amino-1-propanol, 2-amino-1-butanol, 2-(2-aminoethoxy)-ethanol and 2-aminobenzyl alcohol.

In another embodiment, the at least one functionalized olefin-based polymer comprises the following functional group covalently bonded to the olefin-based polymer backbone:

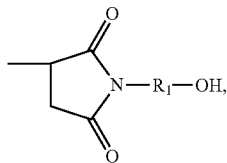

wherein "NR$_1$OH" may be derived from an alkanol amine selected from the group of compounds of structure (II) below:

$$H_2N-R_1-OH \qquad (II),$$

wherein R$_1$ is a divalent hydrocarbon radical, preferably R$_1$ is substituted or unsubstituted alkylene, more preferably R$_1$ is selected from the group consisting of ethylene, propylene, butylene, and alkylene substituted with one or more groups selected from the group consisting of alkoxy and phenyl groups, and more preferably R$_1$ is —CH(OCH$_2$CH$_2$Me)CH$_2$— or and -orthophenylene-CH$_2$—.

In a further embodiment, the alkanolamine is selected from the group consisting of 2-aminoethanol, 2-amino-1-propanol, 3-amino-1-propanol, 2-amino-1-butanol, 2-(2-aminoethoxy)-ethanol and 2-aminobenzyl alcohol.

In another embodiment, the at least one functionalized olefin-based polymer is formed from a process comprising the following steps:

1) grafting onto the backbone of a olefin-based polymer, in a melt reaction, at least one compound of the following formula (IV) to form a grafted olefin-based polymer:

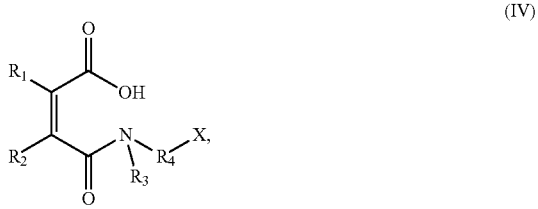

2) and thermally treating the grafted olefin-based polymer to form the imide functionalized olefin-based polymer, and wherein R1 and R2 are, independently, either hydrogen or a C1-C20 hydrocarbyl radical, which is linear or branched; R3 is hydrogen or a C1-C20 hydrocarbyl radical, which is linear or branched; R4 is a divalent hydrocarbyl radical, which is linear or branched; X is OH or NHR$_5$, where R5 is a hydrocarbyl radical, which is linear or branched, or a hydroxyethyl group.

In a further embodiment, R1 and R2 are, independently, either hydrogen or a C1-C10 hydrocarbyl radical. In another embodiment, R3 is either hydrogen or a C1-C10 hydrocarbyl radical, and wherein R4 is a divalent C1-C20 hydrocarbyl radical.

In another embodiment, the functionalized olefin-based polymer comprises the following functional group covalently bonded to the olefin-based polymer backbone:

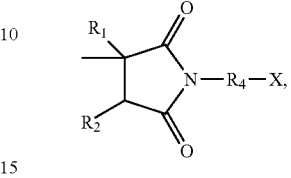

wherein R1 and R2 are, independently, either hydrogen or a C1-C20 hydrocarbyl radical, which is linear or branched; R4 is a divalent hydrocarbyl radical, which is linear or branched; X is OH or NHR$_5$, where R5 is a hydrocarbyl radical, which is linear or branched, or a hydroxyethyl group.

In a further embodiment, R1 and R2 are, independently, either hydrogen or a C1-C10 hydrocarbyl radical. In another embodiment, R4 is a divalent C1-C20 hydrocarbyl radical.

The functionalized olefin-based polymer may have a combination of two or more embodiments as described herein.

In another embodiment, the thermoplastic polyurethane comprises chemical units derived from the following: (1) a polyester and (2) an aromatic diisocyanate or aliphatic diisocyanate. In another embodiment, the thermoplastic polyurethane comprises chemical units derived from a polyester, and at least one aromatic diisocyanate. In another embodiment the thermoplastic polyurethane comprises chemical units derived from a polyester, and at least one aliphatic diisocyanate. In another embodiment, the thermoplastic polyurethane comprises chemical units derived from a polyester and a mixture of 1,3-bis(isocyanatomethyl)-cyclohexane and 1,4-bis(isocyanatomethyl)-cyclohexane. In a further embodiment, the weight ratio of the 1,3-bis(isocyanatomethyl)cyclohexane to the 1,4-bis(isocyanatomethyl)cyclohexane is about 1 to 1.

In another embodiment, the polyurethane is formed from a polyester which comprises a monomeric unit derived from diol derivative derived from N-octyl pyrrolidone. In another embodiment, the polyurethane is formed from a polyester which comprises a monomeric unit derived from polytetramethylene ether glycol. In another embodiment, the polyurethane is formed from a polyester which comprises a monomeric unit derived from a polyether. In another embodiment the thermoplastic polyurethane is a PELLETHANE™ polyurethane.

In a further embodiment, the polyester is formed from caprolactone.

In another embodiment, the thermoplastic polyurethane has a density from 0.90 g/cc to 1.3 g/cc. In another embodiment, the thermoplastic polyurethane has a melt index (I2) from 0.2 g/10 min to 100 g/10 min. In another embodiment, the thermoplastic polyurethane has a melt index (I2) from 1 g/10 min to 100 g/10 min. In another embodiment the at least one thermoplastic polyurethane has a melt index (I2) from 0.2 g/10 min to 10 g/10 min. In another embodiment the at least one thermoplastic polyurethane has a melt index (I2) from 1 g/10 min to 10 g/10 min.

In another embodiment the thermoplastic polyurethane comprises a monomeric unit derived from diol derivative derived from N-octyl pyrrolidone. In another embodiment the thermoplastic polyurethane comprises a monomeric unit derived from polytetramethylene ether glycol. In a further embodiment the thermoplastic polyurethane comprises a monomeric unit derived from a polyether.

The thermoplastic polyurethane may have a combination of two or more embodiments as described herein.

An inventive composition may further comprise one or more additives. For example, an inventive composition may further comprise at least one filler. In another embodiment the filler is a talc or a talc which has been surface modified with at least one amino silane. In another embodiment, an inventive composition may comprise a polar polymer selected from the group consisting of polyesters, polyamides, polyethers, polyetherimides, polyvinylalcohols, polycarbonates, polyurethanes, polylactic acids, polyamide esters, and combinations thereof.

In one embodiment, the composition further comprises a low density polyethylene (LDPE). In a further embodiment, the LDPE has a melt index from 0.2 to 100 g/10 min (190° C./2.16 kg). In a further embodiment, the LDPE has a melt index from 0.5 to 50 g/10 min (190° C./2.16 kg). In a further embodiment, the LDPE has a melt index from 1 to 25 g/10 min (190° C./2.16 kg).

In another embodiment, the composition has a surface energy greater than, or equal to, 35 dynes/cm.

An inventive composition may comprise a combination of two or more embodiments as described herein.

The invention also provides an article comprising at least one component formed from an inventive composition. In a further embodiment, the article is a sheet, a carpet, an adhesive, a wire sheath, a cable, a protective apparel, an automotive part, a footwear component, a coating, or a foam laminate, an overmolded article, an automotive skin, an awning, a tarp, a leather article, a roofing construction article, a steering wheel, a powder coating, a powder slush molding, a consumer durable, a grip, a handle, a computer component, a belt, an appliqué, a footwear component, a conveyor or timing belt, or a fabric.

In another embodiment, the article is a tie layer between extruded sheets, a tie layer between extruded films, a tie layer between extruded profiles, a tie layer between cast sheets, tie layer between cast films, a tie layer between cast profiles, or a tie layer between a combination of the aforementioned.

The invention also provides a film comprising at least one layer formed from an inventive composition. In another embodiment, the invention provides a film comprising at least two layers, and wherein at least one layer is formed from an inventive composition. In another embodiment, an inventive film has a moisture vapor transmission rate of at least 7 g/hr/ft².

The invention also provides an extruded sheet formed from an inventive composition. In a further embodiment, the sheet has a surface energy greater than, or equal to, 30 dyne/cm, preferably greater than, or equal to, 33 dyne/cm, more preferably greater than, or equal to 35 dyne/cm. In another embodiment, the sheet has a thickness from 10 mils to 1000 mils, preferably from 15 mils to 500 mils, and more preferably from 20 mils to 100 mils. In another embodiment, the sheet maintains at least 50 percent, preferably at least 60 percent, of its original elongation after heat aging at 120° C. for 500 hours (ASTM D-882-02).

The invention also provides a painted substrate, wherein the substrate is formed from an inventive composition. In one embodiment, the paint comprises at least one additive selected from the group consisting of an acrylic polymer, an alkyl resin, a cellulose-based material, a melamine resin, a urethane resin, a carbamate resin, a polyester resin, a vinyl acetate resin, an epoxy, a polyol and/or an alcohol. In another embodiment, the paint is a water-based paint. In another embodiment, the paint is an organic solvent based paint.

The invention also provides a dispersion comprising an inventive composition. In another embodiment, the dispersion further comprises at least one additive of selected from the group consisting of an acrylic polymer, an alkyd resin, a cellulose-based material, a melamine resin, a urethane resin, a carbamate resin, a polyester resin, a vinyl acetate resin, an epoxy a polyol, an alcohol, and combinations thereof. In another embodiment, the dispersion is a water-based dispersion. In another embodiment, the dispersion is an organic solvent-based dispersion.

The invention also provides an injection molded article comprising at least one component formed from an inventive composition.

The invention also provides an RF welded article comprising at least one component formed from an inventive composition.

The invention also provides an over-molded article comprising the following: (a) a substrate formed from a composition comprising a polar polymer, and (b) a molded overlay formed from an inventive composition. In one embodiment, the polar polymer is a polycarbonate (PC), ABS, PC/ABS, or nylon. The invention also provides an over-molded article comprising the following: (a) a substrate formed from an inventive composition, and (b) a molded overlay formed from a composition comprising a polar polymer. In one embodiment, the article is in the form of a grip, handle or belt.

The invention also provides a laminated structure comprising a first layer and a second layer, and wherein the first layer is formed from an inventive composition, and wherein the second layer is formed from a composition comprising a polar polymer. In another embodiment, one of the layers is in the form of a foam. In another embodiment, one of the layers is in the form of a fabric. In another embodiment, the laminated structure is in the form of an awning, tarp or automobile skin or steering wheel. In another embodiment, the second layer is formed from a composition comprising a polycarbonate.

The invention also provides a molded article comprising a first component and a second component, and wherein the first component is formed from a composition comprising a polar polymer, and wherein the second component is formed from an inventive composition. In another embodiment, the article is in the form of an automobile skin, an appliqué, a footwear component, a conveyor belt, a timing belt or a consumer durable.

The invention also provides a footwear article comprising at least one component formed from an inventive composition. In a further embodiment, the article is selected from the group consisting of shoe outsole, shoe midsole, shoe unitsole, an overmolded article, a natural leather article, a synthetic leather article, an upper, a laminated article, a coated article, a boot, a sandal, galoshes, a plastic shoe, and combinations thereof.

The invention also provides a thermoformed sheet comprising at least one layer formed from an inventive composition.

The invention also provides an automotive part comprising at least one layer formed from an inventive composition. The invention also provides an automotive part such as an instrument panel or a door panel formed from an inventive composition.

The invention also provides artificial leather comprising at least one component formed from an inventive composition.

The invention also provides artificial turf comprising at least one component formed from an inventive composition.

The invention also provides an adhesive comprising at least one component formed from an inventive composition. The invention also provides a coated substrate comprising an inventive adhesive, and at least one component formed from Kevlar.

The invention also provides an article formed from an inventive composition, and wherein the article has a surface energy greater than, or equal to, 35 dynes/cm.

An inventive article may comprise a combination of two or more embodiments as described herein.

The invention also provides a blown film comprising at least one layer formed from an inventive composition.

In one embodiment the blown film is an adhesive film.

In one embodiment, blown film is a component of an automotive part.

In one embodiment, the blown film is a component of footwear component. In a further embodiment, the footwear component is selected from the group consisting of a shoe outsole, a shoe midsole, a shoe unitsole, an overmolded article, a natural leather article, a synthetic leather article, an upper, a laminated article, a coated article, a boot, a sandal, galoshes, a plastic shoe, and combinations thereof.

In one embodiment, the blown film is a barrier film. In a further embodiment, the barrier film is located between a fabric and a polyurethane foam.

In one embodiment, the blown film is a component of flooring article.

The invention also provides an injection molded article comprising at least one component formed from an inventive composition. In one embodiment, the composition in the form of an "at press blend." In another embodiment, the composition is in the form of a compounded blend.

The invention also provides an overmolded article comprising at least one component formed from an inventive composition. In one embodiment, the composition in the form of an "at press blend." In another embodiment, the composition is in the form of a compounded blend.

The invention also provides a method of making an inventive composition, said method comprising melt mixing Components A, B and optionally C. In one embodiment, the desired components are mixed simultaneously. In another embodiment, the desired components are mixed sequentially, in any order. In another embodiment, the melt mixing takes place in an extruder. In another embodiment, the melt mixing takes place in an "in-line" compounding process.

An inventive process may comprise a combination of two or more embodiments as described herein.

An inventive composition may comprise a combination of two or more embodiments as described herein.

An inventive article may comprise a combination of two or more embodiments as described herein.

Functionalized Olefin-Based Polymers

1. Overview

Functionalized olefin-based polymers include, but are not limited to, olefin-based polymers functionalized with carboxylic acid, anhydride, alcohol, amine, epoxy, halogens, isocyanate, and other groups and combinations thereof. Functionalized may occur along the olefin-based polymer backbone, at the chain ends, as a block segment, and/or as a side-chain.

In one embodiment, the functionalized olefin-based polymer is a functionalized ethylene-based polymer, and preferably a functionalized ethylene/α-olefin interpolymer, that has a melt index ($I_2$) greater than, or equal to, 0.5 g/10 min, preferably greater than, or equal to, 1 g/10 min, and more preferably greater than, or equal to, 2 g/10 min, as determined using ASTM D-1238 (190° C., 2.16 kg load). In another embodiment, the functionalized olefin-based polymer is a functionalized ethylene-based polymer, and preferably a functionalized ethylene/α-olefin interpolymer, that has a melt index ($I_2$) less than, or equal to, 50 g/10 min, preferably less than, or equal to, 20 g/10 min, and more preferably less than, or equal to, 10 g/10 min, as determined using ASTM D-1238 (190° C., 2.16 kg load).

In another embodiment, the functionalized olefin-based polymer is a functionalized ethylene-based polymer, and preferably a functionalized ethylene/α-olefin interpolymer, that has a melt index ($I_2$) from 0.5 g/10 min to 50 g/10 min, preferably from 1 g/10 min to 20 g/10 min, and more preferably from 2 g/10 min to 10 g/10 min, as determined using ASTM D-1238 (190° C., 2.16 kg load). All individual values and subranges from 0.5 g/10 min to 50 g/10 min are included herein and disclosed herein.

In another embodiment, the functionalized olefin-based polymer is a functionalized ethylene-based polymer, and preferably a functionalized ethylene/α-olefin interpolymer, that has a density greater than, or equal to, 0.84 g/cc, preferably greater than, or equal to, 0.85 g/cc, and more preferably greater than, 0.86 g/cc. In another embodiment, the functionalized olefin-based polymer is a functionalized ethylene-based polymer, and preferably a functionalized ethylene/α-olefin interpolymer, that has a density less than, or equal to, 0.91 g/cc, preferably less than, or equal to, 0.90 g/cc, and more preferably less than, or equal to, 0.89 g/cc.

In another embodiment, the functionalized olefin-based polymer is a functionalized ethylene-based polymer, and preferably a functionalized ethylene/α-olefin interpolymer, that has a density from 0.84 g/cc to 0.91 g/cc, preferably from 0.85 g/cc to 0.90 g/cc, and more preferably from 0.86 g/cc to 0.89 g/cc. All individual values and subranges from 0.84 g/cc to 0.91 g/cc are included herein and disclosed herein.

In another embodiment, the functionalized olefin-based polymer is an amine functionalized olefin-based polymer, preferably an amine functionalized ethylene-based polymer, and more preferably an amine functionalized ethylene/α-olefin interpolymer. In a further embodiment, the α-olefin is a C3-C20 α-olefin, preferably a C3-C10 α-olefin, and more preferably propylene, 1-butene, 1-hexene or 1-octene.

In another embodiment, the functionalized olefin-based polymer is a hydroxyl functionalized olefin-based polymer, preferably a hydroxy functionalized ethylene-based polymer, and more preferably a hydroxy functionalized ethylene/α-olefin interpolymer. In a further embodiment, the α-olefin is a C3-C20 α-olefin, preferably a C3-C10 α-olefin, and more preferably propylene, 1-butene, 1-hexene or 1-octene.

In another embodiment, the functionalized olefin-based polymer is a hydroxyl functionalized olefin-based polymer, preferably a hydroxy functionalized ethylene-based polymer, and more preferably a hydroxy functionalized ethylene/α-olefin interpolymer. In a further embodiment, the α-olefin is a C3-C10 α-olefin, preferably a C3-C10 α-olefin, and more preferably propylene, 1-butene, 1-hexene or 1-octene.

In one embodiment, the functionalized ethylene-based polymer is an anhydride functionalized ethylene-based polymer, and preferably an anhydride functionalized ethylene/α-olefin interpolymer, that has a melt index ($I_2$) greater than, or equal to, 0.1 g/10 min, preferably greater than, or equal to, 0.5 g/10 min, and more preferably greater than, or equal to, 1 g/10 min, as determined using ASTM D-1238 (190° C., 2.16 kg load). In another embodiment, the functionalized ethylene-based polymer is an anhydride functionalized ethylene-based polymer, and preferably an anhydride functionalized ethylene/α-olefin interpolymer, that has a melt index ($I_2$) less than, or equal to, 50 g/10 min, preferably less than, or equal to, 20 g/10 min, and more preferably less than, or equal to, 10 g/10 min, as determined using ASTM D-1238 (190° C., 2.16 kg load).

In another embodiment, the functionalized ethylene-based polymer is an anhydride functionalized ethylene-based polymer, and preferably an anhydride functionalized ethylene/α-olefin interpolymer, that has a density greater than, or equal to, 0.84 g/cc, preferably greater than, or equal to, 0.85 g/cc, and more preferably greater than, 0.86 g/cc. In another embodiment, the functionalized ethylene-based polymer is an anhydride functionalized ethylene-based polymer, and preferably an anhydride functionalized ethylene/α-olefin interpolymer, that has a density less than, or equal to, 0.91 g/cc, preferably less than, or equal to, 0.90 g/cc, and more preferably less than, or equal to, 0.89 g/cc.

In another embodiment, the functionalized ethylene-based polymer is an anhydride functionalized ethylene-based polymer, and preferably an anhydride functionalized ethylene/α-olefin interpolymer, that has a density from 0.84 g/cc to 0.91 g/cc, preferably from 0.85 g/cc to 0.90 g/cc, and more preferably from 0.86 g/cc to 0.89 g/cc. All individual values and subranges from 0.84 g/cc to 0.91 g/cc are includes herein and disclosed herein.

2. Olefin-Based Polymers Used as Base Polymer for Functionalized Olefin-Based Polymer Examples of olefin-based polymers include high density polyethylene (HDPE), low density polyethylene (LDPE), linear low density polyethylene (LLDPE), linear ethylene/α-olefin interpolymers, substantially linear ethylene/α-olefin interpolymers, or olefin multi-block interpolymers.

Suitable base polymers also include polypropylene homopolymers and propylene copolymers, and other olefin-based polymers, such as those formed from one or more C4-C20 alpha-olefins. The olefin-based polymers may optionally contain copolymerizable conjugated dienes, non-conjugated dienes and/or vinyl monomers.

i) Ethylene-Base Polymers for Functionalized Olefin-Based Polymers

Preferred maleic anhydride grafted polymers include the Amplify™ polymers available from The Dow Chemical Company. Additional examples include FUSABOND (available from DuPont), EXXELOR (available from ExxonMobil), and POLYBOND (available from Chemtura).

In one embodiment, the maleic anhydride grafted polymer comprises from 0.3 weight percent to 1.5 weight percent grafted maleic anhydride, based on the total weight of the grafted polymer. In a further embodiment, the maleic anhydride grafted polymer is a maleic anhydride grafted ethylene-based polymer. In a further embodiment, the maleic anhydride grafted polymer is a maleic anhydride grafted ethylene/α-olefin interpolymer.

As discussed above, suitable ethylene-base polymers include, for example, high density polyethylene (HDPE), linear low density polyethylene (LLDPE), ultra low density polyethylene (ULDPE), homogeneously branched linear ethylene polymers, homogeneously branched substantially linear ethylene polymers (that is homogeneously branched long chain branched ethylene polymers), and ethylene or olefin multi-block interpolymers.

High density polyethylene (HDPE), useful as a polyolefin resin, typically has a density of about 0.94 to about 0.97 g/cc. Commercial examples of HDPE are readily available in the market. Other suitable ethylene polymers include low density polyethylene (LDPE), linear low density polyethylene (LLDPE), and linear very low density polyethylene (VLDPE). Typically the low density polyethylene (LDPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (ULDPE), homogeneously branched linear ethylene interpolymers, homogeneously branched substantially linear ethylene interpolymer, or olefin multi block interpolymers typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the C3-C20 α-olefins, more preferably C3-C10 α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

Overall, suitable ethylene polymers have a melt index, I2, less than, or equal to, 1500 g/10 min, preferably less than, or equal to, 1000 g/10 min, more preferably less than, or equal to, 500 g/10 min, even more preferably less than, or equal to, 100 g/10 min, and most preferably less than, or equal to, 50 g/10 min as measured in accordance with ASTM 1238, Condition 190° C./2.16 kg.

Commercial examples of suitable ethylene-base interpolymers include ENGAGE™, ATTANE™, AFFINITY™, DOWLEX™, ELITE™, all available from The Dow Chemical Company; EXCEED™ and EXAC™ available from Exxon Chemical Company; and TAFMER™ polymers available from the Mitsui Chemical Company.

The terms "homogeneous" and "homogeneously-branched" are used in reference to an ethylene/α-olefin interpolymer, in which the α-olefin comonomer is randomly distributed within a given polymer molecule, and substantially all of the polymer molecules have the same ethylene-to-comonomer ratio. The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein incorporated by reference. The substantially linear ethylene interpolymers are those in which the comonomer is randomly distributed within a given interpolymer molecule, and in which substantially all of the interpolymer molecules have the same ethylene/comonomer ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. The length of a long chain branch is longer than the carbon length of a short chain branch formed from the incorporation of one comonomer into the polymer backbone.

Some polymers may be substituted with 0.01 long chain branches per 1000 carbons to 1 long chain branch per 1000 carbons, or from 0.05 long chain branches per 1000 carbons to 1 long chain branch per 1000 carbons, or from 0.3 long chain branches per 1000 carbons to 1 long chain branch per 1000 carbons. Commercial examples of substantially linear polymers include the ENGAGE™ polymers and AFFINITY™ polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution ($M_w/M_n$ or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., 1989, C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The homogeneous branched ethylene polymers useful in the present invention will preferably have a single melting peak, as measured using differential scanning calorimetry (DSC), in contrast to heterogeneously branched linear ethylene polymers, which have two or more melting peaks, due to the heterogeneously branched polymer's broad branching distribution.

Homogeneously branched linear ethylene interpolymers are a known class of polymers which have a linear polymer backbone, no measurable long chain branching and a narrow molecular weight distribution. Such polymers are interpolymers of ethylene and at least one α-olefin comonomer of from 3 to 20 carbon atoms, and are preferably copolymers of ethylene with a C3-C10 α-olefin, and are more preferably copolymers of ethylene with propylene, 1-butene, 1-pentene, 1-hexene, 1-heptene or 1-octene, and even more preferably, propylene, 1-butene, 1-hexene or 1-octene.

This class of polymers is disclosed for example, by Elston in U.S. Pat. No. 3,645,992, and subsequent processes to produce such polymers using metallocene catalysts have been developed, as shown, for example, in EP 0 129 368, EP 0 260 999, U.S. Pat. No. 4,701,432; U.S. Pat. No. 4,937,301; U.S. Pat. No. 4,935,397; U.S. Pat. No. 5,055,438; and WO 90/07526, each incorporated herein by reference. The polymers can be made by conventional polymerization processes (for example, gas phase, slurry, solution, and high pressure).

In a preferred embodiment of the invention, an ethylene-based interpolymer is used as the base polymer in the grafting reaction. In a further embodiment, the ethylene-based interpolymer is an ethylene/α-olefin interpolymer, comprising at least one α-olefin. In another embodiment, the interpolymer further comprises at least one diene.

In one embodiment, the ethylene/α-olefin interpolymer has a molecular weight distribution ($M_w/M_n$) less than, or equal to, 10, and preferably less than, or equal to, 5. More preferably the ethylene/α-olefin interpolymers have a molecular weight distribution from 1.1 to 5, and more preferably from about 1.5 to 4, or 1.5 to 3. All individual values and subranges from about 1 to 5 are included herein and disclosed herein. In a further embodiment, the ethylene/α-olefin interpolymer is a homogeneously branched linear ethylene/α-olefin interpolymer or a homogeneously branched substantially linear ethylene/α-olefin interpolymer.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ α-olefin. Preferred comonomers include propene, 1-butene, 1-pentene, 1-hexene, 1-heptene and 1-octene, and more preferably include propene, 1-butene, 1-hexene and 1-octene.

Illustrative α-olefins include propylene, 1-butene, 1-pentene, 1-hexene, 4-methyl-1-pentene, 1-heptene, 1-octene, 1-nonene and 1-decene. The α-olefin is desirably a C3-C10 α-olefin. Preferably, the α-olefin is propylene, 1-butene, 1-hexene or 1-octene. Illustrative interpolymers include ethylene/propylene (EP) copolymers, ethylene/butene (EB) copolymers, ethylene/hexene (EH) copolymers, ethylene/octene (EO) copolymers, ethylene/α-olefin/diene modified (EAODM) interpolymers, such as ethylene/propylene/diene modified (EPDM) interpolymers and ethylene/propylene/octene terpolymers. Preferred copolymers include EP, EB, EH and EO polymers.

Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

In another embodiment, the ethylene/α-olefin interpolymer has a melt index ($I_2$) from 0.01 g/10 min to 1500 g/10 min, preferably from 0.1 g/10 min to 1000 g/10 min, and more preferably from 0.5 g/10 min to 500 g/10 min, or from 1 g/10 min to 100 g/10 min, as determined using ASTM D-1238 (190° C., 2.16 kg load). All individual values and subranges from 0.01 g/10 min to 1500 g/10 min are includes herein and disclosed herein.

In another embodiment, the ethylene/α-olefin interpolymer has a percent crystallinity of less than, or equal to, 60 percent, preferably less than, or equal to, 50 percent, and more preferably less than, or equal to, 40 percent, as measured by DSC. Preferably, these polymers have a percent crystallinity from 2 percent to 60 percent, including all individual values and subranges from 2 percent to 60 percent. Such individual values and subranges are disclosed herein.

In another embodiment, the ethylene/α-olefin interpolymer has a density less than, or equal to, 0.93 g/cc, preferably less than, or equal to, 0.92 g/cc, and more preferably less than, or equal to, 0.91 g/cc. In another embodiment, the ethylene/α-olefin interpolymer has a density greater than, or equal to, 0.85 g/cc, preferably greater than, or equal to, 0.86 g/cc, and more preferably greater than, or equal to, 0.87 g/cc.

In another embodiment, the ethylene/α-olefin interpolymer has a density from 0.85 g/cm$^3$ to 0.93 g/cm$^3$, and preferably from 0.86 g/cm$^3$ to 0.92 g/cm$^3$, and more preferably from 0.87 g/cm$^3$ to 0.91 g/cm$^3$. All individual values and subranges from 0.85 g/cm$^3$ to 0.93 g/cm$^3$ are included herein and disclosed herein.

In another embodiment, the ethylene/α-olefin interpolymer has a PRR greater than, or equal to, 4, preferably greater than, or equal to, 8, as described below.

Interpolymer viscosity is conveniently measured in poise (dyne-second/square centimeter (d-sec/cm$^2$)) at shear rates within a range of 0.1-100 radian per second (rad/sec), and at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as $V_{0.1}$ and $V_{100}$, with a ratio of the two referred to as RR and expressed as $V_{0.1}/V_{100}$.

The PRR value is calculated by the formula: PRR=RR+[3.82−interpolymer Mooney Viscosity ($ML_{1+4}$ at 125° C.)]×0.3. PRR determination is described in U.S. Pat. No. 6,680,361, fully incorporated herein by reference.

In a one embodiment, the ethylene/α-olefin interpolymer has a PRR from 1 to 70, or from 4 to 70. In another embodiment, the ethylene/α-olefin interpolymer has a PRR from 4 to 70, or from 8 to 70. In another embodiment, the ethylene/α-olefin interpolymer has a PRR from 12 to 60, preferably from 15 to 55, and most preferably from 18 to 50. Current commercial ethylene/α-olefin interpolymers, having normal levels of LCB, typically have PRR values less than 3. In another embodiment, the ethylene/α-olefin interpolymer has a PRR less than 3, and preferably less than 2. In another embodiment, the ethylene/α-olefin interpolymers have a PRR from −1 to 3, preferably from 0.5 to 3, and more preferably from 1 to 3. All individual PRR values and subranges from −1 to 70 are included herein and disclosed herein.

T-type branching is typically obtained by copolymerization of ethylene, or other alpha olefins, with chain end unsaturated macromonomers, in the presence of a constrained geometry catalyst, under the appropriate reactor conditions, such as those described in WO 00/26268, and equivalent U.S. Pat. No. 6,680,361, which are fully incorporated herein by reference. As discussed in WO 00/26268, as the level of T-type branching increases, the efficiency or throughput of the manufacturing process decreases significantly, until the point is reached where production becomes economically unviable. T-type LCB polymers can be produced by metallocene catalysts, without measurable gels, but with very high levels of T-type LCB. Because the macromonomer being incorporated into the growing polymer chain has only one reactive unsaturation site, the resulting polymer only contains side chains of varying lengths, and at different intervals along the polymer backbone.

H-type branching is typically obtained by copolymerization of ethylene, or other alpha olefins, with a diene having two double bonds, reactive with a nonmetallocene type of catalyst in the polymerization process. As the name implies, the diene attaches one polymer molecule to another polymer molecule through the diene bridge, the resulting polymer molecule resembling an "H," which might be described as more of a crosslink, than a long chain branch. H-type branching is typically used when extremely high levels of branching are desired. If too much diene is used, the polymer molecule can form too much branching or crosslinking, causing the polymer molecule to become insoluble in the reaction solvent (in a solution process), and thus, causing the polymer molecule to fall out of solution, resulting in the formation of gel particles in the polymer.

Additionally, use of H-type branching agents may deactivate metallocene catalysts and reduce catalyst efficiency. Thus, when H-type branching agents are used, the catalysts used, are typically not metallocene catalysts. The catalysts used to prepare the H-type branched polymers in U.S. Pat. No. 6,372,847 are vanadium type catalysts.

T-type LCB polymers are disclosed in U.S. Pat. No. 5,272,236, in which the degree of LCB is from 0.01 LCB/1000 carbon atoms to 3 LCB/1000 carbon atoms, and in which the catalyst is a constrained geometry catalyst. According to P. Doerpinghaus and D. Baird, in *The Journal of Rheology*, 47(3), pp 717-736 May/June 2003, "Separating the Effects of Sparse Long-Chain Branching on Rheology from Those Due to Molecular Weight in Polyethylenes," free radical processes, such as those used to prepare low density polyethylene (LDPE), produce polymers having extremely high levels of LCB. For example, the resin NA952, in Table I of Doerpinghaus and Baird, is a LDPE prepared by a free radical process, and, according to Table II, contains 3.9 LCB/1000 carbon atoms. Ethylene alpha olefins (ethylene-octene copolymers), available from The Dow Chemical Company (Midland, Mich., USA), that are considered to have average levels of LCB, include resins Affinity PL1880 and Affinity PL1840 of Tables I and II, respectively, and contain 0.018 and 0.057 LCB/1000 carbon atoms.

In one embodiment of the invention, the ethylene/α-olefin component has T-type LCB levels greatly exceeding that of current, commercially available ethylene/α-olefin. Table 1A lists the LCB levels of various types of ethylene/α-olefin interpolymers useful in the invention. In another embodiment, the ethylene/α-olefin interpolymers have a PRR greater than, or equal to 4.

In another embodiment, the ethylene/α-olefin interpolymers have a PRR greater than, or equal to 4, preferably greater than, or equal to 8, and a molecular weight distribution (MWD) of 1.1 to 5, preferably from 1.5 to 4.5, more preferably 1.8 to 3.8 and most preferably 2.0 to 3.4. All individual values and subranges from 1.1 to 5 are included herein and disclosed herein. In a further embodiment, the ethylene/α-olefin interpolymers have a density less than, or equal to, 0.93 g/cc, preferably less than, or equal to, 0.92 g/cc, and more preferably less than, or equal to, 0.91 g/cc. In another embodiment, the ethylene/α-olefin interpolymers have a density greater than, or equal to, 0.86 g/cc, preferably greater than, or equal to, 0.87 g/cc, and more preferably greater than, or equal to, 0.88 g/cc. In another embodiment, the ethylene/α-olefin interpolymers have a density from 0.86 g/cc to 0.93 g/cc, and all individual values and subranges from 0.86 g/cc to 0.93 g/cc are included herein and disclosed herein.

In another embodiment, the ethylene/α-olefin interpolymers have a PRR greater than, or equal to 4, preferably greater than, or equal to 8, and a melt index, I2, greater than, or equal to, 0.1 g/10 min, preferably greater than, or equal to, 0.5 g/10 min, or greater than or equal to 1.0 g/10 min. In another embodiment, the ethylene/α-olefin interpolymers have a melt index, I2, less than, or equal to, 30 g/10 min, preferably less than, or equal to, 25 g/10 min, and more preferably less than, or equal to 20 g/10 min. In another embodiment, the ethylene/α-olefin interpolymers have a melt index, I2, from 0.1 g/10 min to 30 g/10 min, preferably from 0.1 g/10 min to 20 g/10 min, and more preferably from 0.1 g/10 min to 15 g/10 min. All individual values and subranges from 0.1 g/10 min to 30 g/10 min are included herein and disclosed herein.

Ethylene/α-olefin interpolymers suitable for the invention can be made by the process described in U.S. Pat. No. 6,680,361 (see also WO 00/26268). A representative list of suitable interpolymers is shown in Table 1A below. The EAO-1, EAO-2-1, EAO-8 and EAO-9 were prepared by the procedure described in WO 00/26268, using a mixed catalyst system described in U.S. Pat. No. 6,369,176 fully incorporated herein by reference. EAO-7-1 was prepared in dual reactors by the procedure described in WO 00/26268. EAO-E-A was prepared as described in U.S. Pat. Nos. 5,272,236 and 5,278,272. U.S. Pat. Nos. 5,272,236; 5,278,272; 6,680,361: and 6,369,176 are each fully incorporated herein by reference.

TABLE 1A

Ethylene/α-Olefin Interpolymers

| EAO | Mooney Viscosity | MLRA/MV | PRR | Comonomer(s) | Wt % Ethylene | Density g/cc |
|---|---|---|---|---|---|---|
| T-Branches (Low Levels) | | | | | | |
| EAO-A | 26.2 | 0.3 | −2.9 | butene | | |
| EAO-B | 48.6 | 1.2 | −5.5 | butene | | |
| T-Branches (Low to Commercial Levels) | | | | | | |
| EAO-C | 21.5 | 0.8 | 0.6 | octene | | |
| EAO-D | 34.4 | 1.2 | −0.8 | octene | | |
| EAO-E | 34.1 | 1.2 | −0.5 | octene | | |
| EAO-E-A | 32 | | 0 | octene | 58 | 0.86 |
| EAO-F | 18.3 | 0.6 | −0.5 | butene | | |
| T-Branches (High Levels) | | | | | | |
| EAO-1 | 40.1 | 3.8 | 29 | butene | 87 | 0.90 |
| EAO-2 | 27 | 2.8 | 22 | butene | | |
| EAO-2-1 | 26 | | 19 | butene | 87 | 0.90 |
| EAO-3 | 36.8 | 2.4 | 15 | butene | | |
| EAO-4 | 17.8 | 2.3 | 12 | butene | | |
| EAO-5 | 15.7 | 2.0 | 10 | butene | | |
| EAO-6 | 37.1 | 7.6 | 70 | propylene | | |
| EAO-7 | 17.4 | 3.4 | 26 | 69.5 wt % ethylene/ 30 wt % propylene/ 0.5% ENB | 69.5 | |
| EAO-7-1 | 20 | | 21 | propylene/diene | 69.5 | 0.87 |
| EAO-8 | 26 | | 45 | propylene | 70 | 0.87 |
| EAO-9 | 30 | | 17 | octene | 70 | 0.88 |
| H-Branches | | | | | | |
| EAO-G | 24.5 | 10.9 | | 76.8 wt % ethylene/ 22.3 wt % propylene/ 0.9% ENB | | |
| EAO-H | 27 | 7.1 | 72 | 72 wt % ethylene/ 22 wt % propylene/ 6% hexadiene | | |

TABLE 1A-continued

Ethylene/α-Olefin Interpolymers

| EAO | Mooney Viscosity | MLRA/MV | PRR | Comonomer(s) | Wt % Ethylene | Density g/cc |
|---|---|---|---|---|---|---|
| EAO-I | 50.4 | 7.1 | | 71 wt % ethylene/ 23 wt % propylene/ 6% hexadiene | | |
| EAO-J | 62.6 | 8.1 | 55 | 71 wt % ethylene/ 23 wt % propylene/ 6% hexadiene | | |

Mooney viscosity: $ML_{1+4}$ at 125° C.

An ethylene-based polymer may have a combination of two or more embodiments as described herein.

An ethylene/α-olefin interpolymer may have a combination of two or more embodiments as described herein.

ii) Propylene-Based Polymers for Functionalized Olefin-Based Polymers

Suitable propylene-based interpolymers include propylene homopolymers, propylene interpolymers, as well as reactor copolymers of polypropylene (RCPP), which can contain about 1 to about 20 weight percent ethylene or an α-olefin comonomer of 4 to 20 carbon atoms. The propylene interpolymer can be a random or block copolymer, or a propylene-based terpolymer.

Suitable comonomers for polymerizing with propylene include ethylene, 1-butene, 1-pentene, 1-hexene, 1-heptene, 1-octene, 1-nonene, 1-decene, 1-unidecene, 1dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

Optionally, the propylene-based polymer comprises a monomer having at least two double bonds which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

The propylene interpolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable polypropylenes are formed by means within the skill in the art, for example, using single site catalysts (metallocene or constrained geometry) or Ziegler Natta catalysts. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Shell's KF 6100 homopolymer polypropylene; Solvay's KS 4005 polypropylene copolymer; Solvay's KS 300 polypropylene terpolymer; and INSPIRE™ polymers and VERSIFY™ polymers, both available from The Dow Chemical Company.

Preferably, the propylene-based polymer has a melt flow rate (MFR) in the range of 0.01 to 2000 g/10 min, more preferably in range of 0.1 to 1000 g/10 min, and more preferably 0.5 to 500 g/10 min, and even more preferably 1 to 100 g/10 min, as measured in accordance with ASTM D 1238 at 230° C./2.16 kg.

In another embodiment, the propylene/α-olefin interpolymer has a melt flow rate (MFR) in the range of 0.01 to 300 grams/10 minutes, more preferably in range of 0.1 to 200 grams/10 minutes, more preferably from 0.5 to 100 grams/10 min, or from 1 to 50 grams/10 min, as measured in accordance with ASTM D 1238 at 230° C./2.16 kg. All individual values and subranges from 0.01 to 300 grams/10 min are included herein and disclosed herein.

The propylene-based polymer used in the present invention may be of any molecular weight distribution (MWD). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

A suitable branched propylene-based polymers for use in the present invention are commercially available, for instance from Montell North America, under the trade designations Profax PF-611 and PF-814. Alternatively, suitable branched or coupled propylene-based polymers can be prepared by means, within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents). Each of these patents/applications is incorporated herein by reference.

Other suitable propylene-based polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

In one embodiment, the functionalized propylene-based polymer is formed from a coupled propylene-based polymer, and preferably an azide coupled propylene homopolymer. In a further embodiment, the azide coupled propylene homopolymer has a melt flow rate (MFR) from 1 to 100 g/10 min, preferably from 10 to 50 g/10 min, and more preferably from 20 to 40 g/10 min (ASTM D 1238 at 230° C./2.26 kg). In another embodiment, the functionalized propylene-based polymer is a functionalized propylene homopolymer with a melt flow rate (MFR) from 50 to 500 g/10 min, preferably from 80 to 450 g/10 min (ASTM D 1238 at 230° C./2.26 kg).

In a preferred embodiment of the invention, a propylene-based interpolymer is used as the base polymer in the grafting reaction. In a further embodiment, the propylene-based interpolymer is a propylene/α-olefin interpolymer, comprising at least one α-olefin. In another embodiment, the interpolymer further comprises at least one diene. In another embodiment, the propylene-based interpolymer is a propylene/ethylene interpolymer.

Preferred comonomers include, but are not limited to, ethylene, isobutylene, 1-butene, 1-pentene, 1-hexene, 3-methyl-1-pentene, 4-methyl-1-pentene, 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the comonomer is an ethylene or a $C_4$-$C_{20}$ α-olefin. Preferred comonomers include ethylene, 1-butene, 1-pentene, 1-hexene, 1-heptene and 1-octene, and more preferably include ethylene, 1-butene, 1-hexene and 1-octene.

In another embodiment, the propylene-based polymer is a propylene/α-olefin interpolymer, which has a molecular weight distribution less than, or equal to, 5, and preferably less than, or equal to, 4, and more preferably less than, or equal to 3. More preferably the propylene/α-olefin interpolymer has a molecular weight distribution from 1.1 to 5, and more preferably from 1.5 to 4.5, and more preferably from 2 to 4. In another embodiment, the molecular weight distribution is less than 3.5, preferably less than 3.0, more preferably less than 2.8, more preferably less than 2.5, and most preferably less than 2.3. All individual values and subranges from about 1 to 5 are included herein and disclosed herein.

In another embodiment, the propylene/α-olefin interpolymer has a melt flow rate (MFR) less than, or equal to 2000 g/10 min, preferably less than, or equal to 1000 g/10 min, and more preferably less than, or equal to 500 g/10 min, and even more preferably less than, or equal to 100 g/10 min, as measured in accordance with ASTM D 1238 at 230° C./2.16 kg. In another embodiment, propylene/α-olefin interpolymer has a melt flow rate (MFR) greater than, or equal to 0.01 g/10 min, preferably greater than, or equal to 0.1 g/10 min, more preferably greater than, or equal to 0.5 g/10 min, or greater than, or equal to 1 g/10 min, as measured in accordance with ASTM D 1238 at 230° C./2.16 kg.

In another embodiment, the propylene/α-olefin interpolymer has a melt flow rate (MFR) in the range of 0.01 to 2000 grams/10 minutes, more preferably in range of 0.1 to 1000 grams/10 minutes, more preferably from 0.5 to 500 grams/10 min, or from 1 to 100 grams/10 min, as measured in accordance with ASTM D 1238 at 230° C./2.16 kg. All individual values and subranges from 0.01 to 2000 grams/10 min are included herein and disclosed herein.

In another embodiment, the propylene/α-olefin interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In another embodiment, the propylene/α-olefin interpolymer has a density less than, or equal to, 0.90 g/cc, preferably less than, or equal to, 0.89 g/cc, and more preferably less than, or equal to, 0.88 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 g/cc.

In another embodiment, the propylene/α-olefin interpolymer has a density from 0.83 g/cm$^3$ to 0.90 g/cm$^3$, and preferably from 0.84 g/cm$^3$ to 0.89 g/cm$^3$, and more preferably from 0.85 g/cm$^3$ to 0.88 g/cm$^3$. All individual values and subranges from 0.83 g/cm$^3$ to 0.90 g/cm$^3$, are included herein and disclosed herein.

In another embodiment, the propylene-based polymer is a propylene/ethylene interpolymer, which has a molecular weight distribution less than, or equal to, 5, and preferably less than, or equal to, 4, and more preferably less than, or equal to 3. More preferably the propylene/ethylene interpolymer has a molecular weight distribution from 1.1 to 5, and more preferably from 1.5 to 4.5, and more preferably from 2 to 4. In another embodiment, the molecular weight distribution is less than about 3.5, preferably less than 3.0, more preferably less than 2.8, more preferably less than 2.5, and most preferably less than 2.3. All individual values and subranges from about 1 to 5 are included herein and disclosed herein.

In another embodiment, the propylene/ethylene interpolymer has a melt flow rate (MFR) less than, or equal to 2000 g/10 min, preferably less than, or equal to 1000 g/10 min, and more preferably less than, or equal to 500 g/10 min, and even more preferably less than, or equal to 100 g/10 min, as measured in accordance with ASTM D 1238 at 230° C./2.16 kg. In another embodiment, propylene/α-olefin interpolymer has a melt flow rate (MFR) greater than, or equal to 0.01 g/10 min, preferably greater than, or equal to 0.1 g/10 min, more preferably greater than, or equal to 0.5 g/10 min, or greater than, or equal to 1 g/10 min, as measured in accordance with ASTM D 1238 at 230° C./2.16 kg.

In another embodiment, the propylene/ethylene interpolymer has a melt flow rate (MFR) in the range of 0.01 to 2000 grams/10 minutes, more preferably in range of 0.1 to 1000 grams/10 minutes, more preferably from 0.5 to 500 grams/10 min, or from 1 to 100 grams/10 min, as measured in accordance with ASTM D 1238 at 230° C./2.16 kg. All individual values and subranges from 0.01 to 2000 grams/10 min are included herein and disclosed herein.

In another embodiment, the propylene/ethylene interpolymer has a melt flow rate (MFR) in the range from 0.01 to 300 grams/10 minutes, more preferably in range from 0.1 to 200 grams/10 minutes, more preferably from 0.5 to 100 grams/10 min, or from 1 to 50 grams/10 min, as measured in accordance with ASTM D 1238 at 230° C./2.16 kg. All individual values and subranges from 0.01 to 300 grams/10 min are included herein and disclosed herein.

In another embodiment, the propylene/ethylene interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In another embodiment, the propylene/ethylene interpolymer has a density less than, or equal to, 0.90 g/cc, preferably less than, or equal to, 0.89 g/cc, and more preferably less than, or equal to, 0.88 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 g/cc.

In another embodiment, the propylene/ethylene interpolymer has a density from 0.83 $g/cm^3$ to 0.90 $g/cm^3$, and preferably from 0.84 $g/cm^3$ to 0.89 $g/cm^3$, and more preferably from 0.85 $g/cm^3$ to 0.88 $g/cm^3$. All individual values and subranges from 0.83 $g/cm^3$ to 0.90 $g/cm^3$, are included herein and disclosed herein.

In one embodiment, the propylene-based polymers comprise units derived from propylene in an amount of at least about 60, preferably at least about 80 and more preferably at least about 85, weight percent of the interpolymer (based on the total weight of polymerizable monomers). The typical amount of units derived from ethylene in propylene/ethylene copolymers is at least about 0.1, preferably at least about 1 and more preferably at least about 5 weight percent, and the maximum amount of units derived from ethylene present in these copolymers is typically not in excess of about 35, preferably not in excess of about 30 and more preferably not in excess of about 20, weight percent of the copolymer (based on the total weight of polymerizable monomers). The amount of units derived from an additional unsaturated comonomer(s), if present, is typically at least about 0.01, preferably at least about 1 and more preferably at least about 5, weight percent, and the typical maximum amount of units derived from the unsaturated comonomer(s) typically does not exceed about 35, preferably it does not exceed about 30 and more preferably it does not exceed about 20, weight percent of the interpolymer (based on the total weight of polymerizable monomers). The combined total of units derived from ethylene and any unsaturated comonomer typically does not exceed about 40, preferably it does not exceed about 30, and more preferably it does not exceed about 20, weight percent of the interpolymer (based on the total weight of polymerizable monomers).

In another embodiment, the propylene-based polymers comprise propylene and one or more unsaturated comonomers, other than ethylene, also typically comprise units derived from propylene in an amount of at least about 60, preferably at least about 70 and more preferably at least about 80, weight percent of the interpolymer (based on the total weight of polymerizable monomers). The one or more unsaturated comonomers of the inerpolymer comprise at least about 0.1, preferably at least about 1, and more preferably at least about 3, weight percent, and the typical maximum amount of unsaturated comonomer does not exceed about 40, and preferably it does not exceed about 30, weight percent of the interpolymer (based on the total weight of polymerizable monomers).

In one embodiment, the propylene-based polymers are made using a metal-centered, heteroaryl ligand catalyst in combination with one or more activators, e.g., an alumoxane. In certain embodiments, the metal is one or more of hafnium and zirconium. More specifically, in certain embodiments of the catalyst, the use of a hafnium metal has been found to be preferred as compared to a zirconium metal for heteroaryl ligand catalysts. The catalysts in certain embodiments are compositions comprising the ligand and metal precursor, and, optionally, may additionally include an activator, combination of activators or activator package.

The catalysts used to make the propylene-based polymers additionally include catalysts comprising ancillary ligand-hafnium complexes, ancillary ligand-zirconium complexes and optionally activators, which catalyze polymerization and copolymerization reactions, particularly with monomers that are olefins, diolefins or other unsaturated compounds. Zirconium complexes, and hafnium complexes can be used. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric, or of an even higher order. Suitable catalyst structures and associated ligands are described in U.S. Pat. No. 6,919,407, column 16, line 6 to column 41, line 23, which is incorporated herein by reference. In a further embodiment, the propylene-based polymer comprises at least 50 weight percent propylene (based on the total amount of polymerizable monomers) and at least 5 weight percent ethylene (based on the total amount of polymerizable monomer), and has $^{13}C$ NMR peaks, corresponding to a region error, at about 14.6 and 15.7 ppm, and the peaks are of about equal intensity (for example, see U.S. Pat. No. 6,919,407, column 12, line 64 to column 15, line 51, incorporated herein by reference).

The propylene-based polymers can be made by any convenient process. In one embodiment, the process reagents, i.e., (i) propylene, (ii) ethylene and/or one or more unsaturated comonomers, (iii) catalyst, and, (iv) optionally, solvent and/or a molecular weight regulator (e.g., hydrogen), are fed to a single reaction vessel of any suitable design, for example, stirred tank, loop, or fluidized-bed. The process reagents are contacted within the reaction vessel under appropriate conditions (e.g., solution, slurry, gas phase, suspension, high pressure) to form the desired polymer, and then the output of the reactor is recovered for post-reaction processing. All of the output from the reactor can be recovered at one time (as in the case of a single pass or batch reactor), or it can be recovered in the form of a bleed stream, which forms only a part, typically a minor part, of the reaction mass (as in the case of a continuous process reactor, in which an output stream is bled from the reactor, at the same rate at which reagents are added to maintain the polymerization at steady-state conditions). "Reaction mass" means the contents within a reactor, typically during, or subsequent to, polymerization. The reaction mass includes reactants, solvent (if any), catalyst, and products and by-products. The recovered solvent and unreacted monomers can be recycled back to the reaction vessel. Suitable polymerization conditions are described in U.S. Pat. No. 6,919,407, column 41, line 23 to column 45, line 43, incorporated herein by reference.

A propylene-based polymer may have a combination of two or more embodiments as described herein.

A propylene/α-olefin interpolymer may have a combination of two or more embodiments as described herein.

A propylene/ethylene interpolymer may have a combination of two or more embodiments as described herein.

iii) Olefin Multi-Block Interpolymer for Functionalized Olefin-Based Polymer

Olefin multi-block interpolymers, and preferably copolymers, as described herein may also be as the base polymer for the functionalized olefin-based polymer.

iv) Olefin-Based Polymer Blends for Functionalized Olefin-Based Polymer

In one embodiment of the invention, a blend of two of more functionalized olefin-based polymers may be used as the functionalized olefin-based polymer component, such as, for example, a blend of a functionalized ethylene-base polymer, as described herein, and a functionalized propylene-base polymer, as described herein.

In another embodiment, a blend of one or more functionalized olefin-based polymers, for example as described herein, and one or more functionalized olefin multi-block interpolymers, for example as described herein, may be used.

In one embodiment, a functionalized ethylene-based polymer, as described herein, may be blended with a functionalized olefin multi-block interpolymer as described herein.

In another embodiment, a functionalized propylene-based polymer, as described herein, may be blended with a functionalized olefin multi-block interpolymer, as described herein. In another embodiment, a functionalized ethylene-based polymer, as described herein, and a functionalized propylene-based polymer, as described herein, may be blended with a functionalized olefin multi-block interpolymer, as described herein.

3. Grafting Agents and Initiators for Functionalized Olefin-Based Polymers

The olefin-based polymers disclosed herein may be modified by typical grafting, hydrogenation, nitrene insertion reactions, or other functionalization reactions, well known to those skilled in the art. Preferred functionalizations are grafting reactions using a free radical mechanism.

A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxymethyltrimethoxysilane, methacryloxymethyltriethoxysilane; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride.

Mixtures of radically graftable species that comprise at least one of the above species may be used, with styrene/maleic anhydride and styrene/acrylonitrile as illustrative examples.

A thermal grafting process is one method for reaction, however, other grafting processes may be used, such as photo initiation, including different forms of radiation, e-beam, or redox radical generation.

Functionalization may occur via a free radical mechanism but may also occur at the terminal unsaturated group (e.g., vinyl group) or an internal unsaturation group, when such groups are present in the polymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether, silane, siloxane, and so on, or functional unsaturated compounds, such as maleic anhydride, can be added across a terminal or internal unsaturation via known chemistry. Other functionalization methods include those disclosed in the following U.S. Pat. Nos. 5,849,828, entitled, "Metalation and Functionalization of Polymers and Copolymers;" 5,814,708, entitled, "Process for Oxidative Functionalization of Polymers Containing Alkylstyrene;" and 5,717,039, entitled, "Functionalization of Polymers Based on Koch Chemistry and Derivatives Thereof." Each of these patents is incorporated by reference, herein, in its entirety.

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed below. Also shown below, are the respective chemical structures and the theoretical radical yields. The theoretical radical yield is the theoretical number of free radicals that are generated per mole of initiator.

| Initiator Name | Initiator Structure | Theoretical Radical Yield |
| --- | --- | --- |
| Benzoyl peroxide | ![structure] | 2 |
| Lauroyl peroxide | $CH_3(CH_2)_{10}C(O)-O-O-C(O)(CH_2)_{10}CH_3$ | 2 |
| Dicumyl peroxide | ![structure] | 2 |
| t-Butyl α-cumyl peroxide | ![structure] | 2 |
| Di-t-butyl peroxide | ![structure] | 2 |
| Di-t-amyl peroxide | ![structure] | 2 |
| t-Butyl peroxybenzoate | ![structure] | 2 |
| t-Amyl peroxybenzoate | ![structure] | 2 |
| 1,1-Bis(t-butylperoxy)-3,3,5-trimethylcyclohexane | ![structure] | 4 |
| α,α'-Bis(t-butylperoxy)-1,3-diisopropylbenzene | ![structure] | 4 |
| α,α'-Bis(t-butylperoxy)-1,4-diisopropylbenzene | ![structure] | 4 |
| 2,5-Bis(t-butylperoxy)-2,5-dimethylhexane | ![structure] | 4 |

| Initiator Name | Initiator Structure | Theoretical Radical Yield |
|---|---|---|
| 2,5-Bis(t-butylperoxy)-2,5-dimethyl-3-hexyne | $H_3C-\underset{\underset{CH_3}{\mid}}{\overset{\overset{CH_3}{\mid}}{C}}-O-O-\underset{\underset{CH_3}{\mid}}{\overset{\overset{CH_3}{\mid}}{C}}-C\equiv C-\underset{\underset{CH_3}{\mid}}{\overset{\overset{CH_3}{\mid}}{C}}-O-O-\underset{\underset{CH_3}{\mid}}{\overset{\overset{CH_3}{\mid}}{C}}-CH_3$ | 4 |

In one embodiment, the invention provides olefin-based polymers grafted with maleic anhydride. The grafted maleic anhydride olefin interpolymer may or may not contain small amounts of hydrolysis product and/or other derivatives. In one embodiment, the grafted maleic anhydride olefin interpolymers have a molecular weight distribution from about 1 to 7, preferably from 1.5 to 6, and more preferably from 2 to 5. All individual values and subranges from about 1 to 7 are included herein and disclosed herein.

In another embodiment, the grafted maleic anhydride olefin-based polymers have density from 0.855 g/cc to 0.955 g/cc, preferably from 0.86 g/cc to 0.90 g/cc, and more preferably from 0.865 g/cc to 0.895 g/cc. All individual values and subranges from 0.84 g/cc to 0.955 g/cc are included herein and disclosed herein.

In another embodiment, the amount of maleic anhydride used in the grafting reaction is less than, or equal to, 10 phr (parts per hundred, based on the weight of the olefin interpolymer), preferably less than 5 phr, and more preferably from 0.5 to 10 phr, and even more preferably from 0.5 to 5 phr. All individual values and subranges from 0.05 phr to 10 phr are included herein and disclosed herein.

In another embodiment, the amount of initiator used in the grafting reaction is less than, or equal to, 10 millimoles radicals per 100 grams olefin interpolymer, preferably, less than, or equal to, 6 millimoles radicals per 100 grams olefin interpolymer, and more preferably, less than, or equal to, 3 millimoles radicals per 100 grams olefin interpolymer. All individual values and subranges from 0.01 millimoles to 10 millimoles radicals per 100 grams olefin interpolymer are included herein and disclosed herein.

In another embodiment, the amount of maleic anhydride constituent grafted on the polyolefin chain is greater than 0.05 weight percent (based on the weight of the olefin interpolymer), as determined by titration analysis, FTIR analysis, or any other appropriate method. In a further embodiment, this amount is greater than 0.25 weight percent, and in yet a further embodiment, this amount is greater than 0.5 weight percent. In a preferred embodiment, 0.5 weight percent to 2.0 weight percent of maleic anhydride is grafted. All individual values and subranges greater than 0.05 weight percent are considered within the scope of this invention, and are disclosed herein.

The maleic anhydride, as well as many other unsaturated heteroatom containing species, may be grafted to the polymer by any conventional method, typically in the presence of a free radical initiator, for example the peroxide and azo classes of compounds, etc., or by ionizing radiation. Organic initiators are preferred, such as any one of the peroxide initiators, such as, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. A suitable azo compound is 2,2'-azobis(isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated polymer. For example, the degree of maleic anhydride/succinic anhydride, their oligomers, and their derivatives, including hydrolysis products, grafted onto the grafted polymer may be influenced by the aforementioned considerations. Additionally, the degree and type of branching, and the amount of crosslinking, may also be influenced by the reaction conditions and concentrations. In general, it is preferred that crosslinking during the maleation process be minimized. The composition of the base olefin interpolymer may also play a role in the final structure of the maleated polymer. The resulting structure, will in turn, affect the properties and use of the final product. Typically, the amount of initiator and maleic anhydride employed will not exceed that, which is determined to provide the desired level of maleation and desired melt flow, each required for the functionalized polymer and its subsequent use.

The grafting reaction should be performed under conditions that maximize grafts onto the polymer backbone, and minimize side reactions, such as the homopolymerization of the grafting agent, which is not grafted to the olefin interpolymer. It is not unusual that some fraction of the maleic anhydride (and/or its derivatives) does not graft onto the olefin interpolymer, and it is generally desired that the unreacted grafting agent be minimized. The grafting reaction may be performed in the melt, in solution, in the solid-state, in a swollen-state, and the like. The maleation may be performed in a wide-variety of equipments, such as, but not limited to, twin screw extruders, single screw extruders, Brabenders, batch reactors, and the like.

Preferred maleic anhydride grafted polymers include the AMPLIFY™ polymers available from The Dow Chemical Company. Additional examples include FUSABOND (available from DuPont), EXXELOR (available from ExxonMobil), and POLYBOND (available from Chemtura).

In one embodiment, the maleic anhydride grafted polymer comprises from 0.3 weight percent to 1.5 weight percent grafted maleic anhydride, based on the total weight of the grafted polymer. In a further embodiment, the maleic anhydride grafted polymer is a maleic anhydride grafted ethylene-based polymer. In a further embodiment, the maleic anhydride grafted polymer is a maleic anhydride grafted ethylene/α-olefin interpolymer.

Additional embodiments of the invention provide for olefin interpolymers grafted with other carbonyl-containing compounds. In one embodiment, these grafted olefin interpolymers may have molecular weight distributions and/or densities the same as, or similar to, those described above for the grafted maleic anhydride olefin interpolymers. In another embodiment, these grafted olefin interpolymers are prepared using the same or similar amounts of grafting compound and initiator as those used for the grafted maleic anhydride olefin interpolymers, as described above. In another embodiment, these grafted olefin interpolymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

Additional embodiments of the invention provide for olefin interpolymers grafted with other carbonyl-containing compounds. In one embodiment, these grafted olefin interpolymers may have molecular weight distributions and/or densities the same as, or similar to, those described above for the grafted maleic anhydride olefin interpolymers. In another embodiment, these grafted olefin interpolymers are prepared using the same or similar amounts of grafting compound and initiator as those used for the grafted maleic anhydride olefin interpolymers, as described above. In another embodiment, these grafted olefin interpolymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

In one embodiment, the invention provides olefin-based interpolymers grafted with at least one silane compound. The grafted silane olefin interpolymer may or may not contain small amounts of hydrolysis product and/or other derivatives.

In another embodiment, the silane-grafted olefin-based interpolymers have a molecular weight distribution from about 1 to 7, preferably from 1.5 to 6, and more preferably from 2 to 5. All individual values and subranges from about 1 to 7 are included herein and disclosed herein.

In another embodiment, the silane-grafted olefin-based interpolymers have density from 0.855 g/cc to 0.955 g/cc, and preferably from 0.86 g/cc to 0.90 g/cc, and more preferably from 0.865 g/cc to 0.895 g/cc. All individual values and subranges from 0.84 g/cc to 0.955 g/cc are included herein and disclosed herein.

In another embodiment, the amount of silane used in the grafting reaction is greater than, or equal to, 0.05 phr (based on the amount of the olefin interpolymer), more preferably, from 0.5 phr to 6 phr, and even more preferably, from 0.5 phr to 4 phr. All individual values and subranges from 0.05 phr to 6 phr are included herein and disclosed herein.

In another embodiment, the amount of amount of initiator used in the grafting reaction is less than, or equal to, 4 millimoles radicals per 100 grams olefin interpolymer, preferably, less than or equal to, 2 millimoles radicals per 100 grams olefin interpolymer, and more preferably, less than, or equal to, 1 millimoles radicals per 100 grams olefin interpolymer. All individual values and subranges from 0.01 millimoles to 4 millimoles radicals per 100 grams olefin interpolymer are included herein and disclosed herein.

In another embodiment, the amount of silane constituent grafted on the polyolefin chain is greater than, or equal to, 0.05 weight percent (based on the weight of the olefin interpolymer), as determined by FTIR analysis, or other appropriate method. In a further embodiment, this amount is greater than, or equal to, 0.5 weight percent, and in yet a further embodiment, this amount is greater than, or equal to, 1.2 weight percent. In a preferred embodiment, the amount silane constituent grafted on the olefin interpolymer is from 0.5 weight percent to 4.0 weight percent. All individual values and subranges greater than 0.05 weight percent are considered within the scope of this invention, and are disclosed herein.

Suitable silanes include, but are not limited to, those of the general formula (I):

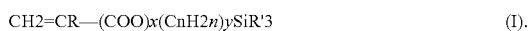

$$CH_2=CR-(COO)_x(C_nH_{2n})_ySiR'_3 \quad (I).$$

In this formula, R is a hydrogen atom or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In one embodiment, the silane compound is selected from vinyltrialkoxysilanes, vinyltriacyloxysilanes or vinyltrichlorosilane. In addition, any silane, or mixtures of silanes, which will effectively graft to, and/or crosslink, the olefin interpolymers can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth)acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., which is incorporated herein, in its entirety, by reference. Preferred silanes include vinyltrimethoxysilane, vinyltriethoxysilane, 3-(trimethoxysilyl)propyl methacrylate (γ-(meth)acryloxypropyl trimethoxysilane), and mixtures thereof.

The silane can be grafted to the polymer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate. A suitable azo compound is 2,2'-azobis(isobutyronitrile).

The amount of initiator and silane employed will affect the final structure of the silane grafted polymer, such as, for example, the degree of grafting in the grafted polymer and the degree of crosslinking in the cured polymer. The resulting structure, will in turn, affect the physical and mechanical properties of the final product. Typically, the amount of initiator and silane employed will not exceed that which is determined to provide the desired level of crosslinking, and the resulting properties in the polymer.

The grafting reaction should be preformed under conditions that maximize grafts onto the polymer backbone, and minimize side reactions, such as the homopolymerization of grafting agent, which is not grafted to the polymer. Some silane agents undergo minimal or no homopolymerization, due to steric features in the molecular structure, low reactivity and/or other reasons.

Cure (crosslinking) of a silanated graft is promoted with a crosslinking catalyst, and any catalyst that will effectively promote the cros slinking of the particular grafted silane can be used. These catalysts generally include acids and bases, and organometallic compounds, including organic titanates, organic zirconates, and complexes or carboxylates of lead, cobalt, iron, nickel, zinc and tin.

Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, can be used. The amount of catalyst will depend on the particular system at issue.

In certain embodiments of the claimed invention, dual crosslinking systems, which use a combination of radiation, heat, moisture and cros slinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed, and claimed in, U.S. Pat. Nos. 5,911,940 and 6,124,370, the entire contents of both are herein incorporated by reference.

4. In-Situ Amine Functionalization and In-Situ Hydroxyl Functionalization for Functionalized Olefin-Based Polymers In a preferred embodiment of the invention, the functionalized olefin-based polymer is an amine-functionalized olefin-based polymer or a hydroxyl-functionalized olefin-based polymer. The process to produce amine-functionalize or hydroxy-functionalize olefin-based polymer can be carried out as one extrusion step, i.e. maleic anhydride (grafting agent) can be grafted to the olefin-based polymer in the first section of the extruder, followed by imidization with either a primary-secondary diamine or alkanolamine in the latter section before pelletization.

Alternatively, two extruders, or melt mixing devises could be operated in series to carry out both chemical steps.

In order to prepare an amino-functionalized olefin-based polymer, without competing crosslinking reactions, in the melt, from anhydride-grafted olefin-based polymer, it is necessary to employ a primary-secondary diamine of the general formula H$_2$N—R—NH—R", where R is at least a C2 hydrocarbyl radical. The diamine can be used in a stoichiometric excess or stoichiometric equivalence.

Suitable primary-secondary diamines include compounds of structure (I) below:

H$_2$N—R$_1$—NH—R$_2$ (I).

In structure (I), R$_1$ is a divalent hydrocarbon radical, and preferably a linear hydrocarbon of the formula —(CH$_2$)$_n$—, where n is greater than, or equal to, 2, and preferably n is from 2 to 10, more preferably from 2 to 8, and even more preferably from 2 to 6. R$_2$ is a monovalent hydrocarbon radical containing at least 2 carbon atoms, and optionally may be substituted with a heteroatom containing group, such as OH or SH. Preferably R2 a linear hydrocarbon of the formula —(CH$_2$)$_n$—CH$_3$, where n is from 1 to ten, and preferably n is from 1 to 9, more preferably from 1 to 7, and even more preferably from 1 to 5.

Additional primary-secondary diamines include, but are not limited to N-ethylethylenediamine, N-phenylethylenediamine, N-phenyl-1,2-phenylenediamine, N-phenyl-1,4-phenylenediamine, and N-(2-hydroxyethyl)-ethylenediamine. Examples of preferred primary-secondary diamines are shown below.

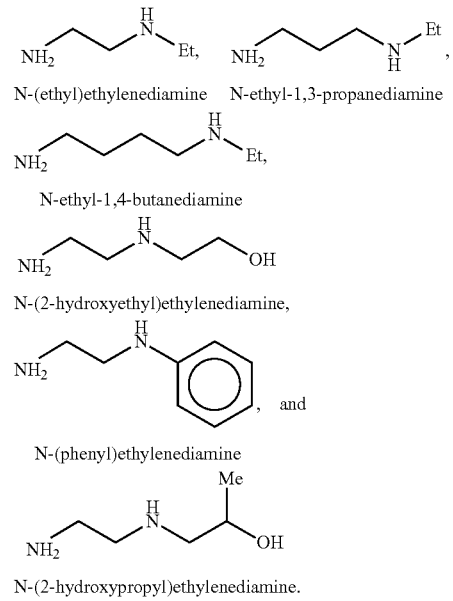

The alkanolamine is a compound containing an amine group and at least one hydroxyl group, preferably only one hydroxyl group. The amine can be a primary or a secondary amine, and is preferably a primary amine. The polyamine is a compound that contains at least two amine groups, preferably only two amine groups.

Suitable alkanolamines are those of structure (II) below:

H$_2$N—R$_1$—OH (II).

In structure (II), R$_1$ is a divalent hydrocarbon radical, and preferably a linear hydrocarbon of the formula —(CH$_2$)$_n$—, where n is greater than, or equal to, 2, and preferably n is from 2 to 10, more preferably from 2 to 8, and even more preferably from 2 to 6.

Additional alkanolamines include, but are not limited to, ethanolamine, 2-amino-1-propanol, 3-amino-1-propanol, 2-amino-1-butanol and 2-aminobenzyl alcohol.

Examples of preferred alkanolamines are shown below.

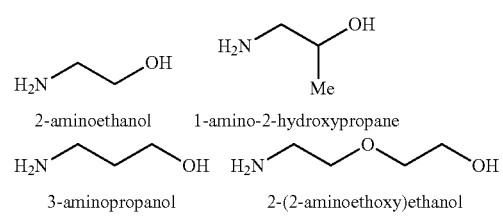

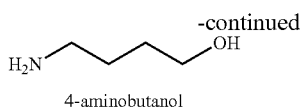

4-aminobutanol

Additional examples of suitable alkanolamines and suitable diamines, are represented by the following formula (III):

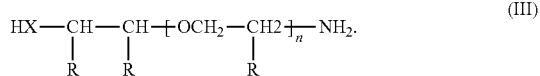

In formula (III), X is O, or X=NR' (R'=alkyl); and each R is independently H, $CH_3$, or $CH_2CH_3$; and n is from 0 to 50. The disclosure and preparation of hydroxylamines can be found in U.S. Pat. Nos. 3,231,619; 4,612,335; and 4,888,446; which teachings are incorporated herein by reference. Examples of preferred alkanolamines include 2-aminoethanol, 1-amino-2-propanol, 2-amino-1-propanol, 3-amino-1-propanol, 2-(2-aminoethoxy)ethanol, 1-amino-2-butanol, 2-amino-3-butanol, and polyoxyalkylene glycol amines. A preferred alkanolamine is 2-aminoethanol.

In one embodiment, a maleic anhydride olefin-based polymer is functionalized with a primary-secondary diamine or with an alkanolamine.

In a further embodiment, the level of maleic anhydride used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted olefin-based polymer.

In a further embodiment, the level of peroxide used, is from 0.01 weight percent to 0.5 weight percent, preferably from 0.05 weight percent to 0.3 weight percent, and more preferably from 0.1 weight percent to 0.2 weight percent, based on the weight of the unfunctionalized grafted olefin-based polymer.

In yet a further embodiment, the level of primary-secondary diamine or alkanolamine used, is from 1 to 10 mole equivalents, preferably from 2 to 8 mole equivalents, and more preferably from 4 to 6 mole equivalents of amine, relative to grafted anhydride.

5. In-Situ Functionalization Reactions Using Maleamic Acid for Functionalized Olefin-Based Polymers Hydroxy- and amino-functionalized ethylene-octene copolymers can also be prepared in one step by peroxide-initiated grafting of the corresponding maleamic acids, or derivative thereof, which is formed by reaction of maleic anhydride and alkanolamine or primary-secondary diamine.

Maleamic acids are shown in Structure (IV) below:

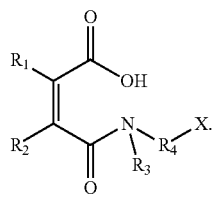

(IV)

In structure (IV), R1 and R2 are, independently, either hydrogen or a C1-C20 hydrocarbyl radical, which is linear or branched; R3 is hydrogen or a C1-C20 hydrocarbyl radical, which is linear or branched; R4 is a hydrocarbyl di-radical, which is linear or branched; X is OH or $NHR_5$, where R5 is a hydrocarbyl radical, which linear or branched, or a hydroxyethyl group. In a preferred embodiment, R1 and R2 are, independently, either hydrogen, or a C1-C10, preferably a C1-C8, and more preferably a C1-C6, hydrocarbyl radical, which is linear or branched. In a preferred embodiment, R3 is either hydrogen, or a C1-C10, preferably a C1-C8, and more preferably a C1-C6, hydrocarbyl radical, which is linear or branched. In a preferred embodiment, R4 is a C1-C20, preferably a C1-C10, and more preferably a C1-C8, and even more preferably a C1-C6 hydrocarbyl radical, which is linear or branched.

In a preferred embodiment, R5 is a C1-C20, preferably a C1-C10, and more preferably a C1-C8, and even more preferably a C1-C6 hydrocarbyl radical, which is linear or branched. In another embodiment, R5 is a linear $—(CH_2)_n—CH_3$, where n is greater than, or equal to 1, and preferably n is from 1 to 9, more preferably from 1 to 7, and even more preferably from 1 to 5. Additional examples of R5, include, but are not limited to, the following structures: $—CH_3$, $—CH_2CH_3$, $—CH_2CH_2CH_3$, $—CH_2CH_2CH_2CH_3$, $—CH(CH_3)CH_3$, $—CH(CH_3)CH_2CH_3$, $—CH_2CH(CH_3)CH_3$, $—CH(CH_3)CH_2CH_2CH_3$, $—CH_2CH(CH_3)CH_2CH_3$, and $—CH_2CH_2CH(CH_3)CH_3$.

Additional maleamic acid structures are shown below. In each structure, R3 and R4 are defined as above.

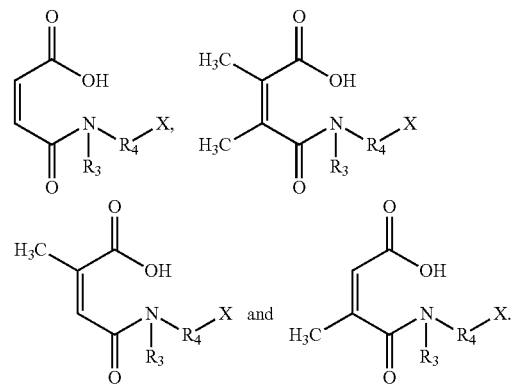

Preferably the maleamic acid, is shown in structure (V) below:

(V)

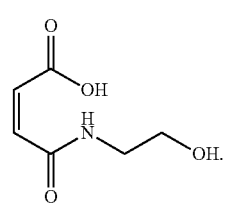

The polyolefin is functionalized with a maleamic acid as shown in structure (V).

In one embodiment, the level of maleamic acid used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted polyolefin.

In a further embodiment, the level of peroxide used, is from 0.01 weight percent to 1 weight percent, preferably from 0.01 weight percent to 0.5 weight percent, and more preferably from 0.05 weight percent to 0.3 weight percent, and even more preferably from 0.1 weight percent to 0.2 weight percent, based on the amount of unfunctionalized grafted polyolefin.

6. Diamine Imbibe Process for Functionalized Olefin-Based Polymers

The olefin-based polymers as described herein may also be functionalized using a diamine imbibing process. Here, an olefin-based polymer is first functionalized with a group reactive with amine functionality. Preferably, the olefin-based polymer is functionalized with an anhydride group. At least one diamine is mixed with the functionalized olefin-based polymer at a temperature below the melting point of the olefin-based polymer, and preferably at room temperature. The diamine is allowed to absorb or imbibe into the olefin-based polymer, and reacts with diamine reactive group to form a succinamic acid. The reaction of the diamine with the diamine reactive functional group to form the imide ring, can then be completed by subjecting the mixture to a thermal treatment, such as in a melt extrusion process. Suitable diamines include those diamines discussed herein. The imbibing process helps to ensure that the diamine is thoroughly mixed with the olefin-based polymer for an efficient functionalization reaction.

Suitable primary-secondary diamines include compounds of structure (VI) below:

In structure (VI), $R_1$ is a divalent hydrocarbon radical, and preferably a linear hydrocarbon of the formula $-(CH_2)_n-$, where n is greater than, or equal to, 2, and preferably n is from 2 to 10, more preferably from 2 to 8, and even more preferably from 2 to 6. $R_2$ is a monovalent hydrocarbon radical containing at least 1 carbon atom, and optionally may be substituted with a heteroatom containing group, such as OH or SH. Preferably R2 a linear hydrocarbon of the formula $-(CH_2)_n-CH_3$, where n is from 0 to ten, and preferably n is from 0 to 9, more preferably from 0 to 7, and even more preferably from 0 to 5.

Suitable primary-secondary diamines include, but are not limited to, N-methyl-ethylenediamine, N-ethylethylenediamine, N-phenylethylenediamine, N-methyl-1,3-propanediamine, N-methylethylenediamine, N-phenyl-1,2-phenylenediamine, N-phenyl-1,4-phenylenediamine, 1-(2-aminoethyl)-piperazine, and N-(2-hydroxyethyl)-ethylenediamine. Examples of preferred primary-secondary diamines are shown below.

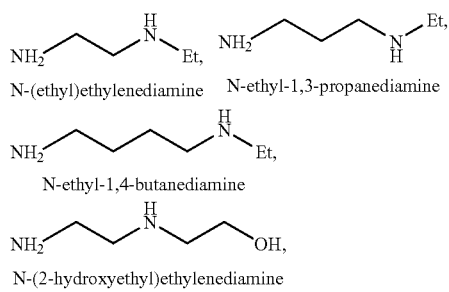

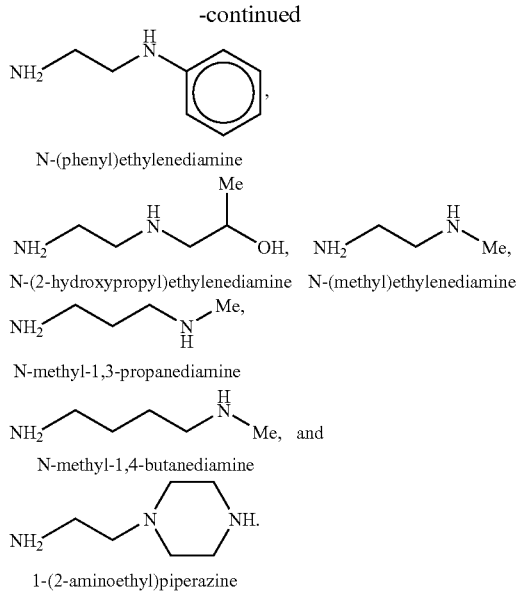

Olefin Multi-Block Interpolymers

The olefin multi-block interpolymers are described in International Application No. PCT/US05/008917 filed on Mar. 17, 2005, U.S. Publication No. 2006/0199914, U.S. Provisional Application No. 60/876,287, U.S. Provisional Application No. 60/876,287, U.S. application Ser. No. 11/376,873 (Dow 64405B) filed on Mar. 15, 2006, and U.S. Provisional Application No. 60/553,906, filed Mar. 17, 2004 each fully incorporated herein by reference.

In a preferred embodiment, the olefin multi-block interpolymer is an ethylene/α-olefin multi-block interpolymer. In a further embodiment, the ethylene/α-olefin multi-block interpolymer comprises greater than 50 mole percent ethylene (based on total moles polymerizable monomers).

The ethylene/α-olefin multi-block interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

preferably $T_m > -6553.3 + 13735(d) - 7051.7(d)^2$; or (4) an Mw/Mn from about 1.7 to about 3.5, and is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase: Re>1481-1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

In a preferred embodiment, the ethylene/α-olefin multi-block interpolymer has, for property 3), an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -6553.3 + 13735(d) - 7051.7(d)^2.$$

In one embodiment, the ethylene/α-olefin multi-block interpolymer has one of the properties (1) to (7) as discussed above. In another embodiment, the ethylene/α-olefin multi-block interpolymer has at least property (1) as discussed above.

In another embodiment, the ethylene/α-olefin multi-block interpolymer has a combination of two or more properties (1) to (7) as discussed above. In another embodiment, the ethylene/α-olefin multi-block interpolymer has at least property (1), as discussed above, in combination with two or more addition properties (2) to (7), as discussed above.

In another embodiment, the ethylene/α-olefin multi-block interpolymer characterized by one or more of the following characteristics:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2, \text{ preferably } T_m > -6553.3 + 13735(d) - 7051.7(d)^2, \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° C. \text{ for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (g) an average block index greater than zero and up to about 1.0 and a molecular weight distribution, Mw/Mn, greater than about 1.3.

In one embodiment, the ethylene/α-olefin multi-block interpolymer has one of the properties (a) to (g) as discussed above. In another embodiment, the ethylene/α-olefin multi-block interpolymer has at least property (g) as discussed above.

In another embodiment, the ethylene/α-olefin multi-block interpolymer has a combination of two or more properties (a) to (g) as discussed above. In another embodiment, the ethylene/α-olefin multi-block interpolymer has at least property (g), as discussed above, in combination with two or more addition properties (a) to (f), as discussed above.

In a preferred embodiment, for property (a), the ethylene/α-olefin multi-block interpolymer has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -6553.3 + 13735(d) - 7051.7(d)^2.$$

The ethylene/α-olefin multi-block interpolymers typically comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

$$(AB)_n,$$

where n is at least 1, preferably an integer greater than 1, such as, 2, 3, 4, 5, 10, 15, 20, 30, 40, 50, 60, 70, 80, 90, 100, or higher, "A" represents a hard block or segment, and "B" represents a soft block or segment. Preferably, the As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent, based on the weight of the polymer. In other words, the comonomer content (content of monomers other than ethylene) in the hard segments is less than about 5 weight percent, and preferably less than about 2 weight percent, based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent, based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835 (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline," if employed, refers to a polymer that possesses a first order transition or crystalline melting point (Tm) as determined by differential scanning calorimetry (DSC) or equivalent technique. The term may be used interchangeably with the term "semicrystalline." The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks"), preferably joined in a linear manner, that is, a polymer comprising chemically differentiated units, which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

The ethylene/α-olefin multi-block interpolymers used in embodiments of the invention (also sometimes referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers may be characterized by one or more of the aspects described as follows.

In one aspect, the ethylene/α-olefin multiblock interpolymers used in embodiments of the invention have a $M_w/M_n$ from about 1.7 to about 3.5, and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins, whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C., when density ranges from 0.875 g/cc to about 0.945 g/cc. In some embodiments, the melting point of such polymers are in the range of about 115° C. to about 125° C., when density ranges from 0.875 g/cc to about 0.945 g/cc.

Figure 2:
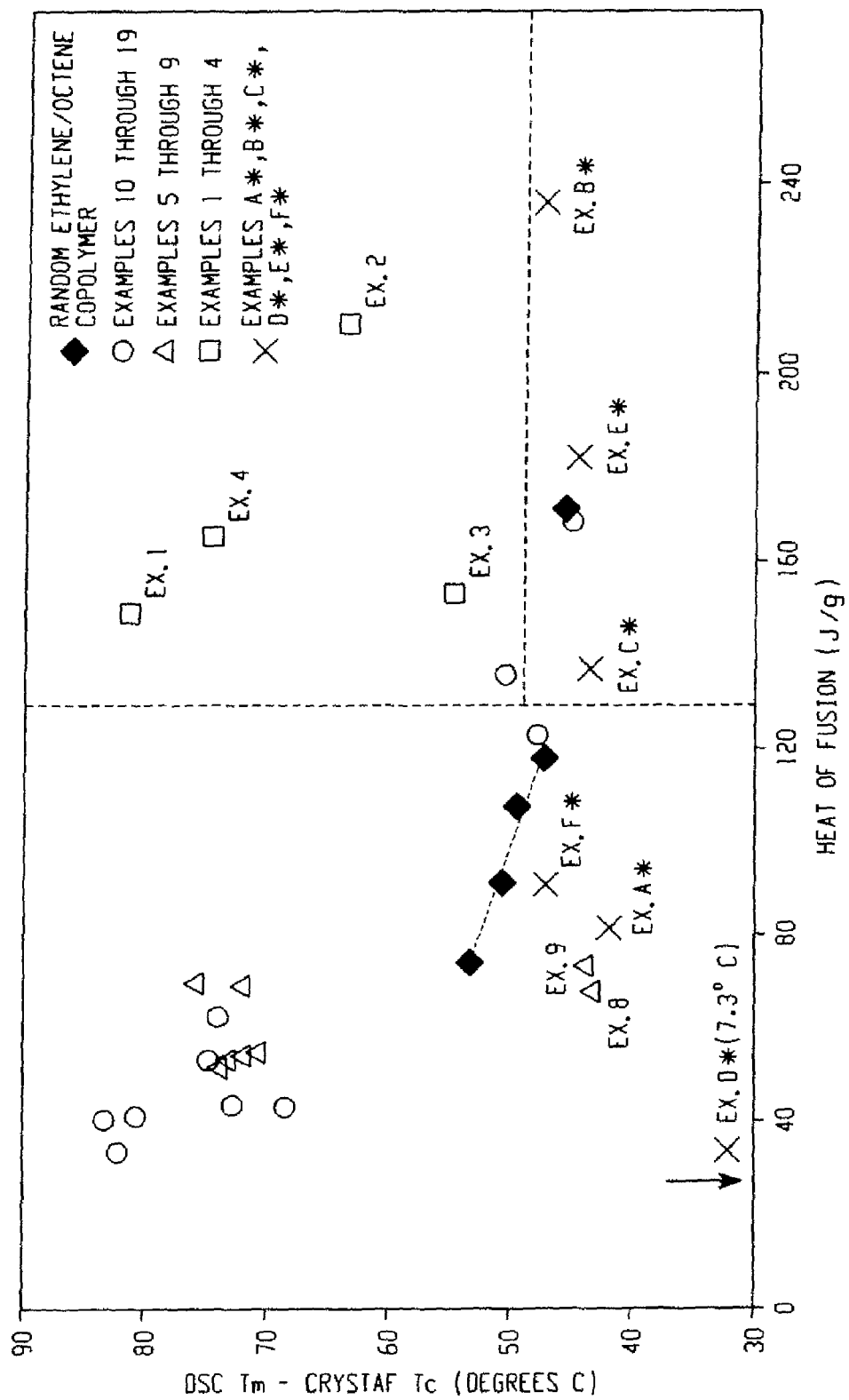
FIG. 2 depicts "DSC Tm-Crystaf Tc" as a function of Heat of Fusion for several polymers.

In another aspect, the ethylene/α-olefin multiblock interpolymers comprise, in polymerized form, ethylene and one or more α-olefins, and are characterized by a ΔT, in degree Celsius, defined as the temperature for the tallest Differential Scanning Calorimetry ("DSC") peak minus the temperature for the tallest Crystallization Analysis Fractionation ("CRY- STAF") peak and a heat of fusion in J/g, ΔH, and ΔT and ΔH satisfy the following relationships:

$$\Delta T > -0.1299(\Delta H)+62.81, \text{ and preferably}$$

$$\Delta T \geq -0.1299(\Delta H)+64.38, \text{ and more preferably}$$

$$\Delta T \geq -0.1299(\Delta H)+65.95,$$

for ΔH up to 130 J/g. Moreover, ΔT is equal to, or greater than, 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for olefin multiblock polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin multiblock interpolymers have a molecular fraction which elutes between 40° C. and 130° C., when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin multi-block interpolymers are characterized by an elastic recovery, Re, in percent at 300 percent strain and 1 cycle, measured on a compression-molded film of an ethylene/α-olefin interpolymer, and has a density, d, in grams/cubic centimeter, and wherein the numerical values of Re and d satisfy the following relationship when ethylene/α-olefin interpolymer is substantially free of a cross-linked phase:

$$Re > 1481-1629(d); \text{ and preferably}$$

$$Re \geq 1491-1629(d); \text{ and more preferably}$$

$$Re \geq 1501-1629(d); \text{ and even more preferably}$$

$$Re \geq 1511-1629(d).$$

Figure 3:
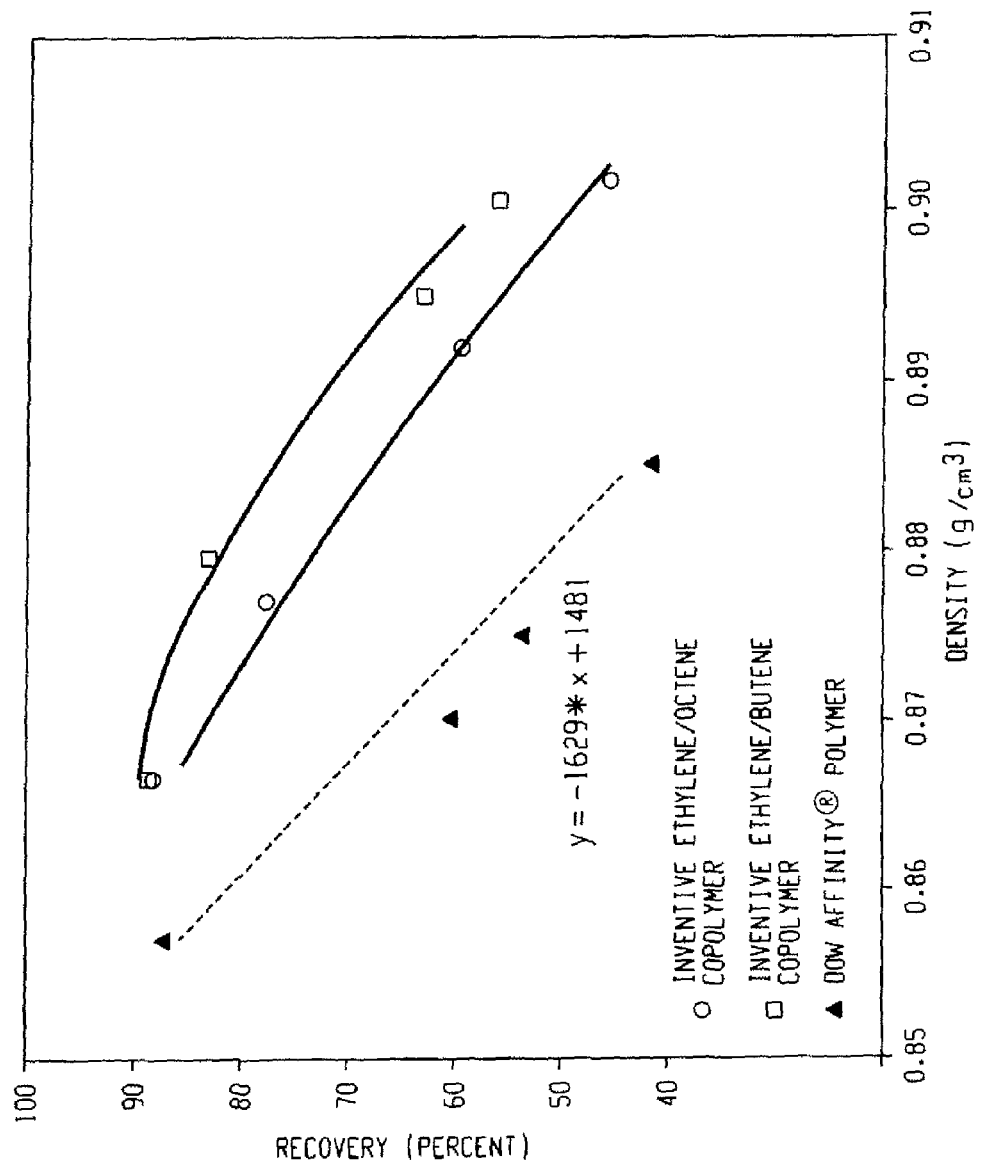
FIG. 3 depicts the effect of density on elastic recovery for unoriented films made from certain olefin multi-block interpolymers and some traditional random copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin multi-block interpolymers have a tensile strength above 10 MPa, preferably a tensile strength≥11 MPa, more preferably a tensile strength≥13 MPa, and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin multi-block interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin multi-block interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin multi-block interpolymers have a heat of fusion of less than 85 J/g, and/or a pellet blocking strength of equal to, or less than, 100 pounds/foot (4800 Pa), preferably equal to, or less than, 50 lbs/ft$^2$ (2400 Pa), especially equal to, or less than, 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene, and have a 70° C. compression set of less than 80 percent, preferably less than 70 percent or less than 60 percent, most preferably less than 40 to 50 percent, and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes, and possessing a most probable distribution of block lengths. Preferred multi-block copolymers are those containing 4 or more blocks or segments, including terminal blocks. More preferably, the copolymers include at least 5, 10 or 20 blocks or segments, including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions, each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the multi-block interpolymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer. Preferably said block interpolymer has a peak (but not just a molecular fraction) which elutes between 40° C. and 130° C. (but without collecting and/or isolating individual fractions), characterized in that said peak, has a comonomer content, estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, and wherein said comparable random ethylene interpolymer has the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the olefin multiblock polymer can be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction, eluting between 40 and 130° C., greater than, or equal to, the quantity (−0.2013) T+20.07, more preferably greater than or equal to the quantity (−0.2013) T+21.07, where T is the numerical value of the peak elution temperature of the TREF fraction being compared, measured in ° C.

Figure 4:
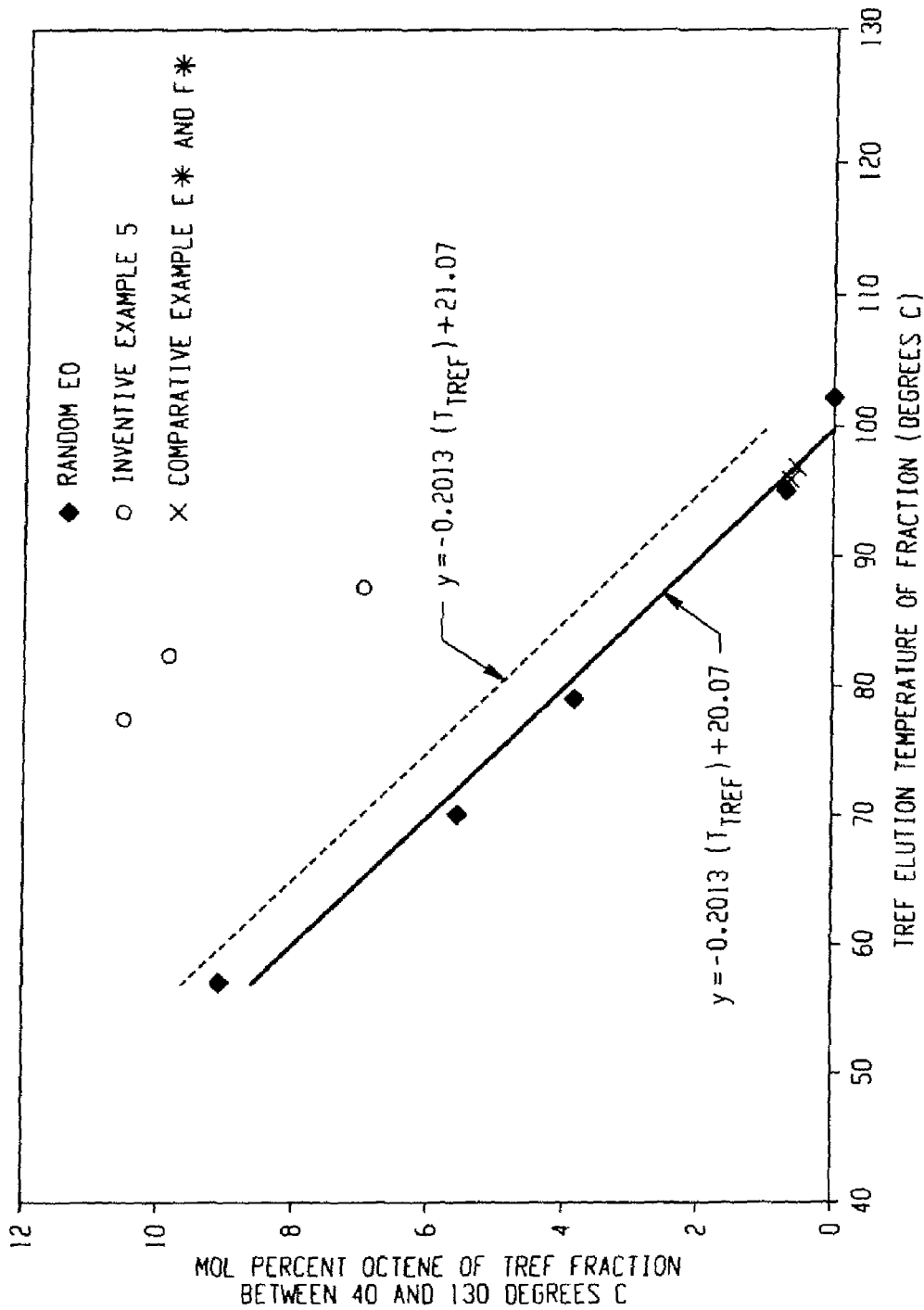
FIG. 4 depicts comonomer content versus TREF elution temperature for several random ethylene/1-octene copolymers and a multi-block ethylene/1-octene copolymer.

FIG. 4 graphically depicts an embodiment of the block interpolymers of ethylene and 1-octene, where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer, and is believed to be due to the presence of differentiated blocks within the polymer chains, having both crystalline and amorphous nature.

Figure 5:
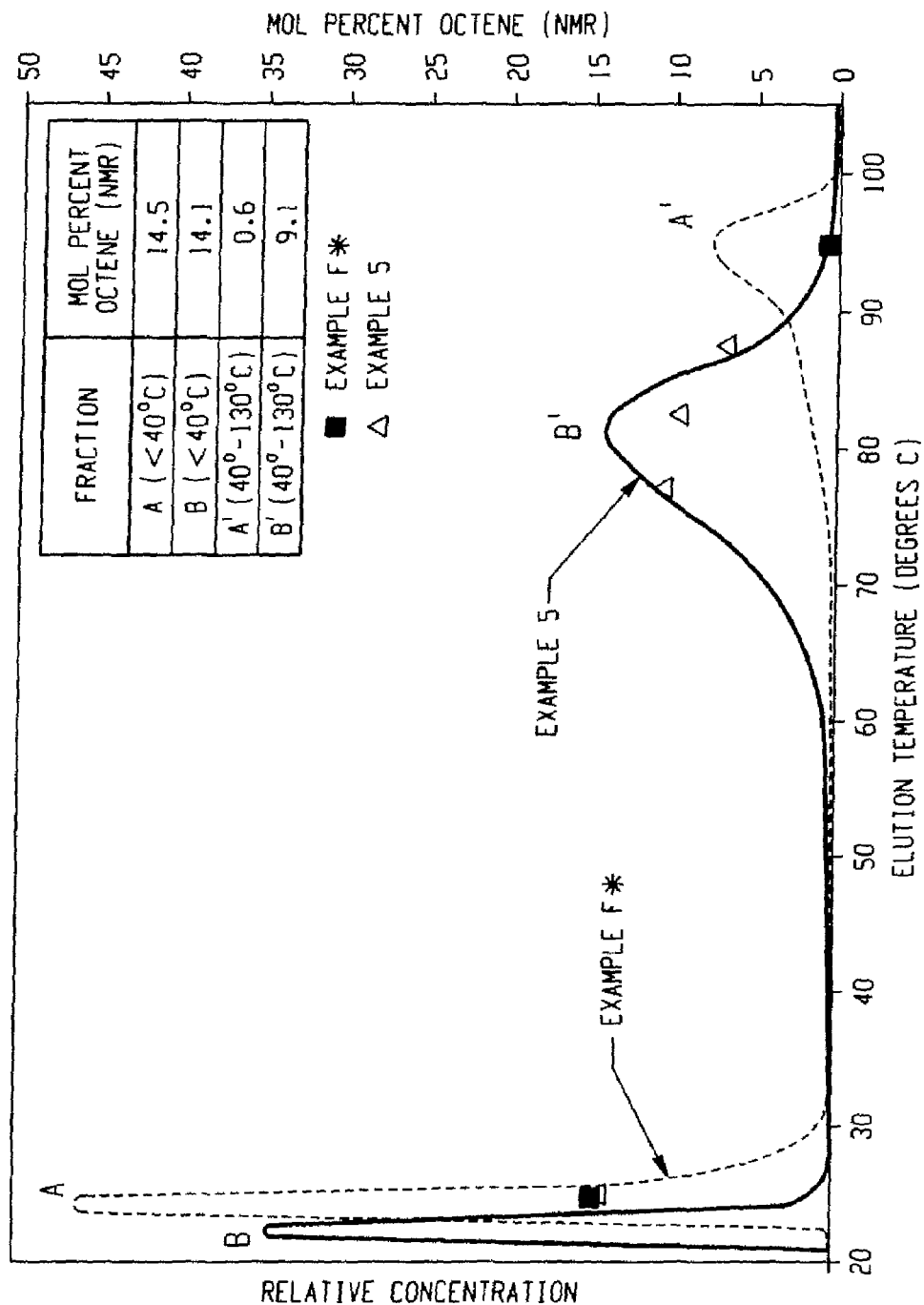
FIG. 5 depicts TREF profiles and comonomer content for multi-block copolymer (Example 5) and a comparative copolymer (Example F*).

FIG. 5 graphically displays the TREF curve and comonomer contents of polymer fractions for an Example 5 (a multi-block copolymer) and a comparative F polymer (physical blend of two polymers from simultaneous polymerization using two catalysts). The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers, and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the olefin multiblock polymers can be characterized by one or more additional characteristics. In one aspect, the olefin multiblock polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than, or equal to, the quantity (−0.1356) T+13.89, more preferably greater than, or equal to, the quantity (−0.1356) T+14.93, and most preferably greater than, or equal to, the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than, or equal to, the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the olefin multiblock polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the olefin multiblock polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than, or equal to, about 76° C., has a melt enthalpy (heat of fusion) as measured by DSC, corresponding to the equation:

$$\text{Heat of fusion}(J/gm) \leq (3.1718)(\text{ATREF elution temperature in Celsius}) - 136.58.$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion}(J/gm) \leq (1.1312)(\text{ATREF elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution), while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the multi-block ethylene/α-olefin interpolymer is characterized by an average block index, ABI, which is greater than zero, and up to about 1.0, and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i),$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln} P_X - \text{Ln} P_{XO}}{\text{Ln} P_A - \text{Ln} P_{AB}},$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$\text{Ln} P_{AB} = \alpha/T_{AB} + \beta,$$

where α and β are two constants which can be determined by calibration using a number of known random ethylene copolymers. It should be noted that α and β may vary from instrument to instrument. Moreover, one would need to create their own calibration curve with the polymer composition of interest, and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$\text{Ln } P = -237.83/T_{ATREF} + 0.639.$$

$T_{XO}$ is the ATREF temperature for a random copolymer of the same composition and having an ethylene mole fraction of $P_X$. $T_{XO}$ can be calculated from $\text{Ln}P_X = \alpha/T_{XO} + \beta$. Conversely, $P_{XO}$ is the ethylene mole fraction for a random copolymer of the same composition and having an ATREF temperature of $T_X$, which can be calculated from $\text{Ln } P_{XO} = \alpha/T_X + \beta$.

Once the block index (BI) for each preparative TREF fraction is obtained, the weight average block index, ABI, for the whole polymer can be calculated. In some embodiments, ABI is greater than zero, but less than about 0.3, or from about 0.1 to about 0.3. In other embodiments, ABI is greater than about 0.3, and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block ethylene/α-olefin interpolymer is that the multi-block ethylene/α-olefin interpolymer comprises at least one polymer fraction which can be obtained by preparative TREF, wherein the fraction has a block index greater than about 0.1 and up to about 1.0, and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the multi-block interpolymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
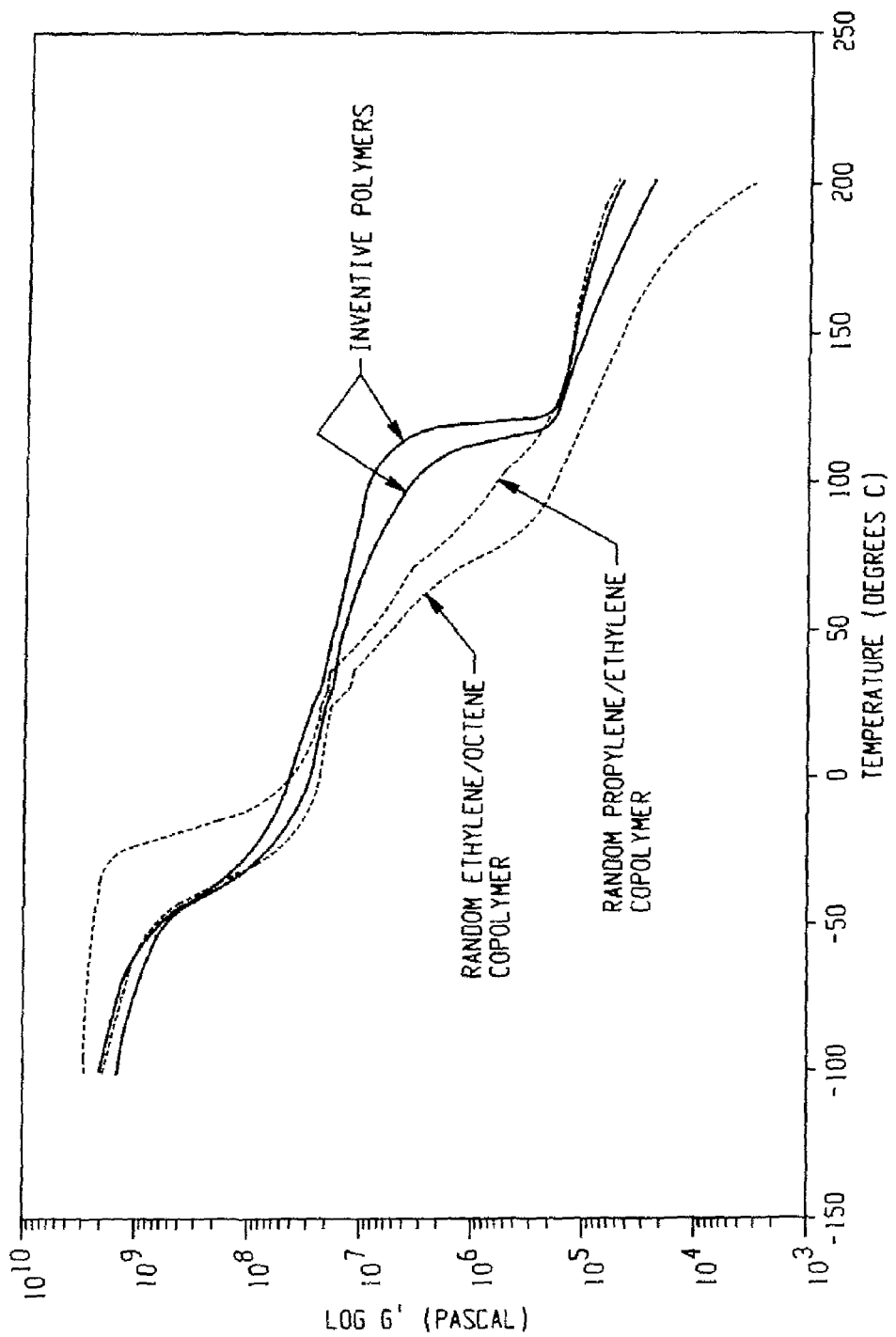
FIG. 6 depicts storage modulus as a function of temperature for several multi-block copolymers (inventive polymers) and comparative random copolymers.

Further, the multi-block interpolymers can have, alone, or in combination with any other properties disclosed herein, a storage modulus, G', such that log (G') is greater than or equal to 400 kPa, preferably greater than, or equal to, 1.0 MPa, at a temperature of 100° C. Moreover, the multi-block interpolymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
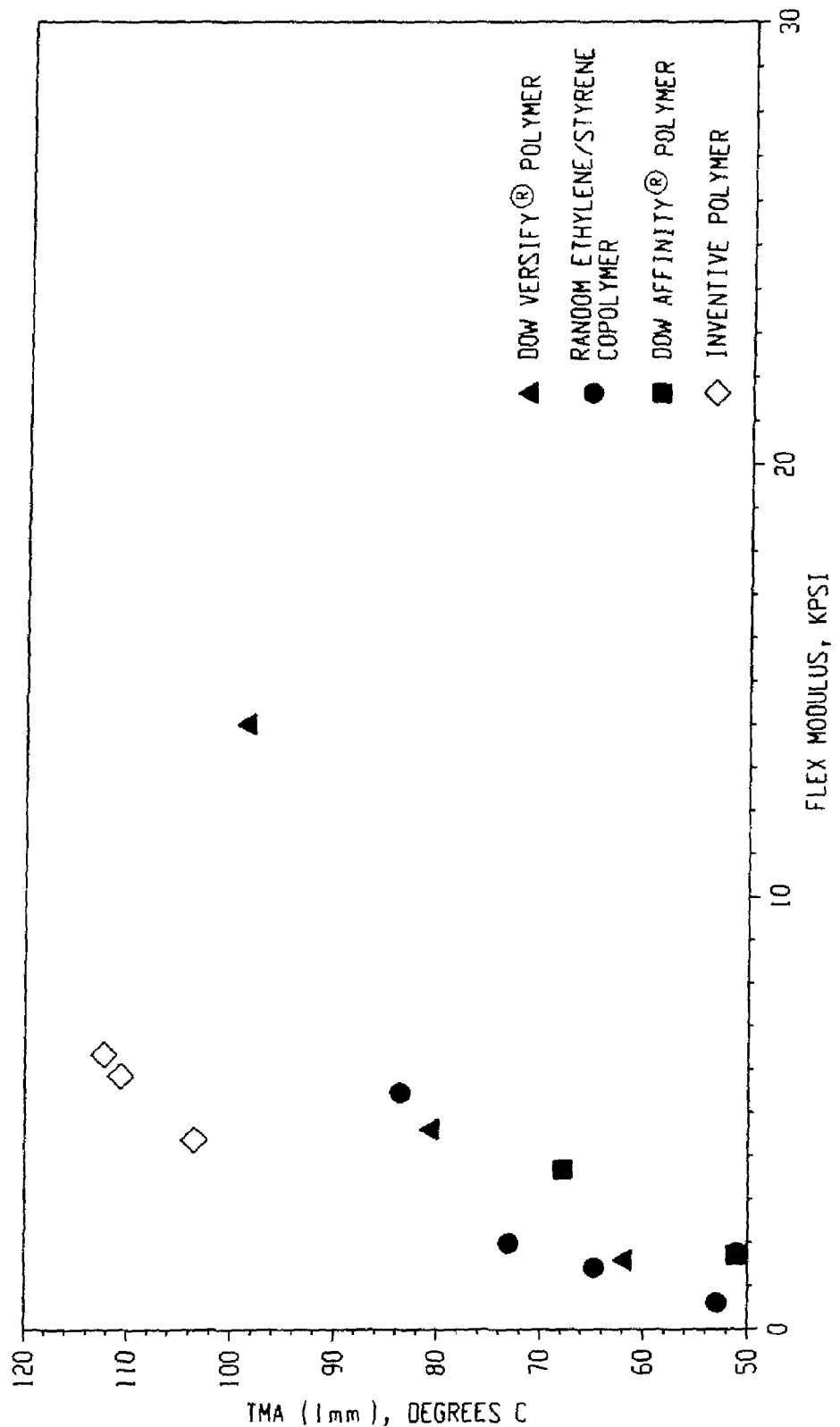
FIG. 7 depicts TMA (Thermomechanical Analysis) data versus flex modulus data for a multi-block copolymer (inventive polymer) and some comparative examples (Versify™, Ethylene/Styrene, Affinity™).

The multi-block interpolymers may be further characterized by a thermomechanical analysis penetration depth of 1 mm at a temperature of at least 90° C., as well as a flexural modulus of from 3 kpsi (20 MPa) to 13 kpsi (90 MPa). Alternatively, the multi-block interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the multi-block interpolymers, as compared to other known polymers. The multi-block interpolymers have significantly better flexibility-heat resistance balance than the other polymers.

Additionally, the multi-block ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The multi-block interpolymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the olefin multi-block polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the multi-block interpolymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers, other than ethylene, under addition polymerization conditions with a catalyst composition comprising:

the admixture or reaction product resulting from combining:

(A) a first olefin polymerization catalyst having a high comonomer incorporation index,
(B) a second olefin polymerization catalyst having a comonomer incorporation index less than 90 percent, preferably less than 50 percent, most preferably less than 5 percent of the comonomer incorporation index of catalyst (A), and
(C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

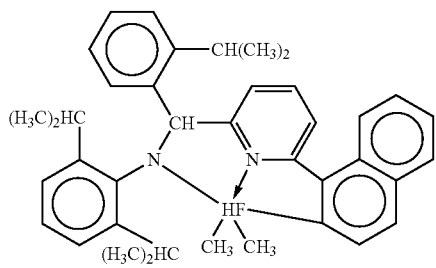

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

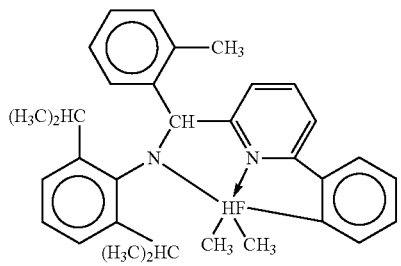

Catalyst (A3) is bis[N,N'''-(2,4,6-tri(methylphenyl)amido)ethylenediamine]hafnium dibenzyl.

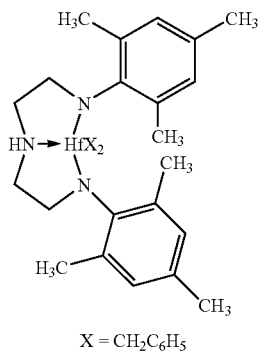

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

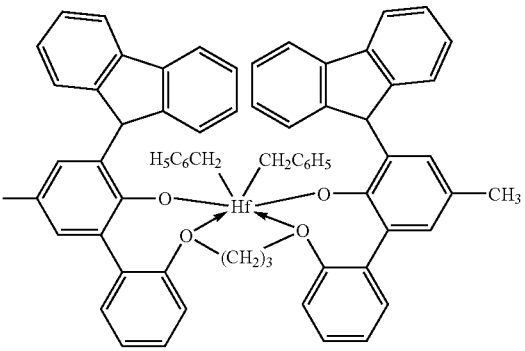

Catalyst (B1) is 1,2-bis-(3,5-di-t-butylphenylene)(1-(N-(1-methylethyl)immino)methyl)(2-oxoyl)zirconium dibenzyl

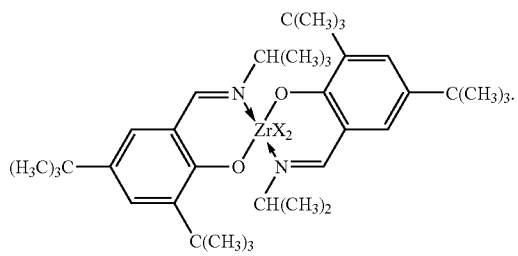

Catalyst (B2) is 1,2-bis-(3,5-di-t-butylphenylene)(1-(N-(2-methylcyclohexyl)-immino)methyl)(2-oxoyl)zirconium dibenzyl

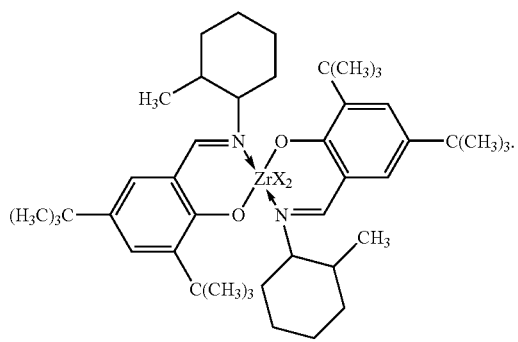

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

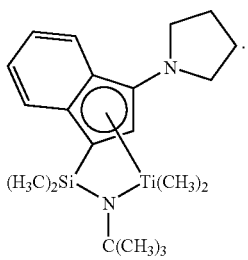

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

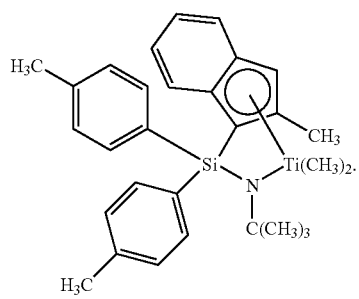

Catalyst (C3) is (t-butylamido)di(4-methylphenyl)(2-methyl-1,2,3,3a,8a-θ-s-indacen-1-yl)silanetitanium dimethyl prepared substantially according to the teachings of US-A-2003/004286:

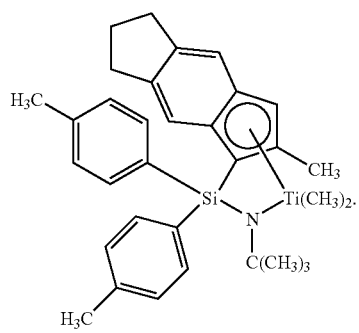

Catalyst (D1) is bis(dimethyldisiloxane)(indene-1-yl)zirconium dichloride available from Sigma-Aldrich:

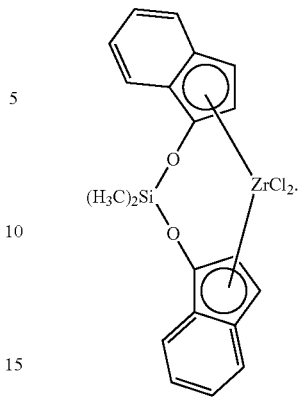

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The multi-block interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The multi-block interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the multi-block interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene/α-olefin multi-block interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin multi-block interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 544-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts, incorporating differing quantities of comonomer, have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons, available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere, using dry box techniques. All solvents used, were HPLC grade, and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di(t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene)(1-(N-(1-methylethyl)immino)methyl)(2-oxoyl)zirconium dibenzyl A solution of (1-methylethyl)(2-hydroxy-3,5-di(t-butyl)phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl)(2-oxoyl-3,5-di(t-butyl)phenyl)immino)zirconium dibenzyl A solution of (1-(2-methylcyclohexyl)ethyl)(2-oxoyl-3,5-dht-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

lyst 1/MMAO mixture, shuttling agent, and catalyst or catalyst mixture. When a mixture of cocatalyst 1 and MMAO, or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled, and the glass tubes are unloaded. The tubes are transferred to a centrifuge/vacuum drying unit, and dried for 12 hours at 60° C. The tubes containing dried polymer are weighed, and the difference between this weight and the tare weight gives the net yield of polymer. Results are contained in Table 1. In Table 1 and elsewhere in the application, comparative compounds are often indicated by an asterisk (*).

Examples 1-4 demonstrate the synthesis of linear block copolymers (multi-block) by the present invention, as evidenced by the formation of a very narrow MWD, essentially monomodal copolymer when DEZ is present, and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution

Examples 1-4

Comparative A-C

General High Throughput Parallel Polymerization Conditions

Polymerizations were conducted using a high throughput, parallel polymerization reactor (PPR) available from Symyx technologies, Inc., and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa), with ethylene on demand, using 1.2 equivalents of cocatalyst 1, based on total catalyst used (1.1 equivalents when MMAO is present). A series of polymerizations are conducted in a parallel pressure reactor (PPR), contained of 48 individual reactor cells in a 6×8 array that are fitted with a pre-weighed glass tube. The working volume in each reactor cell is 6000 μL. Each cell is temperature and pressure controlled, with stirring provided by individual stirring paddles. The monomer gas and quench gas are plumbed directly into the PPR unit, and controlled by automatic valves. Liquid reagents are robotically added to each reactor cell by syringes, and the reservoir solvent is mixed alkanes. The order of addition is mixed alkanes solvent (4 ml), ethylene, 1-octene comonomer (1 ml), cocatalyst 1 or cocata- It may be seen the multi-block polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to FIGS. 1-7 and the figures in WO/2005/090427 filed on Mar. 17, 2005 incorporated herein by reference. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent, as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19

Comparatives D-F, Continuous Solution Polymerization, Catalyst A1/B2+DEZ

Continuous solution polymerizations were carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed.

The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line, along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat Al[2] ppm | Cat Al Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/$ $[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm³/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | $T_m - T_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY® EG8100, available from The Dow Chemical Company), Comparative I is a substantially linear ethylene/1-octene copolymer (AFFINITY® PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

C. or even greater than 100° C. This shows that the multi-block polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent, and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the multi-block polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications, such as in pressure sensitive adhesive formulations.

The data in Table 4 also demonstrate that the multi-block polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking

TABLE 4

High Temperature Mechanical Properties

| Ex. | TMA-1 mm penetration (° C.) | Pellet Blocking Strength lb/ft$^2$ (kPa) | G'(25° C.)/G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° strengths can result in product clumping or sticking together upon storage or shipping, resulting in poor handling properties.

High temperature (70° C.) compression set for the olefin multiblock polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

mers as compared to, for example, Comparative G. Lower stress relaxation means that the polymer retains its force better in applications such as diapers and other garments where retention of elastic properties over long time periods at body temperatures is desired.

TABLE 5

Ambient Temperature Mechanical Properties

| Ex. | Flex Modulus (MPa) | Tensile Modulus (MPa) | Tensile Strength (MPa)[1] | Elongation at Break (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the multi-block polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the olefin multiblock polymers is generally 1000 mJ or higher, as shown in Table 5. Tear strength for the olefin multiblock polymers can be as high as 3000 mJ, or even as high as 5000 mJ. Comparative polymers generally have tear strengths no higher than 750 mJ.

Table 5 also shows that the multi-block polymers of the invention have better retractive stress at 150 percent strain (demonstrated by higher retractive stress values) than some of the comparative samples. Comparative Examples F, G and H have retractive stress value at 150 percent strain of 400 kPa or less, while the olefin multiblock polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the olefin multiblock poly- An olefin multi-block interpolymer, and preferably an ethylene/α-olefin multi-block interpolymer, may comprise a combination of two or more suitable embodiments as described herein.

In another embodiment, a blend of one or more olefin-based polymers, for example as described herein, and one or more olefin multi-block interpolymers, for example as described herein, may be used.

In another embodiment, an ethylene-based polymer, as described herein, may be blended with an olefin multi-block interpolymer as described herein.

In another embodiment, a propylene-based polymer, as described herein, may be blended with an olefin multi-block interpolymer, as described herein.

In another embodiment, an ethylene-based polymer, as described herein, and a propylene-based polymer, as described herein, may be blended with an olefin multi-block interpolymer, as described herein.

Thermoplastic Polyurethanes

The polyurethane component which may optionally be employed in the compositions has no limitation in respect of its formulation, other than the requirement that it be thermoplastic in nature, which means it is prepared from substantially difunctional ingredients, for example, organic diisocyanates and components being substantially difunctional in active hydrogen containing groups. However, some times minor proportions of ingredients with functionalities higher than two may be employed. This is particularly true when using extenders such as glycerin, trimethylolpropane, and the like. Such thermoplastic polyurethane compositions are generally referred to as TPU materials. Accordingly, any of the TPU materials known in the art can be employed in the present compositions. For representative teaching on the preparation of TPU materials see Polyurethanes: Chemistry and Technology, Part II, Saunders and Frisch, 1964 pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; and 4,631,329; the disclosures of which are hereby incorporated herein by reference.

The preferred TPU is a polymer prepared from a mixture comprising an organic diisocyanate, at least one polymeric diol and at least one difunctional extender. The TPU may be prepared by the prepolymer, quasi-prepolymer, or one-shot methods in accordance with the methods described in the incorporated references above.

Di-isocyanates suitable for use in preparing the hard segment of the polyurethanes according to this invention include aromatic, aliphatic, and cycloaliphatic di-isocyanates and combinations of two or more of these compounds. An example of a structural unit derived from di-isocyanate (OCN—R—NCO) is represented by formula (I) below:

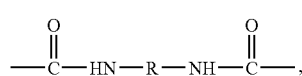

(I)

in which R is an alkylene, cycloalkylene, or arylene group. Representative examples of these di-isocyanates can be found in U.S. Pat. Nos. 4,385,133, 4,522,975 and 5,167,899. Preferred di-isocyanates include, but are not limited to, 4,4'-diisocyanatodiphenylmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate. More preferred are 4,4'-di-isocyanato-dicyclohexylmethane and 4,4'-di-isocyanato-diphenylmethane. A preferred is 4,4'-di-isocyanatodiphenylmethane.

Di-isocyanates also include aliphatic and cycloaliphatic isocyanate compounds, such as 1,6-hexamethylene-di-isocyanate; ethylene di-isocyanate; 1-isocyanato-3,5,5-trimethyl-1-3-isocyanatomethylcyclohexane; 2,4- and 2,6-hexahydro-toluenedi-isocyanate, as well as the corresponding isomeric mixtures; 4,4'-, 2,2'- and 2,4'-dicyclohexyl-methanedi-isocyanate, as well as the corresponding isomeric mixtures. Also, 1,3-tetramethylene xylene di-isocyanate can be used with the present invention. The isocyanate may be selected from organic isocyanates, modified isocyanates, isocyanate-based pre-polymers, and mixtures of two or more of these isocyanates.

Any of the organic diisocyanates previously employed in TPU preparation can be employed, including aromatic, aliphatic, and cycloaliphatic diisocyanates, and mixtures thereof. Illustrative isocyanates include, but are not limited to, methylenebis(phenyl isocyanate), including the 4,4'-isomer, the 2,4'-isomer and mixtures thereof; m- and p-phenylene diisocyanates; chlorophenylene diisocyanates; α,α'-xylylene diisocyanate; 2,4- and 2,6-toluene diisocyanate and the mixtures of these latter two isomers, which are available commercially; tolidine diisocyanate; hexamethylene diisocyanate; 1,5-naphthalene diisocyanate; isophorone diisocyanate and the like; cycloaliphatic diisocyanates, such as methyl-enebis(cyclohexyl isocyanate), including the 4,4'-isomer, the 2,4'-isomer and mixtures thereof, and all the geometric isomers thereof, including trans/trans, cis/trans, cis/cis, and mixtures thereof; cyclohexylene diisocyanates (1,2-; 1,3-; or 1,4-); 1-methyl-2,5-cyclohexylene diisocyanate; 1-methyl-2,4-cyclohexylene diisocyanate; 1-methyl-2,6-cyclohexylene diisocyanate; 4,4'-isopropylidenebis-(cyclohexyl isocyanate); 4,4'-diisocyanatodicyclohexyl, and all geometric isomers and mixtures thereof and the like.

Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols, such as the modified methylenebis(phenyl isocyanates) described in U.S. Pat. Nos. 3,394,164; 3,644,457; 3,883,571; 4,031,026; 4,115,429; 4,118,411; and 4,299,347; each incorporated herein by reference. The modified methylenebis(phenyl isocyanates) also include those, which have been treated so as to convert a minor proportion of the diisocyanate to the corresponding carbodiimide, which then interacts with further diisocyanate to form uretone-imine groups, the resulting product being a stable liquid at ambient temperatures as described, for example, in U.S. Pat. No. 3,384,653; incorporate herein by reference. Mixtures of any of the above-named polyisocyanates can be employed if desired.

Suitable classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis(cyclohexyl isocyanate), inclusive of the isomers described above. In a preferred embodiment the isocyanate is a mixture of 1,3-bis(isocyanatomethyl)cyclohexane and 1,4-bis(isocyanatomethyl)cyclohexane. In a further embodiment, these two isocyanates are present in a weight ratio of about 1 to 1.

The polymeric diols which can be used include those conventionally employed in the art for the preparation of TPU elastomers. The polymeric diols are responsible for the formation of soft segments in the resulting polymer, and preferably have molecular weights (number average) falling in the range from 200 to 10,000 g/mole, preferably from 400 to 4,000 g/mole, and, more preferably from 500 to 3,000 g/mole. It is not unusual, and, in some cases, it can be advantageous, to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides, such as ethylene oxide, propylene oxide, and the like, and mixtures, in which any of the above polyols are employed as major component (greater than 50% w/w) with amine-terminated polyethers and amino-terminated polybutadiene-acrylonitrile copolymers. Additional examples of the diols include the natural oil diols.

Suitable polyether polyols include polyoxyethylene glycols, polyoxypropylene glycols, which, optionally, have been capped with ethylene oxide residues; random and block copolymers of ethylene oxide and propylene oxide; polytetramethylene glycol; random and block copolymers of tetrahydrofuran and ethylene oxide and/or propylene oxide; and products derived from any of the above reaction with difunctional carboxylic acids or esters derived from said acids, in which latter case, ester interchange occurs, and the esterifying radicals are replaced by polyether glycol radicals. The preferred polyether polyols are random and block copolymers of ethylene and propylene oxide of functionality about 2.0 and polytetramethylene glycol polymers of functionality about 2.0.

Suitable polyester polyols include those prepared by polymerizing epsilon-caprolactone using an initiator such as ethylene glycol, ethanolamine, and the like; and those prepared by esterification of polycarboxylic acids such as phthalic, terephthalic, succinic, glutaric, adipic azelaic, and the like acids, with polyhydric alcohols, such as ethylene glycol, butanediol, cyclohexanedimethanol, and the like.

Suitable amine-terminated polyethers are the aliphatic primary diamines structurally derived from polyoxypropylene glycols. Polyether diamines of this type were available from Jefferson Chemical Company under the trademark JEFFAMINE (now available from Basell).

Suitable polycarbonates containing hydroxyl groups include those prepared by reaction of diols, such as propane-1,3-diol, butane-1,4-diol, hexan-1,6-diol, 1,9-nonanediol, 2-methyloctane-1,8-diol, diethylene glycol, triethylene glycol, dipropylene glycol, and the like, with diarylcarbonates, such as diphenylcarbonate, or with phosgene.

Suitable silicon-containing polyethers include the copolymers of alkylene oxides with dialkylsiloxanes, such as dimethylsiloxane, and the like (see, for example, U.S. Pat. No. 4,057,595, or U.S. Pat. No. 4,631,329 cited supra, and already incorporated herein).

Suitable hydroxy-terminated polybutadiene copolymers include the compounds available under the trade name Poly BD Liquid Resins from Arco Chemical Company. Hydroxy-terminated polybutadiene copolymers are also available from Sartomer. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively. Preferred diols are the polyether and polyester diols set forth above.

The difunctional extender employed can be any of those known in the TPU art disclosed above. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyldiethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

While any of the diol extenders, described and exemplified above, can be employed alone, or in admixture, it is preferred to use 1,4-butanediol, 1,6-hexanediol, neopentyl glycol, 1,4-cyclohexanedimethanol, ethylene glycol, and diethylene glycol, either alone, or in admixture, with each other, or with one or more aliphatic diols previously named. Particularly preferred diols are 1,4-butanediol, 1,6-hexanediol and 1,4-cyclohexanedimethanol.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions used in the practice of this invention may contain from 2 to 25, preferably from 3 to 20 and more preferably from 4 to 18, wt % of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

The TPU forming ingredients can be reacted in organic solvents, but are preferably reacted, in the absence of solvent, by melt-extrusion, at a temperature of from about 125° C. to about 250° C., preferably from about 160° C. to about 225° C.

It is frequently desirable, but not essential, to include a catalyst in the reaction mixture employed to prepare the compositions of the invention. Any of the catalysts, conventionally employed in the art, to catalyze the reaction of an isocyanate with a reactive hydrogen containing compound, can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960; each incorporated herein by reference. Such catalysts include organic and inorganic acids salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine; triethylenediamine; N,N,N',N'-tetramethylethylenediamine; N,N,N',N'-tetraethylethylenediamine, N-methylmorpholine; N-ethylmorpholine; N,N,N',N'-tetramethylguanidine; N,N,N',N'-tetramethyl-1,3-butanediamine; N,N-dimethylethanolamine; N,N-diethylethanolamine; and the like. The amount of catalyst employed, is generally within the range of about 0.02 to about 2.0 percent by weight, based on the total weight of the reactants.

As discussed above, the polyurethanes can be prepared by mixing all ingredients, at essentially the same time in a "one-shot" process, or can be prepared by step-wise addition of the ingredients in a "prepolymer process," with the processes being carried out in the presence of, or without the addition of, optional additives. The polyurethane forming reaction can take place in bulk, or in solution, with, or without, the addition of a suitable catalyst that would promote the reaction of isocyanates with hydroxyl or other functionality. Examples of a typical preparation of these polyurethanes are described in U.S. Pat. No. 5,864,001.

As discussed above, the other main component of the hard segment of the polyurethanes of the present invention is at least one chain extender, which are well know in this technology field. As is known, when the chain extender is a diol, the resulting product is a thermoplastic polyurethane (TPU). When the chain extender is a diamine or an amino alcohol, the resulting product is technically a thermoplastic polyurea (TPUU).

The chain extenders that may be used in the invention are characterized by two or more, preferably two, functional groups, each of which contains "active hydrogen atoms." These functional groups are preferably in the form of hydroxyl, primary amino, secondary amino, or mixtures of two or more of these groups. The term "active hydrogen atoms" refers to hydrogen atoms that, because of their placement in a molecule, display activity according to the Zerewitinoff test as described by Kohler in *J. Am. Chemical Soc.,* 49, 31-81 (1927).

The chain extenders may be aliphatic, cycloaliphatic, or aromatic and are exemplified by diols, diamines, and amino alcohols. Illustrative of the difunctional chain extenders are ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethyl-hexanediols, 1,6-hexanediol and other hexanediols, 2,2,4-trimethylpentane-1,3-diol, decanediols, dodecanediols, bisphenol A, hydrogenated bisphenol A, 1,4-cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America), N-methylethanolamine, N-methyl isopropylamine, 4-aminocyclo-hexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. If thermoplastic or soluble polyurethanes are to be made, the chain extenders will be difunctional in nature. Amine chain extenders include, but are not limited to, ethylenediamine, monomethanolamine, and propylenediamine.

Commonly used linear chain extenders are generally diol, diamine or amino alcohol compounds characterized by having a molecular weight of not more than 400 g/mol (or Dalton). In this context, by "linear" it is meant that no branching from tertiary carbon is included. Examples of suitable chain extenders are represented by the following formulae: HO—$(CH_2)_n$—OH, $H_2N$—$(CH_2)_n$—$NH_2$, and $H_2N$—$(CH_2)_n$—OH, where "n" is typically a number from 1 to 50.

One common chain extender is 1,4-butane diol ("butane diol" or "BDO"), and is represented by the following formula: HO—$CH_2CH_2CH_2CH_2$—OH. Other suitable chain extenders include ethylene glycol; diethylene glycol; 1,3-propanediol; 1,6-hexanediol; 1,5-heptanediol; triethyleneglycol; 1,2-ethyl hexenediol (EHD diol); and combinations of two or more of these extenders. In one embodiment, the chain extender is 1,2-ethyl hexenediol (EHD diol).

Also suitable, are cyclic chain extenders which are generally diol, diamine or amino alcohol compounds characterized by having a molecular weight of not more than 400 g/mol. In this context, by "cyclic" it is meant a ring structure, and typical ring structures include, but are not limited to, the 5 to 8 member ring structures with hydroxyl-alkyl branches. Examples of cyclic chain extender are represented by the following formulae: HO—R-(ring)-R'—OH and HO—R—O-(ring)-O—R'—OH, where R and R' are one to five carbon alkyl chains, and each ring has 5 to 8 members, preferably all carbons. In these examples, one or both of the terminal —OH can be replaced with —$NH_2$. Suitable cyclic chain extenders include cyclohexane dimethanol ("CHDM") and hydroquinone bis-2-hydrxyethyl ether (HQEE). A structural unit of CHDM, a preferred cyclic chain extender, is represented by the following formula: HO—$CH_2$-(cyclohexane ring)-$CH_2$—OH.

The chain extender is incorporated into the polyurethane in amounts determined by the selection of the specific reactant components, the desired amounts of the hard and soft segments and the index sufficient to provide good mechanical properties, such as modulus and tear strength. The polyurethane compositions used in the practice of this invention may contain from 2 to 25, preferably from 3 to 20 and more preferably from 4 to 18, wt % of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 wt % of the entire reaction mixture leading to the polyurethane composition.

As is well known to those skilled in the art, the ratio of isocyanate to total functional groups determines the Mn of the polymer. In some cases it is desirable to use a very slight excess of isocyanate.

For linear, high Mn polymers, starting materials with two functional groups per chain are desirable. However, it is possible to accommodate starting materials with a range of functionality. For example, a polydiene with one functional end could be used to cap both ends of a polyurethane with the middle portion consisting of repeating isocyanate-chain extender moieties. Polydienes with more than two functional groups will form branched polymers. Although crosslinking and gels can be a problem, if the degree of functionality is too high, this can usually be controlled by process conditions. Such branched polymers will exhibit some rheological characteristics that are desirable in some cases, such as high melt strength.

As discussed above, catalysts that will promote or facilitate the formation of urethane groups may optionally be used in the formulation. Illustrative of useful catalysts are stannous octanoate, dibutyltin dilaurate, stannous oleate, tetrabutyltin titanate, tributyltin chloride, cobalt naphthenate, dibutyltin oxide, potassium oxide, stannic chloride, N,N,N,N'-tetramethyl-1,3-butanediamine, bis[2-(N,N-dimethylamino)ethyl] ether, 1,4-diazabicyclo[2.2.2]octane; zirconium chelates, aluminum chelates and bismuth carbonates. The catalysts, when used, are typically employed in catalytic amounts that may range from 0.001 wt %, and lower, to 2 wt %, and higher, based on the total amount of polyurethane-forming ingredients.

Additives may be used to modify the properties of the polyurethane used in the practice of this invention. Additives may be included in the conventional amounts as already known in the art and literature. Usually additives are used to provide specific desired properties to the polyurethanes such as various antioxidants, ultraviolet inhibitors, waxes, thickening agents and fillers. When fillers are used, they may be either organic or inorganic, but are generally inorganic such as clay, talc, calcium carbonate, silica and the like. Also, fibrous additives, such as glass or carbon fiber, may be added to impart certain properties.

The polyurethane used in the practice of the present invention is preferably prepared by reacting the functional polyester with an isocyanate, and optionally a chain extender. In the 'prepolymer' method, typically one or more functional polydienes are reacted with one or more isocyanates to form a prepolymer. The prepolymer is further reacted with one or more chain extenders. Alternatively, the polyurethanes may be prepared by a one-shot reaction of all of the reactants. Typical polyurethanes have a number average molecular weight from 5,000 to 1,000,000 g/mol, and more preferably from 20,000 to 100,000 g/mol.

In a preferred embodiment of the invention, the polyurethane is formed from a polyester, an isocyanate and a chain extender, and preferably an aliphatic chain extender. In a preferred embodiment, these polyesters have at least one, and more preferably at least two ester groups in the molecule, and typically have a Mn from 500 to 10,000, more preferably from 1,000 to 5,000 and even more preferably from 1,500 to 3,000 g/mol.

In another embodiment, the polyurethane is formed from a composition comprising 10 to 40 wt % of di-isocyanate, preferably 15 to 35 wt % of di-isocyanate; 50 to 85 wt % of a polyester, preferably 55 to 80 wt % of a polyester, and more preferably 60 to 80 wt % of a polyester; and 2 to 15 wt % of a chain extender, preferably 2 to 10 wt % of a chain extender (each weight percentage based on the total weight of reactants). In a further embodiment, the di-isocyanate is an aliphatic or aromatic di-isocyanate, and more preferably 4,4'-diphenylmethane di-isocyanate. In yet a further embodiment, the chain extender is an aliphatic diol. In another embodiment, the polydiene diol has a Mn from 500 to 10,000, more preferably from 1,000 to 5,000 and even more preferably from 1,500 to 3,000, g/mol.

In one embodiment, the polyurethane has a density greater than, or equal to, 0.90 g/cc, preferably greater than, or equal to, 0.95 g/cc, and more preferably greater than, or equal to, 1.00 g/cc. In another embodiment, the polyurethane has a density less than, or equal to, 1.30 g/cc, preferably less than, or equal to, 1.25 g/cc, and more preferably less than, or equal to, 1.20 g/cc. In another embodiment, the polyurethane has a density from 0.90 g/cc to 1.30 g/cc, preferably from 0.95 g/cc to 1.25 g/cc, and more preferably from 1.00 g/cc to 1.20 g/cc. All individual values and subranges from 0.90 g/cc to 1.30 g/cc are included and described herein.

In another embodiment, the polyurethane has a melt index greater than, or equal to, 0.1 g/10 min, preferably greater than, or equal to, 0.2 g/10 min, more preferably greater than, or equal to, 0.5 g/10 min, and even more preferably greater than, or equal to, 1 g/10 min (ASTM D-1238-04, 190° C., 8.7 kg). In another embodiment, the polyurethane has a melt index less than, or equal to, 100 g/10 min, preferably less than, or equal to, 50 g/10 min, more preferably less than, or equal to, 20 g/10 min, and even more preferably less than, or equal to, 10 g/10 min (ASTM D-1238-04, 230° C., 8.7 kg). In another embodiment, the polyurethane has a melt index from 0.1 g/10 min to 100 g/10 min, preferably from 0.5 g/10 min to 50 g/10 min, more preferably from 1 g/10 min to 20 g/10 min, and even more preferably from 1 g/10 min to 10 g/10 min. In a preferred embodiment, the polyurethane has a melt index from 6 g/10 min to 10 g/10 min, and preferably from 7 g/10 min to 9 g/10 min. All individual values and subranges from 0.1 g/10 min to 100 g/10 min are included and described herein.

Preferred polyurethanes include the PELLETHANE™ thermoplastic polyurethane elastomers available from The Dow Chemical Company.

Additional polyurethanes suitable for use in the invention include, but are not limited to, ESTANE thermoplastic polyurethanes, TECOFLEX thermoplastic polyurethanes, CARBOTHANE thermoplastic polyurethanes, TECOPHILIC thermoplastic polyurethanes, TECOPLAST thermoplastic polyurethanes, and TECOTHANE thermoplastic polyurethanes, all available from Noveon; ELASTOLLAN thermoplastic polyurethanes and other thermoplastic polyurethanes available from BASF; and commercial thermoplastic polyurethanes available from Bayer, Huntsman and Merquinsa.

The polyurethane component may contain a combination of two or more suitable embodiments as described above.

If desired, the polyurethanes can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

Fillers

An inventive composition may comprise one or more fillers. Such fillers include, but are not limited to, silicates, aluminates, alumino silicates, aluminum oxides, talc, mica, calcium carbonate, titanium dioxide and magnesium hydroxide. Fillers also include surface modified fillers, including, but not limited to, surface modified silicas and surface modified silicates (preferably talc).

In one embodiment, the filler is a silicate, which is surface modified with an hydroxy silane. In another embodiment, the filler is a talc, which is surface modified with an hydroxy silane.

In another embodiment, the filler is a silicate, which is surface modified with an amino silane. In another embodiment, the filler is a talc, which is surface modified with an amino silane.

In another embodiment, the amino silane is selected from the following structures:

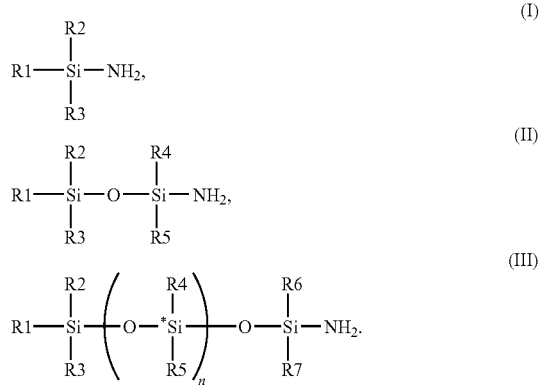

For structure I, each R1, R2 and R3 is, independently, an alkyl (preferably methyl or ethyl), hydrogen, or chlorine.

For structure II, each R1, R2, R3, R4 and R5 is, independently, an alkyl (preferably methyl or ethyl), hydrogen, or chlorine.

For structure III, each R1, R2, R3, R4, R5, R6 and R7 is, independently, an alkyl (preferably methyl or ethyl), hydrogen, or chlorine, and n is from 0 to 50, preferably from 0 to 20, and more preferably from 0 to 10.

In another embodiment, an inventive composition comprises from 0 to 60 weight percent, preferably 5 to 50 weight percent, and more preferably 10 to 40 weight percent, based on the total weight of the composition, of at least one filler. In a further embodiment, the filler is a silicate. In another embodiment, the filler is a talc. In another embodiment, the filler is a silicate, which is surface modified with an amino silane. In another embodiment, the filler is a talc, which is surface modified with an amino silane.

Inventive Compositions

Compositions of the invention comprise a) at least one olefin multi-block interpolymer; b) at least one functionalized olefin-based polymer; and c) at least one thermoplastic polyurethane.

In one embodiment, the functionalized olefin-based polymer is present in an amount less than, or equal to, 20 weight percent, more preferably less than, or equal to, 15 weight percent, more preferably less than, or equal to, 10 weight percent, and even more preferably less than, or equal to, 5 weight percent, based on the total weight of the composition.

In another embodiment, the functionalized olefin-based polymer is present in an amount greater than, or equal to, 50 weight percent, more preferably greater than, or equal to, 60 weight percent, and even more preferably greater than, or equal to, 70 weight percent, based on the total weight of the composition.

In another embodiment, the composition comprises from 75 to 95 weight percent, and preferably from 80 to 75 weight percent of the olefin multi-block interpolymer, preferably an ethylene/α-olefin multi-block interpolymer, based on the total weight of the composition. Preferably, the α-olefin is a $C_3$-$C_{10}$ α-olefin, and more preferably is selected from the group consisting of propylene, 1-butene, 1-hexene and 1-octene.

In another embodiment, the composition comprises from 1 to 10 weight percent of the functionalized olefin-based polymer; and from 99 to 90 weight percent of the olefin multi-block interpolymer, preferably an ethylene/α-olefin multi-block interpolymer, based on the sum weight of these two components. Preferably, the α-olefin is a C3-C10 α-olefin, and more preferably is selected from the group consisting of propylene, 1-butene, 1-hexene and 1-octene.

In another embodiment, the composition comprises from 70 to 100 weight percent of a functional olefin-based polymer, and from 0 to 30 weight percent of an olefin multi-block interpolymer; each weight percentage based on the sum weights of these two components.

In another embodiment, the composition comprises from 5 to 40 weight percent, preferably from 10 to 35 weight percent, and more preferably from 12 to 30 weight percent of a functionalized olefin-based polymer, based on the total weight of the composition.

In another embodiment, the composition comprises greater than, or equal to, 50 weight percent, preferably greater than, or equal to, 55 weight percent, of an olefin multi-block interpolymer, based on the total weight of the composition.

In another embodiment, an inventive composition comprises from 0 to 60 weight percent, preferably 5 to 50 weight percent, and more preferably 10 to 40 weight percent, based on the total weight of the composition, of at least one filler. In a further embodiment, the filler is a silicate. In another embodiment, the filler is a talc. In another embodiment, the filler is a silicate, which is surface modified with an amino silane. In another embodiment, the filler is a talc, which is surface modified with an amino silane.

In another embodiment, the composition comprises from 45 to 60 weight percent, preferably from 50 to 55 weight percent, of an olefin multi-block interpolymer; from 5 to 20 weight percent, preferably from 10 to 15 weight percent, of a functionalized olefin-based polymer; and from 25 to 45 weight percent, preferably from 30 to 40 weight percent, of a filler; each weight percentage is based on the total weight of these three components. In a further embodiment, the filler is a silicate. In another embodiment, the filler is talc.

In another embodiment, the composition comprises from 45 to 60 weight percent, preferably from 50 to 55 weight percent, of an olefin multi-block interpolymer; from 5 to 20 weight percent, preferably from 10 to 15 weight percent, of a functionalized olefin-based polymer; and from 25 to 45 weight percent, preferably from 30 to 40 weight percent, of a surface modified filler; each weight percentage is based on the total weight of these three components. In a further embodiment, the filler is a silicate, which is surface modified with an amino silane. In another embodiment, the filler is a talc, which is surface modified with an amino silane.

An inventive composition may optionally comprise one or more additives. Additives such as process oils, slip agents, anti-block, AO, UV, fillers, may be added to the inventive compositions. Typically an inventive composition will contain one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents, anti-blocking agents, release agents, flame resistant agents, abrasion and scratch mar additives, antimicrobial agents, antistatic agents, and crosslinking agents.

In one embodiment, the functionalized olefin-based polymer is present in an amount less than, or equal to, 20 weight percent, more preferably less than, or equal to, 15 weight percent, and even more preferably less than, or equal to, 10 weight percent, based on the total weight of the composition.

In another embodiment, the composition comprises from 15 to 35 weight percent, and preferably from 20 to 30 weight percent of the thermoplastic polyurethane, based on the total weight of the composition.

In another embodiment, the composition comprises from 55 to 80 weight percent, and preferably from 60 to 75 weight percent of the olefin multi-block interpolymer, based on the total weight of the composition. Preferably the olefin multi-block interpolymer is an ethylene/α-olefin interpolymer. Preferably, the α-olefin is a C3-C10 α-olefin, and more preferably is selected from the group consisting of propylene, 1-butene, 1-hexene and 1-octene, and more preferably 1-octene.

In another embodiment, the composition comprises from 55 to 80 weight percent, and preferably from 60 to 75 weight percent of the olefin multi-block interpolymer, based on the total weight of the composition. Preferably the olefin multi-block interpolymer is an ethylene/α-olefin interpolymer. Preferably, the α-olefin is a C3-C10 α-olefin, and more preferably is selected from the group consisting of propylene, 1-butene, 1-hexene and 1-octene, and more preferably 1-octene.

In another embodiment, the composition comprises from 5 to 10 weight percent of the functionalized olefin-based polymer; from 15 to 35 weight percent of the thermoplastic polyurethane; and from 55 to 80 weight percent of the olefin multi-block interpolymer, based on the total weight of the composition. Preferably the olefin multi-block interpolymer is an ethylene/α-olefin interpolymer. Preferably, the α-olefin is a C3-C10 α-olefin, and more preferably is selected from the group consisting of propylene, 1-butene, 1-hexene and 1-octene, and more preferably 1-octene.

In another embodiment, the composition comprises from 5 to 10 weight percent of the functionalized olefin-based polymer; from 20 to 30 weight percent of the thermoplastic polyurethane; and from 60 to 75 weight percent of the olefin multi-block interpolymer, based on the total weight of the composition. Preferably the olefin multi-block interpolymer is an ethylene/α-olefin interpolymer. Preferably, the α-olefin is a C3-C10 α-olefin, and more preferably is selected from the group consisting of propylene, 1-butene, 1-hexene and 1-octene, and more preferably 1-octene.

An inventive composition may comprise a combination of two or more embodiments as described herein.

In one embodiment, compositions of the invention contain the following: a) at least one olefin multi-block interpolymer; b) at least one thermoplastic polyurethane; and c) at least one functionalized olefin-based polymer formed from an olefin-based polymer and at least one anhydride-containing compound and/or at least one carboxylic acid-containing compound.

In another embodiment, the functionalized olefin-based polymer is present in an amount less than, or equal to, 20 weight percent, preferably less than, or equal to, 15 weight percent, more preferably less than, or equal to, 10 weight percent, and even more preferably less than, or equal to, 5 weight percent based on the total weight of the composition. In a preferred embodiment, the functionalized olefin-based polymer is present in an amount less than, or equal to, 10 weight percent, and preferably less than, or equal to, 5 weight percent, based on the total weight of the composition.

In another embodiment, the composition comprises from 10 to 90 weight percent of the thermoplastic polyurethane, preferably as described herein, and 90 to 10 weight percent of at least olefin multi-block interpolymer, based on the sum weight of the two components. In a further embodiment, the composition comprises from 1 to 10 weight of the functionalized olefin-based polymer.

In another embodiment, the composition comprises from 10 to 50 weight percent, preferably from 25 to 40 weight percent, and more preferably from 25 to 37 weight percent of the thermoplastic polyurethane, preferably as described herein, based on the total weight of the composition.

In another embodiment, the composition comprises from 55 to 80 weight percent, and preferably from 60 to 75 weight percent, and even more preferably 63 to 75 weight percent of the olefin multi-block interpolymer, based on the total weight of the composition.

In another embodiment, the composition comprises from 55 to 80 weight percent, and preferably from 60 to 75 weight percent, and even more preferably 63 to 75 weight percent of an olefin multi-block interpolymer, preferably as described herein, based on the total weight of the composition. Preferably, the olefin multi-block interpolymer is an ethylene multi-block interpolymer, and the α-olefin is selected from the group consisting of propylene, 1-butene, 1-hexene and 1-octene, and more preferably 1-octene.

In one embodiment, the composition comprises from 1 to 10 weight percent of the functionalized olefin-based polymer; from 15 to 50 weight percent of the thermoplastic polyurethane; preferably as described herein, and from 55 to 80 weight percent of the olefin multi-block interpolymer, based on the total weight of the composition. Preferably, the olefin multi-block interpolymer is an ethylene multi-block interpolymer, and the α-olefin is selected from the group consisting of propylene, 1-butene, 1-hexene and 1-octene, and more preferably 1-octene.

In another embodiment, the composition comprises from 1 to 10 weight percent of the functionalized olefin-based polymer; from 25 to 40 weight percent of the thermoplastic polyurethane, preferably as described herein, and from 60 to 75 weight percent of the olefin multi-block interpolymer, based on the total weight of the composition. Preferably, the olefin multi-block interpolymer is an ethylene multi-block interpolymer, and the α-olefin is selected from the group consisting of propylene, 1-butene, 1-hexene and 1-octene, and more preferably 1-octene.

In one embodiment, the composition comprises from 1 to 10 weight percent of the functionalized olefin-based polymer; from 15 to 50 weight percent of the thermoplastic polyurethane, preferably as described herein, and from 55 to 80 weight percent of an ethylene multi-block interpolymer, preferably as described herein, based on the total weight of the composition. Preferably, the α-olefin is selected from the group consisting of propylene, 1-butene, 1-hexene and 1-octene, and more preferably 1-octene.

In another embodiment, the composition comprises from 1 to 10 weight percent of the functionalized olefin-based polymer; from 25 to 40 weight percent of the thermoplastic polyurethane, preferably as described herein, and from 60 to 75 weight percent of an ethylene multi-block interpolymer, preferably as described herein, based on the total weight of the composition. Preferably, the α-olefin is selected from the group consisting of propylene, 1-butene, 1-hexene and 1-octene, and more preferably 1-octene.

In another embodiment, the olefin multi-block interpolymer is present in an amount greater than, or equal to, 50 weight percent, and the polyurethane in an amount less than, or equal to, 50 weight percent, and where both percentages are based on the combined weight of the olefin multi-block interpolymer and the polyurethane. The amounts are preferably from 50 to 90 weight percent olefin multi-block interpolymer, and from 45 to 10 weight percent thermoplastic polyurethane, and more preferably from 55 to 85 weight percent olefin multi-block interpolymer, and from 45 to 15 weight percent thermoplastic polyurethane. In another embodiment, the composition comprises 55 to 80 weight percent of the olefin multi-block interpolymer, and 45 to 20 weight percent of the polyurethane. The amounts are chosen to total 100 weight percent. All individual values and subranges from 50 to 90 weight percent olefin multi-block interpolymer are included herein and disclosed herein. All individual values and subranges from 50 to 10 weight percent polyurethane are included herein and disclosed herein. Preferably, the olefin multi-block interpolymer is an ethylene multi-block interpolymer, and the α-olefin is selected from the group consisting of propylene, 1-butene, 1-hexene and 1-octene, and more preferably 1-octene.

In another embodiment, compositions of this invention comprise 50 weight percent or more, and preferably 60 weight percent or more of the olefin multi-block interpolymer, and 50 weight percent or less and preferably 40 weight percent or less of the thermoplastic polyurethane. In one embodiment, the composition comprises from 50 weight percent to 80 weight percent, and preferably from 55 weight percent to 77 weight percent, of the olefin multi-block interpolymer; and 20 weight percent to 50 weight percent, and preferably from 23 to 45 weight percent of the thermoplastic polyurethane; and where both percentages are based on the combined weight of the olefin multi-block interpolymer and the polyurethane. Preferably, the olefin multi-block interpolymer is an ethylene multi-block interpolymer, and the α-olefin is selected from the group consisting of propylene, 1-butene, 1-hexene and 1-octene, and more preferably 1-octene.

In another embodiment, the inventive compositions comprise greater than 85 weight percent, preferably greater than 90 weight percent, and more preferably greater than 95 weight percent, based on the total weight of the composition, of the combined weight of the olefin multi-block interpolymer and the thermoplastic polyurethane. Preferably, the olefin multi-block interpolymer is an ethylene multi-block interpolymer, and the α-olefin is selected from the group consisting of propylene, 1-butene, 1-hexene and 1-octene, and more preferably 1-octene.

If the compositions used in the practice of this invention comprise components other than the polymer components as discussed above, e.g., filler, pigment, etc., than the combination of the olefin multi-block interpolymer, the thermoplastic polyurethane and functionalized olefin-based polymer, preferably comprise greater than 85, preferably greater than 90 and more preferably greater than 95, weight percent based on the total weight of the blend.

In one embodiment, the compositions used in the practice of the invention have a melt index ($I_2$) from 0.01 to 100, preferably from 0.1 to 50, and more preferably from 1 to 40, and even more preferably from 5 to 40, g/10 min, as determined using ASTM D-1238 (190° C., 2.16 kg load). In another embodiment, the composition has an $I_2$ greater than, or equal to, 0.01, preferably greater than, or equal to, 1 and more preferably greater than, or equal to, 5, g/10 min. In another embodiment the composition has an $I_2$ less than, or equal to, 100, preferably less than, or equal to, 50 and more preferably less than, or equal to, 20, g/10 min. The $I_2$ of the composition is measured on a neat blend, i.e., a blend without other components that may significantly affect the measurement of the $I_2$.

In another embodiment, the compositions have a percent crystallinity of less than, or equal to, 50, preferably less than, or equal to, 30 and more preferably less than, or equal to, 20, percent, as measured by DSC. In one embodiment, these polymers have a percent crystallinity from 2 to 50 percent, including all individual values and subranges from 2 to 50 percent. The crystallinity of the composition is measured on a neat blend, i.e., a blend without other components that may significantly affect the measurement of the crystallinity.

In another embodiment, the compositions have a density greater than, or equal to, 0.855, preferably greater than, or equal to, 0.86 and more greater than, or equal to, 0.87, grams per cubic centimeter (g/cm$^3$ or g/cc). In another embodiment, the composition has a density less than, or equal to, 1, preferably less than, or equal to, 0.97, more preferably less than, or equal to, 0.96, and even more preferably less than, or equal to, 0.95 g/cm$^3$. In one embodiment, the density is from 0.855 to 0.97, preferably from 0.86 to 0.95, and more preferably from 0.865 to 0.93, g/cm$^3$. The density of the composition is measured on a neat blend, i.e., a blend without other components that may significantly affect the measurement of the density. In those embodiments, in which the composition comprises one or more filler, e.g., barium sulfate, talc, etc., the maximum density can exceed 1 g/cm$^3$, e.g., the maximum density can approach or exceed 1.4 g/cm$^3$ depending upon, among other things, the nature and amount of filler.

In another embodiment, the compositions, neat, and in fabricated form, have a tensile strength from 5 to 40, preferably from 8 to 30 and even more preferably from 9 to 20, MegaPascal (MPa).

In another embodiment, the compositions, neat, and in fabricated form, have an elongation in the machine direction or the cross machine direction from 50 to 600, or from 50 to 500, as measured according to ASTM D-638-03.

In another embodiment, the compositions in neat form have a melt strength from 0.5 to 50, and more preferably from 0.5 to 20 and even more preferably from 0.5 to 10, centiNewton (cN).

In another embodiment, the compositions in neat form have a surface tension from 10 to 100, and more preferably from 20 to 70 and even more preferably from 30 to 50, dyne per centimeter at room temperature or 23° C. (dyn/cm).

In another embodiment, the compositions in neat form have a surface tension greater than or equal to 32, more preferably greater than or equal to 33, and even more preferably greater than or equal to 35, dyn/cm at room temperature or 23° C.

In another embodiment, an inventive composition, when extruded at a 200° C. die temp (180° C.-190° C. zone temps), at 80 lbs/hr, through a flat coathanger die, which is 40 mils in thickness and 2 feet in width, produces surface energies>35 dyne/cm.

In another embodiment, an inventive composition is formed into an extruded sheet, which maintains at least 50, preferably at least 60, percent of its original elongation after heat aging at 120° C. for 500 hours (ASTM D-882-02).

In another embodiment, the invention provides for such compositions, as discussed above, and wherein the olefin multi-block interpolymer, and preferably an ethylene/α-olefin multiblock interpolymer, is present as a continuous or co-continuous phase with the thermoplastic polyurethane.

In another embodiment, the invention provides for such compositions, as discussed above, and wherein the olefin multi-block interpolymer, and preferably an ethylene/α-olefin multiblock interpolymer, is present as a co-continuous phase with the thermoplastic polyurethane.

The compositions of the invention may be prepared by combining one or more olefin multi-block interpolymers, and preferably one or more ethylene/α-olefin multiblock interpolymers, with one or more thermoplastic polyurethanes. Typically, the inventive compositions are prepared by post-reactor blending the polymer components (the olefin multi-block interpolymer, the polyurethane and functionalized olefin-based polymer). Illustrative of a post-reactor blending is an extrusion, in which two or more solid polymers are fed into an extruder, and physically mixed into a substantially homogeneous composition. The inventive compositions may be crosslinked and/or foamed. In a preferred embodiment, the inventive compositions are prepared by blending the components in a melt process. In a further embodiment, the melt process is a melt extrusion process, and preferably an "in-line" compounding process.

In another embodiment, the compositions further contain a polypropylene polymer component, such as a homopolymer of propylene, a copolymer of propylene with ethylene or at least one α-olefin, or a blend of a homopolymer and a copolymer, a nucleated homopolymer, a nucleated copolymer, or a nucleated blend of a homopolymer and a copolymer. The α-olefin in the propylene copolymer may be 1-butene, 1-pentene, 1-hexene, 1-heptene, 1-octene or 4-methyl-1-pentene. Ethylene is the preferred comonomer. The copolymer may be a random copolymer or a block copolymer or a blend of a random copolymer and a block copolymer. The polymers may also be branched. As such, this component is preferably selected from the group consisting of polypropylene homopolymers and propylene/ethylene copolymers, or mixtures thereof. This component may a melt flow rate (MFR) (230° C. and 2.16 kg weight) from 0.1 g/10 min to 150 g/10 min, preferably from 0.3 g/10 min to 60 g/10 min, more preferably from 0.8 g/10 min to 40 g/10 min, and most preferably from 0.8 g/10 min to 25 g/10 min. All individual values and subranges from 0.1 to 150 g/10 min are included herein and disclosed herein. This component may also have a density from 0.84 g/cc to 0.92 g/cc, more preferably from 0.85 g/cc to 0.91 g/cc, and most preferably from 0.86 g/cc to 0.90 g/cc. All individual values and subranges from 0.84 g/cc to 0.92 g/cc are included herein and disclosed herein. This component may have has a melting point greater than 125° C.

As used herein, "nucleated" refers to a polymer that has been modified by addition of a nucleating agent such as Millad®, a dibenzyl sorbitol commercially available from Milliken. Other conventional nucleating agents may also be used.

Additives such as process oils, slip agents, anti-block, AO, UV, fillers, may be added to any inventive composition described herein. Typically the composition will contain one or more stabilizers, for example, antioxidants, such as Irganox™ 1010 and Irgafos™ 168, both supplied by Ciba Specialty Chemicals. An example of a hindered phenolic antioxidant is Irganox® 1076 antioxidant, available from Ciba-Geigy Corp. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. Additional additives include, but not limited to, surface tension modifiers, pigments, process oil, wax, blowing agents, anti-block agents, foaming agents, antistatic agents, release agents, blowing agents, foaming agents, antistatic agents, release agents, flame resistant agents, abrasion and scratch mar additives, antimicrobial agents, antistatic agents, and crosslinking agents.

An inventive composition may comprise a combination of two or more suitable embodiments as described herein.

Applications

The compositions described above comprising two or more components or at least three components may be used for many different applications. For example, the invention provides an article comprising at least one component formed from an inventive composition, as described herein. The inventive compositions are particularly suitable for injection molded articles, blow molded articles, over-molded articles, extruded sheets, adhesives, and tie layers between extruded sheets, tie layers between cast sheets, tie layers between films and tie layers between profiles, fibers, and dispersions (aqueous and non-aqueous). Additional articles include a carpet component; artificial leather; artificial turf; an adhesive; a fabric; a dispersion; a wire sheath; a cable; a protective apparel; a coating; a coated article; a laminated article; a foam laminate; a shoe component, such as a shoe outsole, a shoe midsole and shoe unitsole; plastic shoes in general (eg. boots, sandals and galoshes); or synthetic and natural leather articles; or automotive products (for example, airbags, head rests, arm rests, carpet underlayment, paintable automotive parts, etc.), and adhesives to KEVLAR.

In another embodiment, the article is an automotive skin such as an instrument panel skin or a door panel skin; an awning; a tarp; a roofing construction article (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment); a steering wheel; a powder coating; a powder slush molding; a consumer durable; a grip; a handle; a computer component; a belt; appliqués; a footwear component; a conveyor or timing belt; lubricants and engine oil components; fibers; films, film wraps of various sizes; fabrics; artificial leather; injection molded objects, such as injection molded and/or paintable toys; artificial turf; artificial leather; adhesives to Kevlar; films; film wraps of various sizes; dispersions; powder coatings, powder slush moldings or rotational cast moldings (typically, each with a particle size of less than 950 micron), consumer durables, grips, handles, computer components (e.g., key pads), belts, adhesive for fabric/polyurethane (PU) foam laminates (e.g., appliqués and footwear), adhesives (hot melt or otherwise), e.g., for binding an abrasion layer to an extruded article, conveyor and timing belts, fabric, carpet, artificial turf, coatings, wire and cable, and raincoats and similar protective apparel.

Specific applications include adhesives to polyurethane films and foams, and adhesives to polyesters; dyes, paint adhesives and paint adhesion enablers; weldability applications; automotive interiors and exteriors; compatibilizers for polymer compositions; and toughening agents for polymer compositions.

In particular, the inventive compositions can be used in the following applications: (a) outsoles, midsoles, unitsoles, and stiffeners, to be assembled with standard polyurethane adhesive systems currently used by footwear industry, (b) painting of soles and mid-soles with polyurethane paints, currently used by footwear industry, and (c) over-molding of polyolefins and bi-component polyurethanes for multilayered soles and midsoles. In addition, the inventive compositions can be used in other applications, such as automotive applications and construction applications. Automotive applications include, but are not limited to, the manufacture of bumper fascias, vertical panels, soft TPO skins, interior trim and panel skins. Construction applications include, but are not limited to, the manufacture of furniture and toys.

Additional applications include adhesion of co-extruded films, where one or more substrates are compatible or reactive with functional groups such as hydroxyl groups, and the lamination of polyolefin based films to other polar substrates (for example, glass lamination). Further applications include artificial leather to be adhered to polar substrates, such as polyurethane, polyvinyl chloride (PVC), and others. Artificial leather is used for automotive interiors adhering to polyurethane for seating, head liners.

The inventive compositions are also suitable for Health & Hygiene products, such as wipes, cleaning tissues, foams or directly dyable fibers. The inventive compositions can be used to enhance hydrophilicity of the elastomer for novel membrane structures for separation or breathability. The inventive compositions are also suitable for use as self-adhearable elastomers onto metal or textile structures for automotive. As discussed above, the inventive compositions are well suited for blends and compatibilizers with enhanced interaction towards polar polymers, such as TPU, EVA, PVC, PC, PET, PLA (polylactic acid), polyamide esters, and PBT. Such compositions can be used for novel compounds for footwear, automotive, consumer, durables, appliances, electronic housing, apparel, and conveyor belts.

The inventive compositions can also serve as compatibilizers between natural fibers and other polyolefins for use in applications, such as wood binding formulations or cellulose binding formulations. The inventive compositions of the invention are also useful in blends with one or more polyether block amides, such as Pebax® polymers available from Arkema. The inventive compositions may also be used as impact modifiers for nylon. In addition, amine groups of the inventive compositions may be protonated or alkylated to form quartnary nitrogens or ionomers for use as anti-microbials.

The inventive compositions can also be used to enhance the interaction to fillers, such as silica, carbon black or clay, for use in formulations for toners, tires, coatings or other compounds. The inventive compositions may also be used in engine oil viscosity modifiers, engine oil dispersants, dyeable or printable fibers for apparel, paint adhesion promoters, adhesives for glass, metal and PVDC barrier resins, dispersions, components in primers and sizing agents.

Thus the invention also provides a painted substrate, the substrate formed from an inventive composition, as described herein, and the paint comprising at least one of an acrylic polymer, alkyd resin, cellulose-based material, melamine resin, urethane resin, carbamate resin, polyester resin, vinyl acetate resin, polyol and alcohols. In a further embodiment, the paint is a water-based paint. In another embodiment, the paint is an organic solvent based paint.

This embodiment of the invention works well with a wide variety of paint formulations. The major components of solvent-borne paints and coatings are solvents, binders, pigments, and additives. In paint, the combination of the binder and solvent is referred to as the paint vehicle. Pigment and additives are dispersed within the vehicle. The amount of each constituent varies with the particular paint, but solvents traditionally make up about 60 percent of the total formulation. Typical solvents include toluene, xylene, methyl ethyl ketone, methyl isobutyl ketone and water. Binders account for about 30 weight percent, pigments for 7 to 8 weight percent, and additives for 2 to 3 weight percent. Some of the polymers and other additives used in paint formulations include: acrylic polymers, alkyd resins, cellulose based materials, such as cellulose acetate butyrate, melamine resins, carbamate resins, polyester resins, vinyl acetate resins, urethane resins, polyols, alcohols, inorganic materials such as titanium dioxide (rutile), mica flakes, iron oxide, silica, aluminum, and the like.

The invention also provides an over-molded article, the article formed from a polar substrate and a molded overlay formed from an inventive composition, as described herein. In another embodiment, the invention provides an over-molded article, the article formed from a substrate comprising an inventive composition, as described herein, and a molded overlay comprising a polar material. In further embodiment, the article is in the form of a grip, handle or belt.

In another embodiment, the invention provides an over molded article comprising a polycarbonate, as the base sheet having variable thickness, and preferably having at least textured face on which inventive composition can be adhered, typically by a compression molding process, at a moderate temperature of 140° C. Such articles have excellent adhesion. This article can be further laminated with polyolefin using conventional welding techniques, such as by pressure and heat, or a second polycarbonate sheet with a textured surface can be adhered to the exposed surface of the inventive composition film.

The invention also provides a laminated structure comprising a first layer and a second layer, the first layer formed from an inventive composition, as described herein, and the second layer formed from a composition comprising a polar material. In a further embodiment, one of the layers is in the form of a foam. In another embodiment, one of the layers is in the form of a fabric. In a further embodiment, the laminated structure is in the form of an awning, tarp or automobile skin or steering wheel.

In another embodiment, the invention provides a laminate structure comprising a polycarbonate, as the base sheet having variable thickness, and preferably having at least one textured surface on which an inventive composition of the invention can be adhered, typically by a compression molding process at moderate temperature of 140° C. Such laminates have been shown to have excellent adhesion; for example a peel strength of 1N/mm in the case of a polyolefin function-alized with secondary amine groups at a concentration of 1.1 weight percent. This article can be further laminated with polyolefin using conventional welding techniques, for example, by pressure and heat. In addition, a second polycarbonate sheet, with a textured surface, can be laminated over the inventive composition (with textured surface at interface).

Another embodiment of this invention is a multi-laminate structure of polycarbonate and polyolefin films, intercalated for increased toughness of the final structure. Another embodiment would be an inventive composition of elastomeric coating deposited on the surface of polycarbonate to provide a scratch resistant assembly coat that could be easily thermoformed, for example at a thermoforming temperature of approximately 160° C. or so.

The invention also provides a molded article comprising a first component and a second component, the first component is formed from a polar material, and the second component formed from an inventive composition, as described herein. In a further embodiment, the article is in the form of an automobile skin, an appliqué, footwear, a conveyor belt, a timing belt or a consumer durable.

"Laminate," "lamination," and like terms, mean two or more layers, for example, film layers, in intimate contact with one another. Laminates include molded articles bearing a coating. Laminates are not blends, although one or more layers of a laminate may comprise a blend.

"Polar," "polar polymer," and like terms, mean that the polymer molecules have a permanent dipole, i.e., the polymer molecule has a positive end and a negative end. In other words, the electrons in a polar molecule are not shared equally among the atoms of the molecule. In contrast, "nonpolar," "nonpolar polymer" and like terms mean that the polymer molecules do not have a permanent dipole, i.e., the polymer does not have a positive end and a negative end. The electrons in a nonpolar molecule are essentially equally shared among the atoms of the molecule. Most hydrocarbon liquids and hydrocarbon polymers are nonpolar.

Polymers substituted with carboxyl, hydroxyl, and the like, are often polar polymers. Articles prepared from nonpolar polymers have relatively low surface energy, that is, less than about 32 dyne per centimeter (dyne/cm), and articles prepared from polar polymers have relatively high surface energy, that is, 32, or more, dyne/cm. The nonpolar material of this invention typically comprises one or more nonpolar thermoplastic olefinic polymers, typically elastomers, free of any significant amount of polar functionality, for example, hydroxyl, carboxyl, carbonyl, ester, ether, amide, mercaptan, halide and the like groups. The polar material of this invention typically comprises one or more polymers comprising one or more polar functionalities. Typical polymers comprising one or more polar functionalities include, but are not limited to, polyesters, polyethers, polylactic acid, polycarbonates, nylons, polysulfides, polysulfones, polyurethanes, polyvinyl alcohol, poly(vinyl acetate), poly(vinyl chloride), acrylonitrile, ABS, polyamide esters, and polysiloxanes.

"Insignificant amount of polar functionality," and like terms, mean that a polymer does not comprise a sufficient number of polar functional groups to impart a surface energy of at least about 32 dyne/cm to an article made from it.

"Over-molding," and like terms, refer to a process in which one resin is injection into a mold containing a pre-placed substrate, and molded over this substrate. Over-molding is typically used to improve the performance and properties of a final product by over-molding one resin over another polymer substrate. Over-molding can be used to form seamless, integrated parts. Examples of over-molded parts include flexible grip handles on power tools and kitchen utensils, which provide additional gripping properties, without the hygienic concern normally associated with mechanical assemblies. The substrate may be any suitable material, such as a plastic, metal or ceramic part.

"Molded overlay," and like terms, refer to an article comprising at least two parts (an injection molded part and a substrate) that are bound together. The injection molded part is placed on top of the substrate, outside the injection mold. An adhesive may be used to bind the injection molded part to the substrate. The substrate may be any suitable material, such as a plastic, metal or ceramic part.

The substrates to which the inventive compositions can be applied, include a wide range of materials, both polar and nonpolar, such as but not limited to, polymers, metal, wood, concrete, glass, ceramic, and various composites of two or more of these materials. Alternatively, these materials can be applied to an article formed from an inventive composition comprising the same.

Application methods include painting, printing, dying, over-molding and the like, including the many variations on each, for example, spreading, spraying, dipping, extrusion, and other processes. The inventive compositions can be crosslinked before, during or after application to a substrate, and they can be crosslinked in any convenient manner, for example, peroxide, sulfur, moisture, silane, radiation, heat and the like. In one embodiment, the inventive composition is applied to a substrate, and the inventive composition is crosslinked, as it is applied, and/or after it is applied. For crosslinking, the inventive compositions will usually contain unsaturation, for example, a diene-containing PO.

In one embodiment, the inventive compositions can be used to form a tie layer between polar and nonpolar materials, particularly between polar and nonpolar polymeric materials, for example, between a film layer of a nonpolar-PO, such as polyethylene or polypropylene, and a film layer of a polar polymer such as polylactic acid (PLA) or polyamide or polyester. The inventive compositions of this invention are particularly well suited as tie layers for binding together a) a polyethylene or polypropylene film, or a polyethylene or polypropylene surface of a molded article, to b) a film, or surface of a molded article, of an ethylene/acrylic acid copolymer (EAA) or a copolymer of PLA or polyethylene terephthalate (PET). Any processes that combine co-extrusion, extrusion lamination, adhesive lamination, and/or foam casting or extrusion can be used to create these laminated structures, including structures in which one layer comprises a foam.

The inventive compositions may also be used in dispersions, such as water-based dispersions for use as primers in olefinic footwear to promote adhesion to polyurethane glues and leather; fabric coating adhesion (adhesion to PET, Nylon, PP, elastomer rich TPO comprising of POE, EPDM or other non-polar elastomers or combination thereof etc.).

Overall, the inventive compositions may be used for adhesion applications, such as over-molding applications, paintability, and printability. The compositions may also be used in dye applications. Particular adhesion applications include adhesives to polyurethanes in automotive applications, such as instrument panel skins and door panel skins, adhesives in footwear applications, such as various footwear components, and adhesives to polyesters in EPDM conveyor belts. Water-based dispersions prepared from the inventive compositions may be used as adhesives in footwear to adhere polyolefin and polyurethane layers. Water-based dispersions based on the inventive compositions may also be used as primers in olefinic footwear components to promote adhesion to polyurethane glues and adhesion to leather. Additional applications include adhesives for fabric coatings (for example, adhesion to PET, Nylon, PP, elastomer rich TPO comprising of POE, EPDM, other non-polar elastomers, or combination thereof). The inventive compositions may also be used as a component in coatings, paints, adhesives, glues, films, printable surfaces, dyeable films and fibers, artificial leather, protective clothing, artificial turf, carpet fibers, textiles, medical supplies (for example, blood bags and tubing), toys, flexible overmolded goods, soft grips, sportwear, and the like or in any application where adhesion to the polyolefin is desirable. Additional applications are described herein.

Additional particularly preferred applications include automotive thermoformed skins, PU foam adhesion (preferably without the use of current water based primers based on chlorinated maleated polyolefins), house wrap—where high Moisture Vapor Transmission Rate is required (100% PELLETHANE™ 2103-70A meets requirement) and good adhesion to polypropylene woven fabric (scrim); adhesive films (blown or cast); co-extruded films where the POE/TPU is used as a thin adhesive tie layer (for example roofing membrane that needs adhesion using PU glues). In these situations the inventive composition is often employed with an appropriate diol, isocyanate, POE and/or compatibilizer. The inventive composition may result in increased surface energy (>37 dyne/cm) for adhesion to polar materials. If the TPU were totally aliphatic (no aromaticity, no un-saturation)—the POE/TPU system could function as a weatherable coating layer (as opposed to an adhesive tie layer).

In one embodiment, the invention is a method for imparting high frequency (HF) weldability and/or printability to an article comprising a low surface energy, i.e., a nonpolar, material. HF-weldability can allow polyolefin sheets or films to be used in applications such as roofing membranes, stationary, artificial leather, etc., in which polyolefins are desirable due to cost/performance advantages and recyclability. The materials and procedures of HF-welding are known in the art, and are generally described in US2004/0077791. Known methods include the addition of a zeolite or a resin containing polar functionality, e.g., a MAH-grafted resin, or an EAA, EEA, EMA, EBA or EMAA copolymer, to a nonpolar olefinic resin before the nonpolar polymer is subjected to HF-welding or printing. However, these methods generally provide poor weldability and/or printability results relative to the results from this embodiment of the invention under like conditions using like amounts of like materials.

In another embodiment, the invention is a method for imparting at least one of paintability, printability, dyeability and over-moldability to an article comprising a low surface energy material.

This embodiment of the invention works well with a wide variety of paint formulations. The major components of solvent-borne paints and coatings are solvents, binders, pigments, and additives. In paint, the combination of the binder and solvent is referred to as the paint vehicle. Pigment and additives are dispersed within the vehicle. The amount of each constituent varies with the particular paint, but solvents traditionally make up about 60% of the total formulation. Typical solvents include toluene, xylene, methyl ethyl ketone, methyl isobutyl ketone and water. Binders account for about 30 wt %, pigments for 7 to 8 wt %, and additives for 2 to 3 wt %. Some of the polymers and other additives used in paint formulations include: acrylic polymers, alkyd resins, cellulose based materials such as cellulose acetate butyrate, melamine resins, carbamate resins, polyester resins, vinyl acetate resins, urethane resins, polyols, alcohols, inorganic materials such as titanium dioxide (rutile), mica flakes, iron oxide, silica, aluminum and the like.

By way of non-limiting examples, the inventive compositions may be used to promote the adhesion between (i) PU-thermoset foams and polyolefin elastomers (POE), particularly as a tie layer between extruded sheets, films or profiles, (ii) POE/pd-TPU blown films; (iii) neat TPU and POE, (iv) butadiene rubber and TPU or a thermoplastic vulcanate (TPV) such as those described in EP 0 468 947; (v) nylon or another polar plastic and crosslinked chlorinated polyethylene or EPDM in extrusion or molding processes, (vi) polypropylene and TPU fibers, e.g., in carpet, artificial turf, etc. (vii) polar fillers and nonpolar materials, e.g., wire and cable insulation, coatings, etc., (viii) hot melt adhesives and polar substrates, (ix) POE and pd-TPU in molded articles, e.g., footwear and automotive, and (x) aqueous dispersions from which various articles can be produced, e.g., film.

The substrates to which the inventive compositions may be applied include a wide range of materials, both polar and nonpolar, such as but not limited to polymers, metal, wood, concrete, glass, ceramic and various composites of two or more of these materials. Alternatively, these materials can be applied to an article comprising the blend. Application methods include painting, printing, dying, over-molding and the like, including the many variations on each, e.g., spreading, spraying, dipping, extrusion, etc. The inventive compositions can be crosslinked before, during or after application to a substrate, and they can be crosslinked in any convenient manner, e.g., peroxide, sulfur, moisture, silane, radiation, heat and the like. In one embodiment, the composition is applied to a substrate, and the composition is crosslinked as it is applied and/or after it is applied. For crosslinking, the inventive composition will usually contain unsaturation, e.g., a diene-containing PO and/or non-hydrogenated TPU.

In one embodiment, the inventive composition serves as a tie layer between polar and nonpolar materials, particularly between polar and nonpolar polymeric materials, e.g., between a film layer of a polyolefin, such as polyethylene or polypropylene and a film layer of a polar polymer such as polylactic acid (PLA) or polyamide or polyester. The pd-TPUs of this invention are particularly well suited as tie layers for binding a polyethylene or polypropylene film or surface of a molded article to a film or surface of a molded article of an ethylene/acrylic acid copolymer (EAA) or PLA or polyethylene terephthalate (PET). Any processes that combine co-extrusion, extrusion lamination, adhesive lamination, and/or foam casting or extrusion can be used to create these laminated structures, including structures in which comprises foam.

In another embodiment of the invention, an article is provided, containing a film formed from an inventive composition and a polyurethane foam, and wherein the film is adhered to a surface of the polyurethane foam. Such an article may be an instrument panel. In a further embodiment, the adhesion between the inventive film and the polyurethane foam is stronger than the adhesion between the foam and another film, prepared from a composition comprising the same components of the inventive film, except the functionalized polyethylene.

In one embodiment of the invention, a film is provided, formed from an inventive composition. In another embodiment, a film is provided containing at least two layers or plies, and wherein at least one layer or ply is formed from an inventive composition, as described herein. In another aspect of the invention, such a film is formed by co-extrusion or lamination. Such a film may contain one or more morphological features as described herein, and preferably contains a co-continuous phase of the ethylene-based polymer and the polyurethane. An article containing at least one component, containing such a film, or formed from such a film, is also provided. Such articles include, but are not limited to, automotive interior parts, panel skins, fabric coatings, vacuum formed profiles, footwear components, laminated sheets, and other articles. Such articles may be prepared by the respective processes as discussed herein.

In another embodiment of the invention, a film is provided, comprising at least three layers or plies, and wherein at least one layer or ply is formed from an inventive composition, as described herein. In another aspect of the invention, such a film is formed by co-extrusion or lamination. Such a film may contain one or more morphological features as described herein, and preferably contains a co-continuous phase of the ethylene-based polymer and the polyurethane. An article containing at least one component, containing such a film, or formed from such a film, is also provided. Such articles include, but are not limited to, automotive interior parts, panel skins, fabric coatings, vacuum formed profiles, footwear components, laminated sheets, and other articles. Such articles may be prepared by the respective processes as discussed herein.

In another embodiment, the invention provides a film, containing at least two layers, and wherein at least one layer is formed from a composition of the invention, and wherein at least one other layer is formed from a composition comprising a ethylene/α-olefin interpolymer that has a melt strength greater than, or equal to, 5 cN. The invention further provides for an article, comprising such a film, or formed from such a film.

The invention also provides for articles containing at least one component formed from an inventive composition as discussed herein. Such articles can be prepared by one or more respective operations, including, but not limited to, extrusion, thermoforming, blow molding, injection molding, foaming and calendaring process. In one embodiment, the articles, described herein, are non-automotive articles, and used in non-automotive applications.

The invention also provides for methods of preparing the compositions and articles described herein. The invention also provides for various embodiments, and combinations of two or more embodiments, of the compositions, articles and methods, as described herein.

DEFINITIONS

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt index, melt flow rate, molecular weight distribution, percent crystallinity, density and other properties.

The term "composition," as used herein, includes a mixture of materials which comprise the composition, as well as reaction products and decomposition products formed from the materials of the composition.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "polymer," as used herein, refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter. The terms "ethylene/α-olefin polymer" and "propylene/α-olefin polymer" are indicative of interpolymers as described below.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "olefin-based polymer," as used herein, refers to a polymer that comprises more than 50 mole percent polymerized olefin monomer, for example ethylene or propylene (based on the total amount of polymerizable monomers), and optionally may comprise one or more comonomers.

The term, "ethylene-based polymer," as used herein, refers to a polymer that comprises more than 50 mole percent polymerized ethylene monomer (based on the total amount of polymerizable monomers), and optionally may comprise one or more comonomers. This term, as used herein, does not refer to an olefin multi-block interpolymer as described herein.

The term, "ethylene/α-olefin interpolymer," as used herein, refers to an interpolymer that comprises more than 50 mole percent polymerized ethylene monomer (based on the total amount of polymerizable monomers), and at least one α-olefin. This term, as used herein, does not refer to an olefin multi-block interpolymer as described herein.

The term, "propylene-based polymer," as used herein, refers to a polymer that comprises more than 50 mole percent polymerized propylene monomer (based on the total amount of polymerizable monomers), and optionally may comprise one or more comonomers. This term, as used herein, does not refer to an olefin multi-block interpolymer as described herein.

The term, "propylene/α-olefin interpolymer," as used herein, refers to an interpolymer that comprises more than 50 mole percent polymerized propylene monomer (based on the total amount of polymerizable monomers), and at least one α-olefin. This term, as used herein, does not refer to an olefin multi-block interpolymer as described herein.

The term, "propylene/ethylene interpolymer," as used herein, refers to an interpolymer that comprises more than 50 mole percent polymerized propylene monomer (based on the total amount of polymerizable monomers), ethylene monomer, and, optionally, at least one α-olefin. This term, as used herein, does not refer to an olefin multi-block interpolymer as described herein.

The term "amine-reactive group," as used herein, refers to a chemical group or chemical moiety that can react with an amine group.

The terms "hydroxyl-reactive group," or "hydroxy-reactive group," as used herein, refer to a chemical group or chemical moiety that can react with a hydroxy group.

The term "anhydride-containing compound," as used herein, refers to a chemical compound comprising at least one anhydride group.

The term "carboxylic acid-containing compound," as used herein, refers to a chemical compound comprising at least one carboxylic acid group.

The term "amine-containing compound," as used herein, refers to a chemical compound comprising at least one amine group.

The terms "hydroxyl-containing compound," or "hydroxy-containing compound, as used herein, refers to a chemical compound comprising at least one —OH group.

The term "functionalized olefin-based polymer," as used herein, refers to a polymer formed from an olefin-based polymer and one or more compounds, each containing at least one functional group, such as anhydride, carboxylic acid, amine, hydroxyl or imide.

The term "amine-functionalized olefin-based polymer," as used herein, refers to a polymer formed from an olefin-based polymer and one or more compounds, and wherein at least one compound contains at least one amine group.

The term "hydroxyl-functionalized olefin-based polymer," as used herein, refers to a polymer formed from an olefin-based polymer and one or more compounds, and wherein at least one compound contains at least one hydroxyl group.

The term "imide-functionalized olefin-based polymer," as used herein, refers to a polymer formed from an olefin-based polymer and one or more compounds, and wherein at least one compound contains at least one imide precursor capable of forming an imide (see for example, the experimental examples below).

Test Methods

Density is determined in accordance with American Society for Testing and Materials (ASTM) procedure ASTM D792-00, Method B.

Melt index (I2) in g/10 min, is measured using ASTM D-1238-04 (version C), Condition 190° C./2.16 kg. The notation "I10" refers to a melt index, in g/10 min, measured using ASTM D-1238-04, Condition 190° C./10.0 kg. The notation "I21" refers to a melt index, in g/10 min, measured using ASTM D-1238-04, Condition 190° C./21.6 kg. Polyethylene is typically measured at 190° C. while polypropylene is typically measured at 230° C. MFR means melt flow rate for propylene based polymers and is measured using ASTM D-1238 condition 230° C./2.16 kg. For urethane based polymers, including blend comprising such polymers, except PELLETHANE™ polymers, melt index is measured according to ASTM D-1238 condition 190° C./2.16 kg. For PELLETHANE™ (Pellethane™ 2102-80A AND 2103-70A) melt index is measured according to ASTM D-1238 condition 190° C./8.7 kg.

Differential Scanning Calorimeter (DSC) is performed using a TAI model Q1000 DSC equipped with an RCS cooling accessory and an auto-sampler. A nitrogen purge gas flow of 50 cc/min is used. The sample is pressed into a thin film and melted in the press at about 175° C. and then air-cooled to room temperature (25° C.). Material (3-10 mg) is then cut into a 3 mm diameter disk, accurately weighed, placed in a light aluminum pan (ca 50 mg), and then crimped shut. The thermal behavior of the sample is investigated with the following temperature profile. The sample is rapidly heated to 180° C. and held isothermally for 3 minutes in order to remove any previous thermal history. The sample is then cooled to −90° C. at 10° C./min cooling rate and held at −90° C. for 3 minutes.

The sample is then heated to 150° C. at 10° C./min heating rate. The cooling and second heating curves are recorded. Melting temperature (Tm) is determined from the second heating curve. Crystallization temperature (Tc) is determined from the first cooling curve.

Ultimate tensile strength and elongation at break are measured according to ASTM D-638-03. Both measurements are performed at 23° C. on die-cut D638-type IV specimens.

Surface tension is measured in accordance with ASTM D2578-04a, Method B, and DIN 53364 (1986). ARCOTEC test inks are used, which are fluids of defined surface tension, and are available in ranges from 28 to 56 mN/m. Tests are run at room temperature (23 C).

Surface energy is measured using ARCOTEC™ test inks and test pens available from Lotar Enterprises. As a starting point for each check, a test ink or test pen with a medium value should be applied, e.g., 38 mN/m (dyne/cm). If the line of ink stays unchanged, for at least 2 seconds on the surface of the material, without turning into droplets, the surface energy of the material is the same, or higher, than the surface tension of the fluid. In this case, the test ink/test pen with the next higher value is applied to the surface, e.g., 40 mN/m (dyne/cm). This check has to be repeated with the next higher value of surface tension, up to the point, at which, within 2 seconds, the line of fluid turns into separate droplets. If already at the starting point (38 mN/m (dyne/cm)) droplets are formed from the line of fluid, the check is continued with test inks/test pens of lower values, which is often the case with metals. As a general limit often 32 mN/m (dyne/cm) are mentioned. If the surface energy level is below this value, the adhesion will be poor, above this value the adhesion will be good or sufficient.

Sheet hardness properties are measured according to ASTM D2240-05. The tensile properties are determined according to standard test method ASTM D638-03.

Melt tension is measured on selected polymer samples on a Goettfert Rheotens melt tensile tester at a temperature of 190° C. The Rheotens tester is composed of two counter rotating wheels, which pull a molten strand, extruded from a capillary die, at a constant velocity. The wheels are equipped with a balance to measure the stress response of the melt, as the wheels accelerate. The wheels are allowed to accelerate until strand rupture. The force to break the strand is taken as the melt tension in centiNewton (cN).

The RR (V0.1/V100) is determined by examining samples using melt rheology techniques on a Rheometric Scientific, Inc. ARES (Advanced Rheometric Expansion System) dynamic mechanical spectrometer (DMS). The samples are examined at 190° C., using the dynamic frequency mode, and 25 millimeter (mm) diameter parallel plate fixtures with a 2 mm gap. With a strain rate of 8%, and an oscillatory rate that is incrementally increased from 0.1 to 100 rad/sec, five data points are taken for each decade of frequency analyzed. Each sample (either pellets or bale) is compression molded into 3 inch (7.62 centimeter (cm)) diameter plaques by ⅛ inch (0.049 cm) thick at 20,000 psi (137.9 megapascals (MPa)) pressure for one minute at 180° C. The plaques are quenched and cooled (over a period of 1 minute) to room temperature. The "25 mm plaques" are cut from the center portion of larger plaques. These 25 mm diameter aliquots are then inserted into the ARES, at 190° C., and allowed to equilibrate for five minutes, prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

Interpolymer Mooney Viscosity, MV, (ML 1+4 at 125° C.) is measured in accordance with ASTM D1646-04. The processing rheology ration, PRR, is calculated from the MV and the RR in accordance with the formula; PRR=RR+[3.82−interpolymer Mooney Viscosity ($ML_{1+4}$ at 125° C.)]×0.3. ML refers to Mooney Large Rotor. The viscometer is a Monsanto MV2000 instrument.

Tensile Strength and elongation were measured in accordance with ASTM D-882-02. The samples were extruded sheets.

Tear, Type C, was measured in accordance with ASTM D-882-02. Samples were extruded sheets.

Gloss (60 degrees) was measured in accordance with ASTM D-2457-03. Samples were extruded sheets.

Heat Aging Study. For each analysis, the sample (extruded sheet) was thermally treated at 120° C. in a convection oven (Lindberg Blue Oven, Model ESP-400C-5, forced air) for the period of time as noted in, for example, Tables 9 and 10 in the examples below. After this thermal treatment, the sample was equilibrated to room temperature (16 hr-96 hr 9 see ASTM D573, 10.5)). The tensile strength and elongation were then measured in accordance with ASTM D-882-02.

Moisture Vapor Transmission Test (ASTM E 96/E 96M-05, Imperial Method)—was used to determine the moisture vapor transmission rate (MVT) and Permeance by the desiccant method. The temperature and relative humidity for the evaluation were 72° F. and 50%, respectively. Non-laminated films were sealed to the open mouth of a test dish containing a desiccant, and the assembly placed in the controlled atmosphere of 72° F. and 50% relative humidity. Periodic weighings determine the rate of water vapor movement through the specimen into the desiccant. To a deviation of 13.3 of ASTM E 96/E 96M-05, the MVT and Permeance were normalized to film thickness giving the normalized MVT and permeability coefficient, respectively by multiplying the MVT and Permeance by the thickness of the film measured. This was done since the Permeance and MVT are directly related to the thickness of the specimen, and the thickness variability resulted in the process of the film fabrication.

Fourier Transform Infrared Spectroscopy (FTIR) Analysis Maleic Anhydride Content The concentration of maleic anhydride is determined by the ratio of peak heights of the maleic anhydride at wave number 1791 $cm^{-1}$ to the polymer reference peak, which in case of polyethylene, is at wave number 2019 $cm^{-1}$. Maleic anhydride content is calculated by multiplying this ratio with the appropriate calibration constant. The equation used for maleic grafted polyolefins has the following form.

$$MAH(wt.\%)=A*\{[FTIR\ PeakArea@1791\ cm^{-1}]/[FTIR\ PeakArea\ 2019\ cm^{-1}]+B*[FTIR\ PeakArea@1712\ cm^{-1}]/[FTIR\_PeakArea@2019\ cm^{-1}]\} \quad (Eqn.\ 1)$$

The calibration constant A can be determined using C13 NMR standards. The actual calibration constant may differ slightly depending on the instrument and polymer. The second component at wave number 1712 $cm^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 $cm^{-1}$. The constant B in Equation 1 is a correction for the difference in extinction coefficients between the anhydride and acid groups.

The sample preparation procedure begins by making a pressing of the sample, typically 0.05 to 0.15 millimeters in thickness, in a heated press, between two protective films, at 150-180° C. for 1 hour. MYLAR and TEFLON are suitable protective films to protect the sample from the platens. Aluminum foil must never be used (maleic anhydride reacts with aluminum). Platens should be under pressure (~10 ton) for about 5 minutes. The sample is allowed to cool to room temperature, placed in an appropriate sample holder, and then scanned in the FTIR. A background scan should be run before each sample scan or as needed. The precision of the test is good with an inherent variability of less than ±5%. Samples should be stored with desiccant to prevent excessive hydrolysis. Moisture content in the product has been measured as high as 0.1 weight percent. The conversion of anhydride to acid however is reversible with temperature but may take up to one week for complete conversion. The reversion is best performed in a vacuum oven at 150° C. and a good vacuum (near 30 inches Hg) is required. If the vacuum is less than adequate the sample tends to oxidize resulting in an infrared peak at approximately 1740 cm$^{-1}$ which will cause the values to be too low. Maleic anhydride and acid are represented by peaks at about 1791 cm$^{-1}$ and 1712 cm$^{-1}$, respectively.

Testing Methods Relating to the Characterization of the Olefin Multi-Block Interpolymers 1. GPC Method for Samples 1-4 and A-C An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) N$_2$. The polymer samples are heated to 160° C., and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

2. Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

3. DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

4. GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)):
$M_{polyethylene}=0.431(M_{polystyrene})$.

Polyethylene equivalent molecular weight calculations are performed using Viscotek TriSEC software Version 3.0.

5. Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

6. Density

Samples for density measurement are prepared according to ASTM D 1928. Measurements are made within one hour of sample pressing using ASTM D792, Method B.

7. Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

8. Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

The 45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

9. Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

The 100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

10. TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

11. DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

12. Melt Index

Melt index, or $I_2$, is measured in accordance with ASTM D 1238, Condition 190° C./2.16 kg for polyethylene-based polymers (Condition 230 C/2.16 kg for polypropylene-based polymers). Melt index, or $I_{10}$ is also sometimes measured in accordance with ASTM D 1238, Condition 190° C./10 kg.

13. ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

14. $^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

15. Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

16. Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

EXAMPLES

The following examples illustrate, but do not, either explicitly or by implication, limit the present invention.

The following components were used in the examples below.

PELLETHANE™ 2102-80A is a thermoplastic polyurethane, with a density of 1.18 g/cc, and a melt index (I2) of 4 g/10 min as measured at 190° C. and 8.7 kg (available from The Dow Chemical Company).

PELLETHANE™ 2103-70A is a thermoplastic polyurethane, with a density 1.06 g/cc (ASTM D 792), and a melt index (I2) of 11 g/10 min as measured at 190° C. and 8.7 kg (available from The Dow Chemical Company).

PELLETHANE™ 2355-80AE is a thermoplastic polyurethane, with a density 1.18 g/cc (ASTM D 792), and a melt index (I2) of 7 g/10 min as measured at 190° C. and 8.7 kg (available from The Dow Chemical Company).

PELLETHANE™ 2103-80AEF is a thermoplastic polyurethane, with a density 1.13 g/cc (ASTM D 792), and a melt index (I2) of 13 g/10 min as measured at 190° C. and 8.7 kg (available from The Dow Chemical Company).

AMPLIFY™ GR-216 is an ethylene/octene-1 copolymer grafted with ca. (about) 0.8 wt % maleic anhydride, and with a density of 0.875 g/cc, and a melt index (12) of 1.3 (available from The Dow Chemical Company).

AFFINITY-g-Amine also referred to as AFFINITY GA1950-g-Amine or AFFINITY GA-g-Amine is prepared by reacting a maleic anhydride grafted AFFINITY GA 1950 resin of density 0.87 g/cc, maleic anhydride content of a 0.7 wt % by imbibing 2 molar equivalents of ethylethylenediamine and then melt mixing through a small REX extruder. Affinity GA1950 resins are extremely low molecular weight resins typically characterized by viscosity rather than melt index. The Brookfield viscosity of the resin before MAH grafting is 17000 cps at 177 C (measured via ASTM D 1084).

8407-g-MAH is prepared by reacting an ENGAGE™ 8407 ethylene-octene copolymer with a density of 0.87 g/cc and a melt index of 30 with maleic anhydride. The final melt index is close to 5 with a maleic anhydride content close to 0.8 wt %.

8402-g-Amine is prepared from a 0.8 wt % MAH grafted ENGAGE™ 8402 (density=0.9, 30 MI before grafting, 5 MI after grafting) by first imbibing 2 molar equivalents of ethylethylenediamine and then putting the imbibed pellets through a REX extruder.

AMPLIFY™ GR216-g-Amine refers to an AMPLIFY GR216 Maleic Anhydride (MAH) grafted polymer available from Dow that has a 1.25 MI, density of 0.87, a graft content of 0.8 wt % that is converted to an imidized amine by first imbibing 2.0 molar equivalents of ethylethylenediamine (DEDA) and then melt blending in a reactive extruder.

LDPE 662i is a low density polyethylene available from Dow Chemicals with a density of 0.917 g/cc and a melt index of 0.47 (190 C/2.16 kg).

VERSIFY 2000-g-DEDA is prepared from a 0.9 wt % MAH grafted VERSIFY™ 2000 propylene-ethylene copolymer with 5 wt % ethylene content. The starting VERSIFY copolymer has a MFR of 2 (230 C/2.16 kg) and a density of 0.888 g/cc. The MAH graft is converted to the imidized amine via reaction with 3 molar equivalents of ethylene diamine.

OBC 9817.10-g-Amine is prepared from a 1.17% MAH grafted D9817.10 Developmental Olefin Block Copolymer (density=0.877, MI of 3.04) by a reactive extrusion process using 3 molar equivalents of ethylethylenediamine.

OBC 9807.10-g-Amine is prepared from a 1.13 wt % MAH grafted D9807.10 Developmental Olefin Block Copolymer(density=0.866, MI of 3.80) by a reactive extrusion process using 3 molar equivalents of ethylethylenediamine.

OBC (32MI)-g-Amine is prepared from a 1.09 wt % MAH grafted OBC (density=0.877, MI of 7.08) by a reactive extrusion process using 3 molar equivalents of ethylene diamine.

The sample labeled 8407-g-Amine (A) is ENGAGE™ 8407-g-(2-[N-ethylamino]butylsuccinimide (0.87 density; ~5 melt index and has the following structure. The grafted polymer was prepared by reacting a maleic anhydride grafted Engage 8407 (0.87 density, 5 MI) material (~0.74 wt % MAH grafting level) with butylethylene diamine using 2 equiv of diamine/anhydride. The diamine is imbibed in the pellets and then it is run through a small REX extruder.

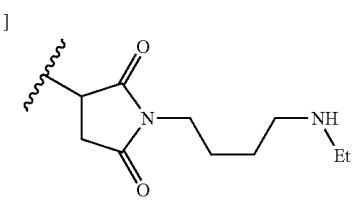 [SMILES: *C1CC(=O)N(CCCCNCC)C1=O]

The 8407-g-Amine (B) is an ENGAGE™ 8407-g-(2-[N-ethylamino]-ethylsuccinimide (0.87 g/cc density; approx. 5 melt index; 1.2 wt % [N-ethylamino]ethylsuccinimide), and has the structure as shown in Schematic A below. This grafted polymer was prepared by reacting a maleic anhydride grafted Engage™ 8407 (0.87 g/cc density, 5 g/10 min MI, and approx. 0.74 wt % MAH grafting level) with ethylethylenediamine, using two equivalents of the diamine/anhydride. The diamine is imbibed in the pellets of the maleic anhydride grafted Engage™ 8407, and the imbibed pellets are melt blended in a small REX extruder.

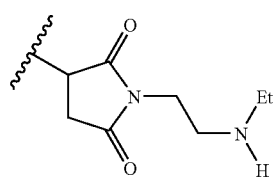
(Schematic A)

The 8407-g-OH is ENGAGE™-g-(2-hydroxyethylsuccinimide) (0.87 g/cc density; approx. 5 g/10 min melt index; 1.0 wt % hydroxyethylsuccinimide), and was prepared by reacting, in an extruder, the maleic anhydride grafted Engage™ 8407 (0.87 density, 5 MI, 0.74 wt % anhydride) with a ethanolamine using 3.5 equivalents of the ethanolamine/anhydride. The reaction is shown below in Schematic B.

Schematic B

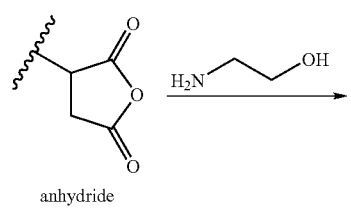
anhydride

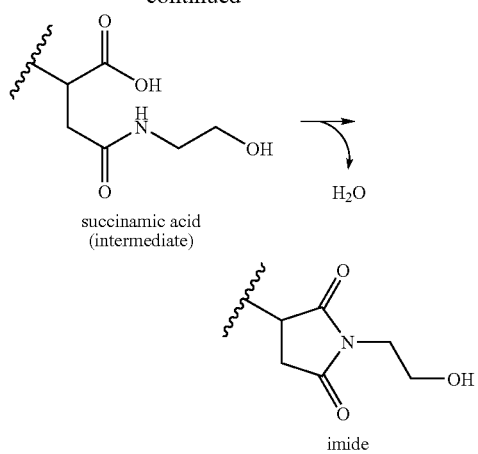

The 8407-g-DEDA refers to an ENGAGE™ 8407 grafted with MAH to ~0.8 wt % with a MI of 5 and a density of 0.87 g/cc then converted to an imidized amine using 3.0 molar equivalents of ethylethylenediamine (DEDA) in a reactive extruder.

AMPLIFY™ GR216-g-DEDA refers to an AMPLIFY GR216 Maleic Anhydride (MAH) grafted polymer available from Dow that has a 1.25 MI, density of 0.87, a graft content of 0.8 wt % that is converted to an imidized amine using 3.0 molar equivalents of ethylethylenediamine (DEDA) in a reactive extruder.

OBC 9817.10-g-Amine is prepared from a 1.17% MAH grafted D9817.10 Developmental Olefin Block Copolymer (density=0.877, MI of 3.04) by a reactive extrusion process using 3 molar equivalents of ethylethylenediamine.

D9507 Developmental Olefin Block Copolymer is an ethylene/octene-1 multiblock copolymer, with a density of 0.866 g/cc and a melt index (I2) of 5 g/10 min (available from The Dow Chemical Company).

D9000.00 Developmental Olefin Block Copolymer is an ethylene/octene-1 multi-block copolymer, with a density of 0.877 g/cc and a melt index (I2) of 0.5 g/10 min (available from The Dow Chemical Company).

D9500 Developmental Olefin Block Copolymer is an ethylene/octene-1 multi-block copolymer, with a density of 0.877 g/cc and a melt index (I2) of 5 g/10 min (available from The Dow Chemical Company).

FUSABOND 493D is a Maleic anhydride grafted ethylene-octene copolymer available from DuPont with a density of 0.87 g/cc and a melt index (I2) of 1.2 (190 C/2.16 kg).

Extruded Sheets

Extruded sheets comprising the compositions labeled A-I in the Table 6 immediately below were made by compounding the composition on a zsk-25 at a temperature profile of 140° C., 170° C., 170° C. and 170° C. for zones 1 through 4 respectively. The resulting composition was then dried and extruded into 20 ml thick sheets using a temperature profile of 175° C., 185° C., 190° C. and using a Killion three sheet line with a Maddock mixing screw.

TABLE 6

| Component | A (wt. %) | B (wt. %) | C (wt. %) | D (wt. %) | E (wt. %) | F (wt. %) | G (wt. %) | H (wt. %) | I (wt. %) |
|---|---|---|---|---|---|---|---|---|---|
| OBC 9000 | 84 | 73.3 | 60.5 | 58 | 53 | 60.5 | 60.5 | 60.5 | 60.5 |
| PELLETHANE 2103-70A | 15 | 25 | 37 | 37 | 37 | 37 | 0 | 0 | 0 |
| PELLETHANE 2355-80AE | 0 | 0 | 0 | 0 | 0 | 0 | 0 | 0 | 37 |
| PELLETHANE 2103-80AEF | 0 | 0 | 0 | 0 | 0 | 0 | 0 | 37 | 0 |
| PELLETHANE 2102-80A | 0 | 0 | 0 | 0 | 0 | 0 | 37 | 0 | 0 |
| AMPLIFY GR216-g-DEDA | 1.01 | 1.7 | 2.5 | 5 | 10 | 0 | 2.5 | 2.5 | 2.5 |
| OBC 9817.10-g-Amine | 0 | 0 | 0 | 0 | 0 | 2.5 | 0 | 0 | 0 |
| Total | 100 | 100 | 100 | 100 | 100 | 100 | 100 | 100 | 100 |

Test conducted on Sheets labeled A-I yielded the following results as shown in Table 7.

TABLE 7

| Tests | A | B | C | D | E | F | G | H | I |
|---|---|---|---|---|---|---|---|---|---|
| Gloss 60 deg-Film Average of Five Readings (%) | 10 | 7 | 23 | 14 | 13 | 19 | 31 | 18 | 14 |
| Tear: Thermoplastic Type C-CD Avg-Tear Strength (lbf/in) | 264 | 253 | 236 | 269 | 308 | 181 | 315 | 320 | 312 |
| Tear: Thermoplastic Type C-MD Avg-Tear Strength (lbf/in) | 269 | 290 | 280 | 286 | 304 | 253 | 370 | 390 | 372 |
| Tensile-CD-D638 Avg-STRESS@BREAK (psi) | 1708 | 1201 | 1893 | 2805 | 2640 | 1626 | 2575 | 2140 | 2567 |
| Tensile-CD-D638 Avg-STRAIN@BREAK (%) | 911 | 746 | 744 | 630 | 812 | 740 | 638 | 681 | 589 |
| Tensile-MD-D638 Avg-STRESS@BREAK (psi) | 2580 | 2435 | 2785 | 2351 | 3366 | 2588 | 3961 | 3464 | 4168 |
| Tensile-MD-D638 Avg-STRAIN@BREAK (%) | 589 | 623 | 751 | 814 | 721 | 686 | 661 | 599 | 592 |
| Surface energy (dyne/cm) | 34 | 34 | 34 | 34 | 34 | 34 | 30 | 34 | 34 |
| Cross-hatch paint adhesion test rating for coating with PU coating AWOF-0082 from United Paint (Rating) | 5 | 5 | 5 | 5 | 5 | 5 | 5 | 5 | 5 |
| Adhesion of "Dow Great Stuff Insulating Foam" (Cohesive failure) (Pass/Fail) | Fail | Fail | Pass | Fail | Fail | Pass | Pass | Pass | Pass |

Extruded sheets comprising the compositions labeled J-Q in the Table 8 immediately below were made by compounding the composition on a zsk-25 at a temperature profile of 140 C, 170 C, 170 C and 170 C for zones 1 through 4 respectively. The resulting composition was then dried and extruded into 20 ml thick sheets using a temperature profile of 175° C., 185° C., 190° C. and using a Killion three sheet line with a Maddock mixing screw.

TABLE 8

| Component | J (wt. %) | K (wt. %) | L (wt. %) | M (wt. %) | N (wt. %) | O (wt. %) | P (wt. %) | Q (wt. %) |
|---|---|---|---|---|---|---|---|---|
| OBC 9000 | 84 | 73.3 | 60.5 | 58 | 53 | 60.5 | 60.5 | 60.5 |
| PELLETHANE 2103-70A | 15 | 25 | 37 | 37 | 37 | 0 | 0 | 0 |
| PELLETHANE 2355-80AE | 0 | 0 | 0 | 0 | 0 | 0 | 0 | 37 |
| PELLETHANE 2103-80AEF | 0 | 0 | 0 | 0 | 0 | 0 | 37 | 0 |
| PELLETHANE 2102-80A | 0 | 0 | 0 | 0 | 0 | 37 | 0 | 0 |
| AMPLIFY GR216-g-MA | 1.01 | 1.7 | 2.5 | 5 | 10 | 2.5 | 2.5 | 2.5 |
| Total | 100 | 100 | 100 | 100 | 100 | 100 | 100 | 100 |

Test conducted on Sheets labeled J-Q yielded the following results as shown in Table 9.

TABLE 9

| Tests | J | K | L | M | N | O | P | Q |
|---|---|---|---|---|---|---|---|---|
| Gloss 60 deg-Film Average of Five Readings (%) | 18 | 22 | 20 | 31 | 28 | 25 | 10 | 15 |
| Tear: Thermoplastic Type C-CD Avg-Tear Strength (lbf/in) | 250 | 254 | 251 | 275 | 293 | 338 | 258 | 304 |
| Tear: Thermoplastic Type C-MD Avg-Tear Strength (lbf/in) | 252 | 299 | 327 | 295 | 290 | 380 | 386 | 420 |
| Tensile-CD-D638 Avg-STRESS@BREAK (psi) | 2307 | 2283 | 2088 | 2806 | 2763 | 1543 | 1506 | 1819 |
| Tensile-CD-D638 Avg-STRAIN@BREAK (%) | 822 | 833 | 743 | 815 | 826 | 564 | 542 | 485 |
| Tensile-MD-D638 Avg-STRESS@BREAK (psi) | 2914 | 3719 | 3254 | 3597 | 3496 | 4123 | 2805 | 3693 |
| Tensile-MD-D638 Avg-STRAIN@BREAK (%) | 710 | 769 | 623 | 768 | 756 | 455 | 532 | 434 |
| Surface energy (dyne/cm) | 34 | 34 | 34 | 34 | 34 | 30 | 35 | 32 |
| Cross-hatch paint adhesion test rating for coating with PU coating AWOF-0082 from United Paint (Rating) | 3 | 5 | 5 | 5 | 5 | 5 | 5 | 5 |
| Adhesion of "Dow Great Stuff Insulating Foam" (Cohesive failure) (Pass/Fail) | Fail | Fail | Pass | Pass | Pass | Fail | Pass | Pass |

Extruded sheets comprising the compositions labeled R-W in the Table 10 immediately below were made by compounding the composition on a zsk-30 at a temperature profile of 140° C., 170° C., 170° C. and 170° C. for zones 1 through 4 respectively. The resulting composition was then dried and extruded into 20 ml thick sheets using a temperature profile of 175° C., 185° C., 190° C. on a ¾" Haake extruder.

TABLE 10

| Component | R (wt. %) | S (wt. %) | T (wt. %) | U (wt. %) | V (wt. %) | W (wt. %) |
|---|---|---|---|---|---|---|
| OBC D9000 | 51.75 | 50.5 | 48 | 0 | 0 | 60.5 |
| Rheology modified OBC (70 wt % OBC 9100 and 30 wt % DS6D82 with Trigonox 101 1500 ppm and Coagent SR 350 1500 ppm) | 0 | 0 | 0 | 60.5 | 0 | 0 |
| Rheology modified OBC (OBC 9100 with Trigonox 101 1500 ppm and Coagent SR350 1500 ppm) | 0 | 0 | 0 | 0 | 60.5 | 0 |
| LDPE 662i | 10 | 10 | 10 | 0 | 0 | 0 |
| PELLETHANE 2103-70A | 37 | 37 | 37 | 37 | 37 | 37 |
| AMPLIFY GR 216 | 1.25 | 2.5 | 5 | 2.5 | 2.5 | 2.5 |
| Total | 100 | 100 | 100 | 100 | 100 | 100 |

Test conducted on Sheets labeled R-W yielded the following results as shown in Table 11.

TABLE 11

| Tests | R | S | T | U | V | W |
|---|---|---|---|---|---|---|
| Gloss 60 deg-Film Average of Five Readings (%) | 13.6 | 15.58 | 7.94 | 15.64 | 4.76 | 6.68 |
| Tear: Thermoplastic Type C-MD Avg-Tear Strength (lbf/in) | 224 | 241 | 282 | 313 | 230 | 243 |
| Tensile Micro ASTM D 1708 (Avg. ultimate psi) | 343 | 509 | 658 | 1096 | 530 | 635 |
| Tensile Micro ASTM D 1708 (Avg. % elongation) | 238 | 334 | 363 | 500 | 335 | 496 |
| Surface energy (dyne/cm) | 35 | 35 | 35 | 35 | 35 | 35 |
| Cross-hatch paint adhesion test rating for coating with PU coating AWOF-0082 from United Paint (Rating) | 5 | 5 | 5 | 5 | 5 | 5 |
| Adhesion of "Dow Great Stuff Insulating Foam" (Cohesive failure) (Pass/Fail) | Pass | Pass | Pass | Fail | Pass | Pass |

Injection Molded Plaques Study

The inventive compositions in the table below were made by blending five weight percent based on the total composition of a functionalized polyolefin with various weight percentages and types of olefin multiblock copolymer (OBC), SBS 401, and thermoplastic polyurethane. The thermoplastic polyurethane, TPU, is a polycaprolactam polyester diol-based TPU with methylene diisocyanate, and having a density of 1.18 g/cm$^3$, a MFR (190° C./2.16 kg) of 5 g/10 min and a Shore A hardness of 80. SBS 401 is a styrene-butadiene-styrene rubber made by Total Petrochemicals having styrene/butadiene weight ratio of 22:28 wt % and a density of 0.93 g/cm$^3$. The functionalized polyolefin is 8407-g-Amine prepared by reactive extrusion of a MAH grafted Engage 8407 (~0.8 wt % MAH, MI~5) by reacting with 3 molar equivalents of ethylethylediamine. The OBC employed in Samples 1, 2 and 6-8 in the Table 12 below was OBC 9100 while the OBC employed in Samples 3-5 and 9-10 was OBC 9500.

TABLE 12

| | OBC (wt %) | SBS 401 (wt %) | TPU (wt %) |
|---|---|---|---|
| 1 | 40 | 0 | 55 |
| 2 | 0 | 60 | 35 |
| 3 | 40 | 0 | 55 |
| 4 | 0 | 40 | 55 |
| 5 | 25 | 25 | 45 |
| 6 | 0 | 40 | 55 |
| 7 | 60 | 0 | 35 |
| 8 | 25 | 25 | 45 |
| 9 | 0 | 60 | 35 |
| 10 | 60 | 0 | 35 |

The inventive compositions of the table above can be injection molded as plaques, typically around 0.5 to 1 cm thick, on an injection molding device typically used in the footwear industry, at the appropriate melt temperature (typically around 160-170 C), the appropriate mold temperature (typically around 60-80 F), and at an appropriate injection speed. Properties are shown in Table 13.

TABLE 13

| Sample | Hardness Shore A | Density g/cc | Load at break Kg/cm2 | Elongation % | Abrasion mm3 | Tear Kg/cm | Melt Index I5 |
|---|---|---|---|---|---|---|---|
| 1 | 73 | 1.001 | 17.8 | 1131 | 201 | 43 | 36 |
| 2 | 63 | 1 | 9.9 | 928 | 178 | 37 | 1.1 |
| 3 | 76 | 0.991 | 12 | 867 | 197 | 51 | 5 |
| 4 | 68 | 1.048 | 12.8 | 922 | 96 | 45 | 4.5 |
| 5 | 72 | 1.008 | 10.4 | 874 | 164 | 44 | 5.7 |
| 6 | 67 | 1.048 | 15.3 | 1056 | 107 | 44 | 4.6 |
| 7 | 75 | 0.983 | 9.2 | 1158 | 332 | 43 | 2.8 |
| 8 | 69 | 1.004 | 14.6 | 1055 | 179 | 37 | 4.8 |
| 9 | 65 | 1.002 | 6.6 | 705 | 143 | 30 | 1 |
| 10 | 77 | 0.968 | 6.3 | 817 | 179 | 42 | 8.6 |

Injection Molding—Compounded Blends and "At Press Blends"

Compounding of Blends

Blends were prepared on a Werner and Pfleider zsk-25 compounding extruder. Prior to compounding, The TPU and the polyolefin were fed through separate weight loss feeders that were controlled to feed in the ratio of the desired composition. AMPLIFY™ GR216, Polybd 2035, or grafted amine polymers were dry blended with the polyolefin and fed together. The extruder was operated at an rpm that was 10 times the total flow rate in lb/hr. As an example, the extruder rpm was 500 for a total flow rate of 50 lbs/hr. A temperature profile of 140° C. in zone 1, and 170° C. in zone 2 though zone 8, was used. The extruded strand was palletized, upon exiting the extruder, to form compounded pellets. Blend formulations are shown in Table 14 below.

D 9500 Developmental Olefin Block Copolymer is an ethylene-octene block copolymer of 5 MI (190 C, 2.16 kg), density=0.877.

PELLETHANE™ 2103-70A is a thermoplastic polyurethane, with a density 1.06 g/cc (ASTM D 792), and a melt index (I2) of 11 g/10 min as measured at 190° C. and 8.7 kg (available from The Dow Chemical Company).

AMPLIFY™ GR216 is a MAH grafted ethylene-octene copolymer with a MI of 1 and density of 0.87

POLYBD 2035 is a polybutadiene diol based TPU having a Tg of –34° C., specific gravity @ 25 C of 0.995 g/cc, tensile strength of 1711 psi, 12 of 1 g/10 min, hard segment content of 35 wt %, softening point of 90° C., and 559% elongation (available from Sartomer Company, Inc.).

The 8407-g-Amine refers to an ENGAGE™ 8407 grafted with MAH to ~0.8 wt % with a MI of 5 and a density of 0.87 g/cc then converted to an imidized amine using 3.0 molar equivalents of ethylethylenediamine (DEDA) in a reactive extruder

TABLE 14

| Blend Formulations | | | | | |
|---|---|---|---|---|---|
| | 46 | 47 | 48 | 49 | 50 |
| OBC 9500.00 | 65 | 60 | 60 | 60 | 65 |
| PELLETHANE 2103-70A | 35 | 35 | 35 | 35 | 30 |
| POLYBD 2035 | 0 | 5 | 0 | 0 | 5 |
| AMPLIFY GR216 | 0 | 0 | 5 | 0 | 0 |
| 8407-g-Amine | 0 | 0 | 0 | 5 | 0 |

At Press Blends

The blends shown in Table 15 below were dry blended and injection molded, at press, without any compounding step.

TABLE 15

| At Press Blend Formulations | | | | | | | |
|---|---|---|---|---|---|---|---|
| | 51 | 52 | 53 | 54 | 55 | 56 | 57 |
| OBC 9500.00 | 65 | 60 | 60 | 60 | 65 | 100 | 0 |
| PELLETHANE 2103-70A | 35 | 35 | 35 | 35 | 30 | 0 | 100 |
| POLYBD 2035 | 0 | 5 | 0 | 0 | 5 | 0 | 0 |
| AMPLIFY GR216 | 0 | 0 | 5 | 0 | 0 | 0 | 0 |
| 8407-g-Amine | 0 | 0 | 0 | 5 | 0 | 0 | 0 |

Injection Molding Examples

Injection molding was carried out on an ARBURG 370C-80 ton injection molder. Typical injection molding conditions are shown in the following Table 16 for compound blends, as well blends molded at press

TABLE 16

Injection Molding Conditions

| | At press blend 41; 1/16" plaque and 1/8" plaque | Compound 46; (4 × 6 × 1/16" & 4 × 6 × .0625" plaque) |
|---|---|---|
| Barrel and Mold Temperatures | | |
| Zone 1 Temp. T801 (° F.) | 250 | 250 |
| Zone 2 Temp. T802 (° F.) | 350 | 350 |
| Zone 3 Temp. T803 (° F.) | 375 | 392 |
| Zone 4 Temp. T804 (° F.) | 375 | 392 |
| Nozzle Temp. T805 (° F.) | 375 | 392 |
| Mold Temperature (° F.) | 70 | 65 |
| Extruder | | |
| RPM v401 (m/min) | 10 | 30 |
| Backpressure p401 (Bar) | 75 | 15 |
| Dosage V403 (ccm) | 45/70 | 45/70 |
| Real Dosage V403 (ccm) | 47/72 | 47/72 |
| Optimal Injection | | |
| Injection Speed #1 Q301 (ccm/s) | 30 | 16 |
| Transfer Position V311 (ccm) | 15 | 12 |
| Pressure at transfer p358I (bar) | 1109/610 | 825/383 |
| Fill Time t305m (s.) | 1.19/2.01 | 2.3/3.83 |
| Cushion V3211 (ccm) | 9.5/7.1 | 5.6/3.2 |
| Hold | | |
| Pressure #1 p321 (Bar) | 400 | 600/390 |
| Time | | |
| Hold Time #1 t321 (s.) | 30 | 30 |
| Cool Time t400 (s.) | 20 | 20 |
| Dosage Time t402m (s.) | 14.2/23.3 | 8.7/11.2 |
| Cycle Time t902 (s.) | 57.7/62.5 | 59/59.5 |

Physical Property Determination

The abrasion test used is in accordance with ASTM D 1242, however, the samples were abraded in a TABER abrasion instrument, using various types of abrasion wheels. The resulting weight loss was measured, and the percentage weight loss reported Tensile testing was conducted per ASTM D 638, at 20 in/min. The tensile stress, elongation, and toughness at break were each determined based on this test.

Shore A hardness was measured per ASTM D2240. This test method permits hardness measurements based on either initial indentation or indentation after a specified period of time, or both. In this case, a specified time of five seconds was used.

Tear-Gull Wing was based upon ASTM D 1004. The test primarily measures the force to initiate tearing.

Flexural modulus was measured per ASTM D 790. This test measures the flexural, or bending properties of the samples.

A test using "DOW GREAT STUFF" foam was also conducted. This test was applied to a "2" diameter disc of the blown films with a small rectangular tape tab attached one cm from the edge of the diameter, and allowed to cure overnight. The sample was pulled using the tape tab by hand and cohesive vs. adhesive failure of the foam was noted. A control neat polyolefin sample would show no adhesion or residue of the foam The physical properties of the compounded blends are shown in Table 17 below. The physical properties of the press blends are shown in Table 18 below.

TABLE 17

Physical Properties of Compounded Blends

| | | Units | 46 | 47 | 48 | 49 | 50 |
|---|---|---|---|---|---|---|---|
| Abrasion Modified | % weight loss | | 4.5 | 6.1 | 3.3 | 3.9 | 5.9 |
| | Std Dev Abrasion | | 0.2 | 0.1 | 0.1 | 0.1 | 0.1 |
| Flexural Modulus | Avg-FlexMod | ksi | 2.4 | 1.9 | 2.1 | 2.3 | 2.1 |
| | StdDev-FlexMod | ksi | 0.4 | 0.2 | 0.0 | 0.1 | 0.0 |
| Hardness Type A-5 sec | Average of Five Readings | | 66.7 | 61.6 | 72.1 | 70.6 | 64.2 |
| | Std Dev of Five Readings | | 1.0 | 0.5 | 0.5 | 0.6 | 0.5 |
| Tear-Gull Wing | Avg-TEAR RESISTANCE | lbf/in | 188.1 | 154.0 | 215.8 | 215.2 | 162.7 |
| | StdDev-TEAR RESISTANCE | lbf/in | 4.7 | 11.4 | 1.3 | 2.5 | 2.7 |
| Tensile | Avg-STRAIN@BREAK | % | 1084.2 | 604.8 | 747.8 | 643.0 | 757.6 |
| | Avg-STRESS@BREAK | psi | 1130.8 | 879.9 | 1538.3 | 1034.5 | 910.0 |
| | Avg-Toughness | in * lbf | 158.7 | 68.2 | 112.6 | 80.4 | 89.2 |
| | StdDev-STRAIN@BREAK | % | 246.2 | 129.1 | 54.6 | 46.2 | 114.2 |
| | StdDev-STRESS@BREAK | psi | 89.5 | 90.6 | 231.7 | 37.7 | 64.6 |
| | StdDev-Toughness | in * lbf | 41.9 | 19.0 | 14.5 | 6.4 | 13.8 |

TABLE 18

Physical Properties of At Press Blends

| | | Units | 51 | 52 | 53 | 54 | 55 | 56 | 57 |
|---|---|---|---|---|---|---|---|---|---|
| Abrasion | % weight loss | | 5.4 | 5.5 | 4.1 | 2.7 | 5.7 | 0.6 | 0.0 |
| | Std Dev Abrasion | | 0.0 | 0.1 | 0.0 | 0.1 | 0.0 | 0.0 | 0.1 |
| Flexural Modulus | Avg-FlexMod | ksi | 2.7 | 2.7 | 2.9 | 2.7 | 3.1 | 3.8 | 2.3 |
| | StdDev-FlexMod | ksi | 0.5 | 0.1 | 0.4 | 0.3 | 0.7 | 0.1 | 0.3 |
| Hardness Type A-5 | Average of five readings | | 73.0 | 71.9 | 73.3 | 74.1 | 72.9 | 72.6 | 71.0 |
| | Std Dev of Five Readings | | 0.6 | 0.3 | 0.1 | 0.3 | 1.2 | 0.3 | 0.3 |
| Tensile | Avg-STRAIN@BREAK | % | 563.7 | 915.1 | 576.8 | 676.7 | 529.3 | 508.0 | 603.9 |
| | Avg-STRESS@BREAK | psi | 1021.7 | 1183.3 | 1309.2 | 1296.6 | 1063.6 | 945.7 | 3108.5 |
| | Avg-Toughness | in * lbf | 65.8 | 116.7 | 71.7 | 88.7 | 60.0 | 56.5 | 82.7 |
| | StdDev-STRAIN@BREAK | % | 309.6 | 418.2 | 237.2 | 39.2 | 306.2 | 35.0 | 80.1 |
| | StdDev-STRESS@BREAK | psi | 49.4 | 157.3 | 169.0 | 162.9 | 161.4 | 46.7 | 157.3 |
| | StdDev-Toughness | in * lbf | 37.0 | 56.2 | 37.6 | 6.3 | 41.0 | 5.6 | 24.1 |
| Tear-Gull Wing | Avg-TEAR RESISTANCE | lbf/in | 274.3 | 225.2 | 235.1 | 245.0 | 226.3 | 204.7 | 364.4 |
| | StdDev-TEAR RESISTANCE | lbf/in | 17.9 | 12.7 | 4.6 | 7.8 | 4.8 | 4.4 | 21.6 |

Samples with either amine grafted or MAH grafted compatibilizers provide the best balance of properties. Foam failure occurs cohesively based on the foam test for all samples (both compounds as well as at press materials), indicating the utility of such blends for adhesion applications requiring adhesion to polar polymers such as PC, ABS, PET, Nylon. One such application is over-molding.

Blends of OBC and TPU with amine grafted polymers as compatibilizers have superior toughness properties than the neat OBC or TPU. Compositions containing the amine grafted polymers or the MAH grafted polymers provide a good balance of properties.

Overmolding

Overmolding of polycarbonate CALIBRE, ISOPLAST engineering TPU, Nylon CAPRON, or MAGNUM ABS, onto one of "at press blends 51-55" or "compounds 46-50," gave parts that could not be delaminated by hand, whereas the "control 56 neat OBC" yielded over molded parts that could be easily delaminated by hand ISOPLAST 2530 is an Engineering Thermoplastic Polyurethane available from The Dow chemical Company.

CAPRON is a polyamide (Nylon 6) available from BASF.

CALIBRE 200-14 is a polycarbonate available from The Dow Chemical Company.

MAGNUM 3325 ABS is available from The Dow Chemical Company, and has a density of 1.05 g/cc, and a melt flow rate of 10 g/10 min at (220° C./10 kg)

The "at press" and compounded injection molded blends showed excellent adhesion to PU foams. The blends had excellent mechanical properties. The "at press" blends the and compounded blends can be over molded with polar polymers, such as PC, ABS, nylon, ISOPLAST. These blends had comparable toughness to neat TPU.

Blown Films

Compounding of Blends

Blends were prepared on a Werner and Pfleider zsk-25 compounding extruder. Prior to compounding, the TPU and the polyolefin were fed through separate weight loss feeders that were controlled to feed in the ratio of the desired composition. AMPLIFY™ GR216 and LDPE were dry blended with the polyolefin, and fed together. The extruder was operated at an rpm that was 10 times the total flow rate in lb/hr. As an example, the extruder rpm was 500 for a total flow rate of 50 lbs/hr. A temperature profile of 140° C. in zone 1, and 170° C. in zone 2 though zone 8, was used. The extruded strand was palletized, upon exiting the extruder, to form compounded pellets. Blend formulations are shown below in Table 19.

TABLE 19

| | 38 | 39 | 40 | 41 | 42 | 43 | 44 | 45 |
|---|---|---|---|---|---|---|---|---|
| OBC 9000 | 57.48 | 55.05 | | 52.50 | 54.60 | 52.35 | 50.09 | 48.10 |
| ENR 7086 | | | 57.48 | | | | | |
| PELLETHANE 2103-80AEF | 35.15 | 35.15 | 35.15 | 35.15 | 35.15 | 35.15 | 35.15 | 35.15 |
| AMPACET 10063 | 5.00 | 5.00 | 5.00 | 5.00 | 5.00 | 5.00 | 5.00 | 5.00 |
| LDPE 501i | | | | 4.98 | | | | |
| LDPE 132i | | | | | 2.87 | 2.76 | 2.64 | 7.00 |
| AMPLIFY GR216 | 2.38 | 4.80 | 2.38 | 2.38 | 2.38 | 4.75 | 7.13 | 4.75 |
| | 100.0 | 100.0 | 100.0 | 100.0 | 100.0 | 100.0 | 100.0 | 100.0 |

D 9000 Developmental Olefin Block Copolymer is an ethylene-octene block copolymer of 0.5 MI (190° C., 2.16 kg), density=0.877.

PELLETHANE™ 2103-80AEF is a polyether diol based TPU with a density of 1.13 and melt idex of 13 (190° C./8.7 kg).

AMPACET 10063 is an anti-block masterbatch that is 25% silica in a LDPE carrier available from Americhem.

LDPE 501i is a LDPE from Dow with a density of 0.922 and MI of 1.9 (190° C./2.16 kg).

LDPE 132i is a LDPE from Dow with a density of 0.92 and a MI of 0.25 (190° C./21.6 kg).

AMPLIFY™ GR216 is a MAH grafted ethylene-octene copolymer with a MI of 1 and density of 0.87.

A comparative example of a high melt strength ENR7086 ethylene-butene copolymer, with a density of 0.9 g/cc and a MI of 0.3, is also included.

Blown Film Examples

Films were blown on a DR Collin Co-ex film line consisting of the following: three extruders, the die, the cooling ring with chilled air, nip rolls, and a take-up unit to collect the film. The extruders are 25 mm, 30 mm, and 25 mm with 25:1 L/D. The die gap is interchangeable between 1.0, 1.4, and 2.0 mm. The die diameter is 60 mm. The output rate can range from 4 kg/hr up to 20 kg/hr, depending on the resin properties. Only mono-layer structures were created in this study. Typical temperatures profiles used in this study in order of zones 1 through 4, adapter and die were 165, 170, 175, 180 185 and 190° C. and a thickness of 2.5 mil was targeted.

Physical Property Determination

Tensile testing in both the Machine Direction and Cross-Direction was performed per ASTM D 882. Uitmate tensile and elongation and toughness were determines based on this test. The sample was pulled at the rate of 20"/min on an Instron 5500-R.

The 1% secant modulus and 2% secant modulus both in the Machine Direction and Cross-Direction were performed per ASTM D 882. The sample was pulled at the rate of 0.5°/min on an Istron 5500-R.

Thickness was measured using a thwing-albert instrutvient company progage thickness tester. An average of 10 points along the length of the sheet is taken.

Elmendorf tear both in the machine direction and cross direction was performed per ASTM D 1922.

Testing of a PU (polyurethane) foam per 180 degree peel test was conducted on an Istron-5500R on a one inch sample and a peel strength and mode of failure were noted.

In addition a test using "DOW GREAT STUFF" foam was also conducted. This foam was applied to a "2" diameter disc" of the blown films, with a small rectangular tape tab attached one cm from the edge of the diameter, and allowed to cure overnight. The sample was pulled using the tape tab by hand, and cohesive versus adhesive failure of the foam was noted. A control neat polyolefin sample would show no adhesion or residue of the foam The blown film properties are shown below in Table 20.

TABLE 20

| | \multicolumn{8}{c}{Properties of Blown Films.} |
|---|---|---|---|---|---|---|---|---|
| | 38 | 39 | 40 | 41 | 42 | 43 | 44 | 45 |
| Thickness (mil) | 2.54 | 4.16 | 3.37 | 2.53 | 3 | 2.99 | 3.09 | 3.34 |
| Stdev (mil) | 0.09 | 0.67 | 0.2 | 0.14 | 0.97 | 0.23 | 0.17 | 0.57 |
| 1% secant modulus MD (psi) | 5570 | 4256 | 9236 | 7741 | 7694 | 4340 | 2445 | 5347 |
| Stdev (psi) | 642.8 | 573.4 | 614.8 | 1359.9 | 1190.6 | 1797.8 | 655.7 | 782.9 |
| 2% secant modulus MD (psi) | 4044 | 3506 | 7472 | 5656 | 5423 | 3656 | 2689 | 4632 |
| Stdev (psi) | 415.3 | 390.6 | 324.7 | 728.8 | 664.4 | 813.2 | 359.5 | 495 |
| 1% secant modulus CD (psi) | 5781 | 4389 | 7592 | 8447 | 6151 | 5418 | 4970 | 10370 |
| Stdev (psi) | 846.7 | 386.3 | 497.4 | 1339.1 | 1068.8 | 1185.9 | 1784.9 | 3196.4 |
| 2% secant modulus CD (psi) | 4354 | 3742 | 6516 | 6046 | 4777 | 4294 | 4090 | 6965 |
| Stdev (psi) | 541.5 | 237.5 | 326.2 | 765.2 | 529.9 | 559.7 | 894.1 | 1471.9 |
| Peel strength from foam (lbf/in) | 0.94 | 0.88 | 1.04 | 0.88 | 0.84 | 0.87 | 0.95 | 1.1 |
| Stdev (lbf/in) | 0.06 | 0.13 | 0.04 | 0.03 | 0.07 | 0.05 | 0.01 | 0.03 |
| Adhesion failure | Foam broke | Foam broke | Foam broke | Foam broke | Foam broke | Foam broke | Foam broke | Foam broke |
| Elmendorf Tear MD (g/mil) | 158 | 185 | 113 | 144 | 130 | 140 | 159 | 122 |
| Stdev | 18 | 12 | 8 | 22 | 18 | 16 | 11 | 11 |
| Elmendorf Tear CD (g/mil) | 259 | 200 | 135 | 265 | 254 | 239 | 201 | 232 |
| Stdev | 39 | 21 | 12 | 10 | 13 | 29 | 20 | 21 |
| Break stress MD (psi) | 1767 | 1467 | 1575 | 4020 | 3957 | 3718 | 3631 | 2093 |
| Stdev | 183.93 | 74.9 | 152.79 | 401.87 | 341.55 | 385.11 | 372.66 | 149.92 |
| Break strain MD (%) | 373 | 377 | 330 | 679 | 677 | 696 | 728 | 657 |
| Stdev | 22.05 | 16.18 | 17.55 | 38.44 | 29.18 | 38.59 | 8.83 | 22.75 |
| Toughness MD | 3573 | 3276 | 3404 | 10433 | 10630 | 10099 | 10244 | 5694 |
| Stdev | 493 | 223 | 412 | 1145 | 1166 | 1228 | 893 | 520 |
| Break stress CD (psi) | 993 | 1232 | 1088 | 2902 | 1838 | 2095 | 2147 | 3708 |
| Stdev | 126.27 | 136.65 | 123.84 | 489.93 | 134.56 | 198.98 | 441.73 | 383.85 |

TABLE 20-continued

Properties of Blown Films.

|  | 38 | 39 | 40 | 41 | 42 | 43 | 44 | 45 |
|---|---|---|---|---|---|---|---|---|
| Break strain CD (%) | 333 | 388 | 256 | 573 | 612 | 657 | 688 | 710 |
| Stdev | 28.36 | 34.96 | 17.68 | 132.08 | 15.56 | 15.33 | 67.7 | 16.68 |
| Toughness CD | 2002 | 2815 | 2158 | 5230 | 4928 | 5933 | 6263 | 10417 |
| Stdev | 260 | 409 | 354 | 1625 | 316 | 559 | 1365 | 1207 |

The samples containing some LDPE had better tensile properties and toughness both in MD and CD direction. The high melt strength ENR7086 comparative had higher 1% secant modulus, implying less flexibility than the OBC samples. In some applications, such footwear, the inventive films may be used as an adhesive film without the LDPE. The LDPE helps with processability by improving melt strength, but is not a necessary component of the inventive films.

Foam failure occurs cohesively based on both the "DOW GREAT STUFF" foam test, as well as the 180 peel test described earlier.

The inventive films may be used in many applications, including, but not limited to, adhesive films in automobile articles, such as head rests; an adhesive film in footwear components; and any adhesive film that provides adhesive qualities to a polyolefin substrate and polar material, such as in PU foams, glues, and coatings. Additional applications include headliners, flooring applications, barrier films, such as between fabrics and PU foams. Inventive films may also be used in noice vibration mats. The inventive films may also be used used to in applications that require enhanced breathability and higher moisture vapor transmission rates.

Aqueous Dispersions

Aqueous dispersions may be prepared by melt blending an inventive composition, as described herein, and water in an extruder to produce a stable, uniform dispersion with an average particle size, typically around 300 nm. The solids content of the dispersions is typically from 35 to 50 weight percent, based on the total weight of the dispersion. A dispersing agent, for example, UNICID™ 350 acid (6 wt % on a solids basis; of a synthetic C26 carboxylic acid converted to potassium salt, and available from Baker Petrolite), is added to the dispersion. The dispersions are then applied as a cast film to biaxially-oriented polypropylene (BOPP) film, and the surface energy measured.

Adhesion Promoter

The compositions of the invention, as described herein, may also be used as an adhesion promoter to polyurethane, either pure or in blends, extruded to provide artificial turf (or artificial grass yarn.).

For example, an inventive composition may be extruded on a tape extrusion line and stretched 5 times. Sample tapes can then bundled, and stacked as five strands on top of each other, mimicking bundles of artificial turf yarn after being tufted into a carpet. The bundles can be held in a mold, and a polycondensating diol-isocyanate blend, for example as shown in Table 21 below, may be injected into the mold onto one section of the bundle. After curing for about 30 minutes, at 25° C., a sample of the resultant polymer can be evaluated for adhesion to a polyurethane.

TABLE 21

| Diol Formulation | |
|---|---|
| Voranol EP 1900 | 90 pbw |
| 1,4 BD | 10 pbw |
| Sylosiv P3 | 5 pbw |
| DABCO 33 LV | 0.2 pbw |
| Isocyanates | |
| Isonate M143 ratio | 40:100 |

Thus, the inventive composition may be used as an adhesion promoter towards polyurethane, in artificial turf, and other applications, and which can be incorporated reactively into polyolefins, the latter being used for the production for artificial turf to improve the tuft lock of the yarn in the artificial turf carpet.

Adhesion is promoted via the functional group reacting to the polyurethane coating applied as a polymerizing mixture to the carpet backing. On the carpet backing side, the tufted artificial grass yarn/tape surface is exposed and the coating thereon applied. The concentration of the adhesion promoter can be 100 percent of an inventive composition, and can extend down to 10 percent of an inventive composition in a blend with any polyethylene or propylene deemed appropriate for use in artificial grass yarn applications.

An inventive composition may also be used in the fabrication of hydrophilic artificial grass yarn, with the purpose of creating a more "player friendly" surface properties. In particular, blends of thermoplastic polyurethane with polyethylenes compatibilized with an inventive composition may be used to form artificial turf.

Although the invention has been described in considerable detail in the preceding examples, this detail is for the purpose of illustration and is not to be construed as a limitation on the invention as described in the following claims. All U.S. patents, allowed U.S. patent applications, or published U.S. patent applications are incorporated within this specification by reference.

We claim:

1. A blown film comprising at least one layer formed from a composition comprising at least the following:
A) an olefin multi-block interpolymer,
B) a functionalized olefin-based polymer, and
C) a thermoplastic polyurethane, and
wherein the functionalized olefin-based polymer has a density from 0.84 g/cc to 0.93 g/cc, and wherein the functionalized olefin-based polymer is functionalized ethylene/alpha-olefin interpolymer, and
wherein the olefin multi-block interpolymer is present in an amount from 50 to 80 weight percent, and the thermoplastic polyurethane is present in an amount from 50 to 20 weight percent, each based on the sum weight of the olefin multi-block interpolymer and the thermoplastic polyurethane, and wherein the olefin multi-block interpolymer is an ethylene multi-block interpolymer, and wherein the functionalized ethylene/alpha-olefin interpolymer is not a functionalized olefin multi-block interpolymer; and wherein the functionalized ethylene/alpha-olefin interpolymer has a melt index (I2) from 0.5 to 50 g/10 min.

2. The film of claim 1, wherein the functionalized olefin-based polymer has a melt index from 1 to 10 g/10 min, as measured at 190° C. and 2.16 kg.

3. The film of claim 1, wherein the functionalized olefin-based polymer is present in an amount less than, or equal to, 10 weight percent, based on the total weight of the film.

4. The film of claim 1, further comprising a low density polyethylene (LDPE).

5. The film of claim 4, wherein the LDPE has a melt index from 0.2 to 100 g/10 min, as measured at 190° C. and 2.16 kg.

6. An injection molded article comprising at least one component formed from a composition comprising at least the following:
A) an olefin multi-block interpolymer,
B) a functionalized olefin-based polymer, and
C) a thermoplastic polyurethane, and
wherein the functionalized olefin-based polymer has a density from 0.84 g/cc to 0.93 g/cc, and wherein the functionalized olefin-based polymer is functionalized ethylene/alpha-olefin interpolymer, and
wherein the olefin multi-block interpolymer is present in an amount from 50 to 80 weight percent, and the thermoplastic polyurethane is present in an amount from 50 to 20 weight percent, each based on the sum weight of the olefin multi-block interpolymer and the thermoplastic polyurethane, and
wherein the olefin multi-block interpolymer is an ethylene multi-block interpolymer, and wherein the functionalized ethylene/alpha-olefin interpolymer is not a functionalized olefin multi-block interpolymer; and
wherein the functionalized ethylene/alpha-olefin interpolymer has a melt index (I2) from 0.5 to 50 g/10 min.

7. The article of claim 6, wherein the functionalized olefin-based polymer has a melt index from 1 to 10 g/10 min, as measured at 190° C. and 2.16 kg.

8. The article of claim 6, further comprising a low density polyethylene (LDPE).

9. The article of claim 8, wherein the LDPE has a melt index from 0.2 to 100 g/10 min, as measured at 190° C. and 2.16 kg.

10. The article of claim 6, wherein the composition is in the form of an "at press blend."

11. The article of claim 6, wherein the composition is in the form of a compounded blend.

12. An overmolded article comprising at least one component formed from a composition comprising at least the following:
A) an olefin multi-block interpolymer,
B) a functionalized olefin-based polymer, and
C) a thermoplastic polyurethane, and
wherein the functionalized olefin-based polymer has a density from 0.84 g/cc to 0.93 g/cc, and wherein the functionalized olefin-based polymer is functionalized ethylene/alpha-olefin interpolymer, and
wherein the olefin multi-block interpolymer is present in an amount from 50 to 80 weight percent, and the thermoplastic polyurethane is present in an amount from 50 to 20 weight percent, each based on the sum weight of the olefin multi-block interpolymer and the thermoplastic polyurethane, and
wherein the olefin multi-block interpolymer is an ethylene multi-block interpolymer, and wherein the functionalized ethylene/alpha-olefin interpolymer is not a functionalized olefin multi-block interpolymer; and
wherein the functionalized ethylene/alpha-olefin interpolymer has a melt index (I2) from 0.5 to 50 g/10 min.

13. The article of claim 12, further comprising a low density polyethylene (LDPE).

14. The article of claim 1, wherein the ethylene multi-block interpolymer is present in an amount from 55 to 77 weight percent, and the thermoplastic polyurethane is present in an amount from 45 to 23 weight percent, each based on the sum weight of the olefin multi-block interpolymer and the thermoplastic polyurethane.

15. The article of claim 6, wherein the ethylene multi-block interpolymer is present in an amount from 55 to 77 weight percent, and the thermoplastic polyurethane is present in an amount from 45 to 23 weight percent, each based on the sum weight of the olefin multi-block interpolymer and the thermoplastic polyurethane.

16. The article of claim 12, wherein the ethylene multi-block interpolymer is present in an amount from 55 to 77 weight percent, and the thermoplastic polyurethane is present in an amount from 45 to 23 weight percent, each based on the sum weight of the olefin multi-block interpolymer and the thermoplastic polyurethane.

17. The blown film article of claim 1, wherein the functionalized ethylene/alpha-olefin interpolymer is an anhydride functionalized ethylene/alpha-olefin interpolymer.

18. The injection molded article of claim 6, wherein the functionalized ethylene/alpha-olefin interpolymer is an anhydride functionalized ethylene/alpha-olefin interpolymer.

19. The overmolded article of claim 12, wherein the functionalized ethylene/alpha-olefin interpolymer is an anhydride functionalized ethylene/alpha-olefin interpolymer.

* * * * *